United States Patent
Kwon et al.

(10) Patent No.: US 12,278,684 B2
(45) Date of Patent: Apr. 15, 2025

(54) TECHNIQUES FOR COMMUNICATING USING A RECONFIGURABLE SURFACE

(71) Applicant: QUALCOMM Incorporated, San Diego, CA (US)

(72) Inventors: Hwan Joon Kwon, San Diego, CA (US); Saeid Sahraei, San Diego, CA (US); Hung Dinh Ly, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/258,787

(22) PCT Filed: Feb. 25, 2021

(86) PCT No.: PCT/CN2021/077816
§ 371 (c)(1),
(2) Date: Jun. 21, 2023

(87) PCT Pub. No.: WO2022/178742
PCT Pub. Date: Sep. 1, 2022

(65) Prior Publication Data
US 2024/0048214 A1    Feb. 8, 2024

(51) Int. Cl.
*H04B 7/06* (2006.01)
*H04B 7/08* (2006.01)
*H04B 7/145* (2006.01)

(52) U.S. Cl.
CPC ........... *H04B 7/0695* (2013.01); *H04B 7/088* (2013.01); *H04B 7/145* (2013.01)

(58) Field of Classification Search
CPC .................................................. H04B 7/0695
(Continued)

(56) References Cited

U.S. PATENT DOCUMENTS

2019/0132099 A1* 5/2019 Wu .................. H04L 5/0048
2022/0014935 A1* 1/2022 Haija ................ H04L 5/0048

FOREIGN PATENT DOCUMENTS

| CN | 111245494 A | 6/2020 |
| CN | 111917448 A | 11/2020 |
| WO | WO-2020254031 A1 | 12/2020 |

OTHER PUBLICATIONS

International Search Report and Written Opinion—PCT/CN2021/077816—ISA/EPO—Jul. 30, 2021.

(Continued)

*Primary Examiner* — Lihong Yu
(74) *Attorney, Agent, or Firm* — Paul M. McAdams; Holland & Hart LLP

(57) ABSTRACT

Methods, systems, and devices for wireless communications are described. A user equipment (UE) may receive, from a base station via a reconfigurable surface, a set of reference signals reflected by the reconfigurable surface using a set of precoder configurations. In some aspects, the set of reference signals are transmitted within a set of reference signal occasions of a sweep procedure associated with configuring the reconfigurable surface with different precoder configurations of the set of precoder configurations for reflecting signals. The UE may additionally transmit, to the base station via the reconfigurable surface, a feedback message including an indication of at least one precoder configuration of the set of precoder configurations based on receiving the set of reference signals. The UE may then receive, from the base station via the reconfigurable surface, a downlink transmission based on transmitting the feedback message.

30 Claims, 17 Drawing Sheets

(58) Field of Classification Search
USPC .......................................................... 375/262
See application file for complete search history.

(56) References Cited

OTHER PUBLICATIONS

Taha A., et al., "Enabling Large Intelligent Surfaces with Compressive Sensing and Deep Learning", arxiv.org, Cornell University Library, 201 Olin Library Cornell University Ithaca, NY 14853, Apr. 23, 2019 (Apr. 23, 2019), XP081172462, 33 Pages, last bullet, p. 8, figure 2.

Tasolamprou A.C., et al., "Exploration of Intercell Wireless Millimeter-Wave Communication in the Landscape of Intelligent Metasurfaces," IEEE Access, Aug. 5, 2019, vol. 7, pp. 122931-122948.

* cited by examiner

TECHNIQUES FOR COMMUNICATING USING A RECONFIGURABLE SURFACE

CROSS REFERENCE

The present Application is a 371 national stage filing of International PCT Application No. PCT/CN2021/077816 by KWON et al. entitled "TECHNIQUES FOR COMMUNICATING USING A RECONFIGURABLE SURFACE," filed Feb. 25, 2021, which is assigned to the assignee hereof, and which is expressly incorporated by reference in its entirety herein.

FIELD OF TECHNOLOGY

The following relates to wireless communications, including techniques for communicating using a reconfigurable surface.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems have attempted to use active antenna units (AAUs), reconfigurable intelligent surfaces (RISs), or both, in order to increase throughput and increase quantities of wireless devices (e.g., user equipments (UEs)) which are able to connect with the network. In some cases, AAUs and RISs may be communicatively coupled to a base station, and may relay (e.g., reflect) transmissions between the base station and UEs. However, AAUs may result in high power consumption, and may therefore be undesirable for widespread use. Additionally, due to the fact that RISs are passive devices, conventional techniques used to generate beamforming configurations for AAUs may not be used in the context of RISs.

SUMMARY

The described techniques relate to improved methods, systems, devices, and apparatuses that support techniques for communicating using a reconfigurable surface. Generally, the described techniques provide for selection of precoder configurations for reconfigurable intelligent surfaces (RIS). In particular, techniques described herein are directed to signaling between a base station and a user equipment (UE) via a reconfigurable surface (e.g., RIS), which enables for efficient precoder configuration selection for the reconfigurable surface. For example, to configure a reconfigurable surface (e.g., RIS) for downlink communications, a UE may receive a set of reference signals reflected by a reconfigurable surface using a set of precoder configurations during a sweep procedure used to configure the reconfigurable surface. The sweep procedure may be performed to reflect reference signals by the reconfigurable surface using at least a subset of precoder configurations usable by the reconfigurable surface (e.g., a subset of precoder configurations within a codebook or index of usable precoder configurations). In some aspects, the time and frequency resources used for the sweep procedure may be configured via radio resource control (RRC) signaling, synchronization signal block (SSB) signaling, or both. Upon receiving the reference signals, the UE may perform measurements on each of the reference signals, and may report back to the base station (e.g., via the reconfigurable surface) a preferred precoder configuration, an ordered list of precoder configurations, or both. The base station may select a precoder configuration based on the information received from the UE and may cause the reconfigurable surface to be configured to use the selected precoder configuration. Subsequently, the base station and the UE may communicate with one another via the reconfigurable surface using the selected precoder configuration.

A method for wireless communication at a user equipment (UE) is described. The method may include receiving, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmitting, to the base station via the reconfigurable surface, a feedback message including an indication of at least one precoder configuration of the set of precoder configurations based on receiving the set of reference signals, and receiving, from the base station via the reconfigurable surface, a downlink transmission based on transmitting the feedback message.

An apparatus for wireless communication at a UE is described. The apparatus may include a processor, memory coupled with the processor, and instructions stored in the memory. The instructions may be executable by the processor to cause the apparatus to receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the base station via the reconfigurable surface, a feedback message including an indication of at least one precoder configuration of the set of precoder configurations based on receiving the set of reference signals, and receive, from the base station via the reconfigurable surface, a downlink transmission based on transmitting the feedback message.

Another apparatus for wireless communication at a UE is described. The apparatus may include means for receiving, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, means for transmitting, to the base station via the reconfigurable surface, a feedback message including an indication of at least one precoder configuration of the set of precoder configurations based on receiving the set of reference signals, and means for receiving, from the base station via the reconfigurable surface, a downlink transmission based on transmitting the feedback message.

A non-transitory computer-readable medium storing code for wireless communication at a UE is described. The code may include instructions executable by a processor to receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the base station via the reconfigurable surface, a feedback message including an indication of at least one precoder configuration of the set of precoder configurations based on receiving the set of reference signals, and receive, from the base station via the reconfigurable surface, a downlink transmission based on transmitting the feedback message.

Some examples of the method, apparatuses, and non-transitory computer-readable medium described herein may further include operations, features, means, or instructions for performing a set of measurements on the set of reference signals received during the sweep procedure and identifying the at least one precoder configuration of the set of precoder configurations based on performing the set of measurements, where transmitting the feedback message may be based on identifying the at least one precoder configuration.

Some examples of the method, apparatuses, and non-transitory computer-readable medium described herein may further include operations, features, means, or instructions for receiving the set of reference signals further includes receiving the set of reference signals within the set of reference signal occasions of a first cycle of the sweep procedure and transmitting the feedback message further includes transmitting the feedback message within a feedback message occasion of a second cycle of the sweep procedure, where the second cycle of the sweep procedure may be subsequent to the first cycle of the sweep procedure.

Some examples of the method, apparatuses, and non-transitory computer-readable medium described herein may further include operations, features, means, or instructions for identifying at least one feedback message occasion of the second cycle of the sweep procedure that may be associated with the at least one precoder configuration, where the feedback message may be transmitted within the at least one feedback message occasion of the second cycle of the sweep procedure.

Some examples of the method, apparatuses, and non-transitory computer-readable medium described herein may further include operations, features, means, or instructions for receiving, from the base station, a control message indicating a position of the reconfigurable surface, an orientation of the reconfigurable surface, or both, where receiving the set of reference signals, transmitting the feedback message, or both, may be based on receiving the control message.

Some examples of the method, apparatuses, and non-transitory computer-readable medium described herein may further include operations, features, means, or instructions for receiving, from the base station, a first control message including a first indication of a set of multiple precoder configurations for performing the sweep procedure and receiving, from the base station, a second control message including a second indication of the set of precoder configurations from the set of multiple precoder configurations for performing the sweep procedure, where receiving the set of reference signals reflected by the reconfigurable surface using the set of precoder configurations may be based on receiving the second control message.

In some examples of the method, apparatuses, and non-transitory computer-readable medium described herein, the first control message includes a RRC message, a SSB message, or both, and the second control message includes a downlink control information (DCI) message, a media access control (MAC) control element (MAC-CE) message, or both.

Some examples of the method, apparatuses, and non-transitory computer-readable medium described herein may further include operations, features, means, or instructions for receiving, from the base station, a control message including a second indication of a set of resources associated with the sweep procedure, where receiving the set of reference signals, transmitting the feedback message, or both, may be based on receiving the control message.

Some examples of the method, apparatuses, and non-transitory computer-readable medium described herein may further include operations, features, means, or instructions for transmitting, to the base station via the feedback message, a second indication of a first precoder configuration and a second precoder configuration of the set of precoder configurations, where receiving the downlink transmission may be based on transmitting the second indication of the first precoder configuration and the second precoder configuration.

Some examples of the method, apparatuses, and non-transitory computer-readable medium described herein may further include operations, features, means, or instructions for transmitting, to the base station via the feedback message, a third indication of a priority associated with the first precoder configuration and the second precoder configuration, measurements performed on reference signals associated with the first precoder configuration and the second precoder configuration, or both, where receiving the downlink transmission may be based on transmitting the third indication.

Some examples of the method, apparatuses, and non-transitory computer-readable medium described herein may further include operations, features, means, or instructions for receiving, from the base station, an additional reference signal reflected by the reconfigurable surface using the at least one precoder configuration, transmitting, to the base station via the reconfigurable surface, a second feedback message including data indicative of channel state information (CSI) between the base station and the reconfigurable surface, between the reconfigurable surface and the UE, or both, and communicating with the base station via the reconfigurable surface based on transmitting the second feedback message.

Some examples of the method, apparatuses, and non-transitory computer-readable medium described herein may further include operations, features, means, or instructions for receiving, from the base station via the reconfigurable surface, a second set of reference signals reflected by the reconfigurable surface using a second set of precoder configurations based on transmitting the feedback message, where the second set of precoder configurations may be different from the set of precoder configurations, where the second set of reference signals may be transmitted within a second set of reference signal occasions of a second sweep procedure associated with configuring the reconfigurable surface, transmitting, to the base station via the reconfigurable surface, a second feedback message including a second indication of one or more precoder configurations of the second set of precoder configurations based on receiving the second set of reference signals, and receiving, from the base station via the reconfigurable surface, a second downlink transmission based on transmitting the second feedback message.

Some examples of the method, apparatuses, and non-transitory computer-readable medium described herein may further include operations, features, means, or instructions for receiving, from the base station, a control message including a third indication of a set of multiple precoder configurations for performing the sweep procedure, where the set of precoder configurations may be included within the set of multiple precoder configurations for performing the sweep procedure, and the second set of precoder configurations may be not included within the set of multiple precoder configurations for performing the sweep procedure.

In some examples of the method, apparatuses, and non-transitory computer-readable medium described herein, the set of reference signals include a first format, and the second set of reference signals include a second format different from the first format.

In some examples of the method, apparatuses, and non-transitory computer-readable medium described herein, each reference signal of the set of reference signals may be reflected by the reconfigurable surface with a precoder configuration of the set of precoder configurations.

In some examples of the method, apparatuses, and non-transitory computer-readable medium described herein, the reconfigurable surface includes a set of multiple reflective surface elements, and each precoder configuration of the set of precoder configurations includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a precoder configuration of the set of precoder configurations, transitioning from a first precoder configuration to a second precoder configuration, or both.

In some examples of the method, apparatuses, and non-transitory computer-readable medium described herein, the set of reference signals include a set of CSI reference signals (CSI-RSs), and the feedback message includes a CSI report.

A method for wireless communication at a base station is described. The method may include transmitting, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, receiving, from the UE and reflected by the reconfigurable surface, a feedback message including an indication of at least one precoder configuration of the set of precoder configurations based on transmitting the set of reference signals, and transmitting, to the UE via the reconfigurable surface, a downlink transmission based on transmitting the feedback message.

An apparatus for wireless communication at a base station is described. The apparatus may include a processor, memory coupled with the processor, and instructions stored in the memory. The instructions may be executable by the processor to cause the apparatus to transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, receive, from the UE and reflected by the reconfigurable surface, a feedback message including an indication of at least one precoder configuration of the set of precoder configurations based on transmitting the set of reference signals, and transmit, to the UE via the reconfigurable surface, a downlink transmission based on transmitting the feedback message.

Another apparatus for wireless communication at a base station is described. The apparatus may include means for transmitting, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, means for receiving, from the UE and reflected by the reconfigurable surface, a feedback message including an indication of at least one precoder configuration of the set of precoder configurations based on transmitting the set of reference signals, and means for transmitting, to the UE via the reconfigurable surface, a downlink transmission based on transmitting the feedback message.

A non-transitory computer-readable medium storing code for wireless communication at a base station is described. The code may include instructions executable by a processor to transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, receive, from the UE and reflected by the reconfigurable surface, a feedback message including an indication of at least one precoder configuration of the set of precoder configurations based on transmitting the set of reference signals, and transmit, to the UE via the reconfigurable surface, a downlink transmission based on transmitting the feedback message.

Some examples of the method, apparatuses, and non-transitory computer-readable medium described herein may further include operations, features, means, or instructions for transmitting, to a second UE via the reconfigurable surface, a second set of reference signals reflected by the reconfigurable surface using the set of precoder configurations, receiving, from the second UE via the reconfigurable surface, a second feedback message including a second indication of one or more precoder configurations of the set of precoder configurations based on transmitting the second set of reference signals, selecting a precoder configuration of the set of precoder configurations based on receiving the indication of the at least one precoder configuration from the UE and receiving the second indication of the one or more precoder configurations from the second UE, and transmitting, to the UE and the second UE via the reconfigurable surface, a second downlink transmission based on the selected precoder configuration.

Some examples of the method, apparatuses, and non-transitory computer-readable medium described herein may further include operations, features, means, or instructions for transmitting the set of reference signals further includes transmitting the set of reference signals within the set of reference signal occasions of a first cycle of the sweep procedure and receiving the feedback message further includes receiving the feedback message within a feedback message occasion of a second cycle of the sweep procedure, where the second cycle of the sweep procedure may be subsequent to the first cycle of the sweep procedure.

In some examples of the method, apparatuses, and non-transitory computer-readable medium described herein, the feedback message may be received within at least one feedback message occasion of the second cycle of the sweep procedure that may be associated with the at least one precoder configuration.

Some examples of the method, apparatuses, and non-transitory computer-readable medium described herein may further include operations, features, means, or instructions for transmitting, to the UE, a control message indicating a position of the reconfigurable surface, an orientation of the reconfigurable surface, or both, where transmitting the set of reference signals, receiving the feedback message, or both, may be based on transmitting the control message.

Some examples of the method, apparatuses, and non-transitory computer-readable medium described herein may further include operations, features, means, or instructions for transmitting, to the UE, a first control message including a first indication of a set of multiple precoder configurations for performing the sweep procedure and transmitting, to the UE, a second control message including a second indication of the set of precoder configurations from the set of multiple precoder configurations for performing the sweep procedure, where transmitting the set of reference signals reflected by the reconfigurable surface using the set of precoder configurations may be based on transmitting the second control message.

In some examples of the method, apparatuses, and non-transitory computer-readable medium described herein, the first control message includes a RRC message, a SSB message, or both, and the second control message includes a DCI message, a MAC-CE message, or both.

Some examples of the method, apparatuses, and non-transitory computer-readable medium described herein may further include operations, features, means, or instructions for transmitting, to the UE, a control message including a second indication of a set of resources associated with the sweep procedure, where transmitting the set of reference signals, receiving the feedback message, or both, may be based on transmitting the control message.

Some examples of the method, apparatuses, and non-transitory computer-readable medium described herein may further include operations, features, means, or instructions for receiving, from the UE via the feedback message, a second indication of a first precoder configuration and a second precoder configuration of the set of precoder configurations, where transmitting the downlink transmission may be based on receiving the second indication of the first precoder configuration and the second precoder configuration.

Some examples of the method, apparatuses, and non-transitory computer-readable medium described herein may further include operations, features, means, or instructions for receiving, from the UE via the feedback message, a third indication of a priority associated with the first precoder configuration and the second precoder configuration, measurements performed on reference signals associated with the first precoder configuration and the second precoder configuration, or both, where transmitting the downlink transmission may be based on receiving the third indication.

Some examples of the method, apparatuses, and non-transitory computer-readable medium described herein may further include operations, features, means, or instructions for transmitting, to the UE, an additional reference signal reflected by the reconfigurable surface using the at least one precoder configuration, receiving, from the UE via the reconfigurable surface, a second feedback message including data indicative of CSI between the base station and the reconfigurable surface, between the reconfigurable surface and the UE, or both, and communicating with the UE via the reconfigurable surface based on receiving the second feedback message.

Some examples of the method, apparatuses, and non-transitory computer-readable medium described herein may further include operations, features, means, or instructions for transmitting, to the UE via the reconfigurable surface, a second set of reference signals reflected by the reconfigurable surface using a second set of precoder configurations based on receiving the feedback message, where the second set of precoder configurations may be different from the set of precoder configurations, where the second set of reference signals may be transmitted within a second set of reference signal occasions of a second sweep procedure associated with configuring the reconfigurable surface, receiving, from the UE via the reconfigurable surface, a second feedback message including a second indication of one or more precoder configurations of the second set of precoder configurations based on transmitting the second set of reference signals, and transmitting, to the UE via the reconfigurable surface, a second downlink transmission based on receiving the second feedback message.

Some examples of the method, apparatuses, and non-transitory computer-readable medium described herein may further include operations, features, means, or instructions for transmitting, to the UE, a control message including a third indication of a set of multiple precoder configurations for performing the sweep procedure, where the set of precoder configurations may be included within the set of multiple precoder configurations for performing the sweep procedure, and the second set of precoder configurations may be not included within the set of multiple precoder configurations for performing the sweep procedure.

In some examples of the method, apparatuses, and non-transitory computer-readable medium described herein, the set of reference signals include a first format, and the second set of reference signals include a second format different from the first format.

In some examples of the method, apparatuses, and non-transitory computer-readable medium described herein, each reference signal of the set of reference signals may be reflected by the reconfigurable surface with a precoder configuration of the set of precoder configurations.

In some examples of the method, apparatuses, and non-transitory computer-readable medium described herein, the reconfigurable surface includes a set of multiple reflective surface elements, and each precoder configuration of the set of precoder configurations includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a precoder configuration of the set of precoder configurations, transitioning from a first precoder configuration to a second precoder configuration, or both.

In some examples of the method, apparatuses, and non-transitory computer-readable medium described herein, the set of reference signals include a set of CSI-RSs, and the feedback message includes a CSI report.

A method for wireless communication at a UE is described. The method may include transmitting, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, receiving, from the base station and reflected by the reconfigurable surface, a feedback message including an indication of at least one precoder configuration of the set of precoder configurations based on transmitting the set of reference signals, and transmitting, to the base station via the reconfigurable surface, an uplink transmission based on receiving the feedback message.

An apparatus for wireless communication at a UE is described. The apparatus may include a processor, memory coupled with the processor, and instructions stored in the memory. The instructions may be executable by the processor to cause the apparatus to transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, receive, from the base station and reflected by the reconfigurable surface, a feedback message including an indication of at least one precoder configuration of the set of precoder configurations based on transmitting the set of reference signals, and transmit, to the base station via the reconfigurable surface, an uplink transmission based on receiving the feedback message.

Another apparatus for wireless communication at a UE is described. The apparatus may include means for transmitting, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, means for receiving, from the base station and reflected by the reconfigurable surface, a feedback message including an indication of at least one precoder configuration of the set of precoder configurations based on transmitting the set of reference signals, and means for transmitting, to the base station via the reconfigurable surface, an uplink transmission based on receiving the feedback message.

A non-transitory computer-readable medium storing code for wireless communication at a UE is described. The code may include instructions executable by a processor to transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, receive, from the base station and reflected by the reconfigurable surface, a feedback message including an indication of at least one precoder configuration of the set of precoder configurations based on transmitting the set of reference signals, and transmit, to the base station via the reconfigurable surface, an uplink transmission based on receiving the feedback message.

Some examples of the method, apparatuses, and non-transitory computer-readable medium described herein may further include operations, features, means, or instructions for transmitting the set of reference signals further includes transmitting the set of reference signals within the set of reference signal occasions of a first cycle of the sweep procedure and receiving the feedback message further includes receiving the feedback message within a feedback message occasion of a second cycle of the sweep procedure, where the second cycle of the sweep procedure may be subsequent to the first cycle of the sweep procedure.

In some examples of the method, apparatuses, and non-transitory computer-readable medium described herein, the feedback message may be received within at least one feedback message occasion of the second cycle of the sweep procedure that may be associated with the at least one precoder configuration.

Some examples of the method, apparatuses, and non-transitory computer-readable medium described herein may further include operations, features, means, or instructions for receiving, from the base station, a control message indicating a position of the reconfigurable surface, an orientation of the reconfigurable surface, or both, where transmitting the set of reference signals, receiving the feedback message, or both, may be based on receiving the control message.

Some examples of the method, apparatuses, and non-transitory computer-readable medium described herein may further include operations, features, means, or instructions for receiving, from the base station, a first control message including a first indication of a set of multiple precoder configurations for performing the sweep procedure and receiving, from the base station, a second control message including a second indication of the set of precoder configurations from the set of multiple precoder configurations for performing the sweep procedure, where transmitting the set of reference signals reflected by the reconfigurable surface using the set of precoder configurations may be based on receiving the second control message.

In some examples of the method, apparatuses, and non-transitory computer-readable medium described herein, the first control message includes a RRC message, a SSB message, or both, and the second control message includes a DCI message, a MAC-CE message, or both.

Some examples of the method, apparatuses, and non-transitory computer-readable medium described herein may further include operations, features, means, or instructions for receiving, from the base station, a control message including a second indication of a set of resources associated with the sweep procedure, where transmitting the set of reference signals, receiving the feedback message, or both, may be based on receiving the control message.

Some examples of the method, apparatuses, and non-transitory computer-readable medium described herein may further include operations, features, means, or instructions for transmitting, to the base station, an additional reference signal reflected by the reconfigurable surface using the at least one precoder configuration and communicating with the base station via the reconfigurable surface based on transmitting the additional reference signal.

Some examples of the method, apparatuses, and non-transitory computer-readable medium described herein may further include operations, features, means, or instructions for transmitting, to the base station via the reconfigurable surface, a second set of reference signals reflected by the reconfigurable surface using a second set of precoder configurations based on receiving the feedback message, where the second set of precoder configurations may be different from the set of precoder configurations, where the second set of reference signals may be transmitted within a second set of reference signal occasions of a second sweep procedure associated with configuring the reconfigurable surface, receiving, from the base station via the reconfigurable surface, a second feedback message including a second indication of one or more precoder configurations of the second set of precoder configurations based on transmitting the second set of reference signals, and transmitting, to the base station via the reconfigurable surface, a second uplink transmission based on receiving the second feedback message.

Some examples of the method, apparatuses, and non-transitory computer-readable medium described herein may further include operations, features, means, or instructions for receiving, from the base station, a control message including a third indication of a set of multiple precoder configurations for performing the sweep procedure, where the set of precoder configurations may be included within the set of multiple precoder configurations for performing the sweep procedure, and the second set of precoder configurations may be not included within the set of multiple precoder configurations for performing the sweep procedure.

In some examples of the method, apparatuses, and non-transitory computer-readable medium described herein, the set of reference signals include a first format, and the second set of reference signals include a second format different from the first format.

In some examples of the method, apparatuses, and non-transitory computer-readable medium described herein, each reference signal of the set of reference signals may be reflected by the reconfigurable surface with a precoder configuration of the set of precoder configurations.

In some examples of the method, apparatuses, and non-transitory computer-readable medium described herein, the reconfigurable surface includes a set of multiple reflective surface elements, and each precoder configuration of the set of precoder configurations includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a precoder configuration of the set of precoder configurations, transitioning from a first precoder configuration to a second precoder configuration, or both.

In some examples of the method, apparatuses, and non-transitory computer-readable medium described herein, the set of reference signals include a set of CSI-RSs, and the feedback message includes a CSI report.

A method for wireless communication at a base station is described. The method may include receiving, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmitting, to the UE via the reconfigurable surface, a feedback message including an indication of at least one precoder configuration of the set of precoder configurations based on receiving the set of reference signals, and receiving, from the UE via the reconfigurable surface, an uplink transmission based on transmitting the feedback message.

An apparatus for wireless communication at a base station is described. The apparatus may include a processor, memory coupled with the processor, and instructions stored in the memory. The instructions may be executable by the processor to cause the apparatus to receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the UE via the reconfigurable surface, a feedback message including an indication of at least one precoder configuration of the set of precoder configurations based on receiving the set of reference signals, and receive, from the UE via the reconfigurable surface, an uplink transmission based on transmitting the feedback message.

Another apparatus for wireless communication at a base station is described. The apparatus may include means for receiving, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, means for transmitting, to the UE via the reconfigurable surface, a feedback message including an indication of at least one precoder configuration of the set of precoder configurations based on receiving the set of reference signals, and means for receiving, from the UE via the reconfigurable surface, an uplink transmission based on transmitting the feedback message.

A non-transitory computer-readable medium storing code for wireless communication at a base station is described. The code may include instructions executable by a processor to receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the UE via the reconfigurable surface, a feedback message including an indication of at least one precoder configuration of the set of precoder configurations based on receiving the set of reference signals, and receive, from the UE via the reconfigurable surface, an uplink transmission based on transmitting the feedback message.

Some examples of the method, apparatuses, and non-transitory computer-readable medium described herein may further include operations, features, means, or instructions for performing a set of measurements on the set of reference signals received during the sweep procedure and identifying the at least one precoder configuration of the set of precoder configurations based on performing the set of measurements, where transmitting the feedback message may be based on identifying the at least one precoder configuration.

Some examples of the method, apparatuses, and non-transitory computer-readable medium described herein may further include operations, features, means, or instructions for receiving the set of reference signals further includes receiving the set of reference signals within the set of reference signal occasions of a first cycle of the sweep procedure and transmitting the feedback message further includes transmitting the feedback message within a feedback message occasion of a second cycle of the sweep procedure, where the second cycle of the sweep procedure may be subsequent to the first cycle of the sweep procedure.

Some examples of the method, apparatuses, and non-transitory computer-readable medium described herein may further include operations, features, means, or instructions for identifying at least one feedback message occasion of the second cycle of the sweep procedure that may be associated with the at least one precoder configuration, where the feedback message may be transmitted within the at least one feedback message occasion of the second cycle of the sweep procedure.

Some examples of the method, apparatuses, and non-transitory computer-readable medium described herein may further include operations, features, means, or instructions for transmitting, to the UE, a control message indicating a position of the reconfigurable surface, an orientation of the reconfigurable surface, or both, where receiving the set of reference signals, transmitting the feedback message, or both, may be based on transmitting the control message.

Some examples of the method, apparatuses, and non-transitory computer-readable medium described herein may further include operations, features, means, or instructions for transmitting, to the UE, a first control message including a first indication of a set of multiple precoder configurations for performing the sweep procedure and transmitting, to the UE, a second control message including a second indication of the set of precoder configurations from the set of multiple precoder configurations for performing the sweep procedure, where receiving the set of reference signals reflected by the reconfigurable surface using the set of precoder configurations may be based on transmitting the second control message.

In some examples of the method, apparatuses, and non-transitory computer-readable medium described herein, the first control message includes a RRC message, a SSB message, or both, and the second control message includes a DCI message, a MAC-CE message, or both.

Some examples of the method, apparatuses, and non-transitory computer-readable medium described herein may further include operations, features, means, or instructions for transmitting, to the UE, a control message including a second indication of a set of resources associated with the sweep procedure, where receiving the set of reference signals, transmitting the feedback message, or both, may be based on transmitting the control message.

Some examples of the method, apparatuses, and non-transitory computer-readable medium described herein may further include operations, features, means, or instructions for receiving, from the UE, an additional reference signal reflected by the reconfigurable surface using the at least one precoder configuration, determining CSI between the base station and the reconfigurable surface, between the reconfigurable surface and the UE, or both, and communicating with the base station via the reconfigurable surface based on determining the CSI.

Some examples of the method, apparatuses, and non-transitory computer-readable medium described herein may further include operations, features, means, or instructions for receiving, from the UE via the reconfigurable surface, a second set of reference signals reflected by the reconfigurable surface using a second set of precoder configurations based on transmitting the feedback message, where the second set of precoder configurations may be different from the set of precoder configurations, where the second set of reference signals may be transmitted within a second set of reference signal occasions of a second sweep procedure associated with configuring the reconfigurable surface, transmitting, to the UE via the reconfigurable surface, a second feedback message including a second indication of one or more precoder configurations of the second set of precoder configurations based on receiving the second set of reference signals, and receiving, from the UE via the reconfigurable surface, a second uplink transmission based on transmitting the second feedback message.

Some examples of the method, apparatuses, and non-transitory computer-readable medium described herein may further include operations, features, means, or instructions for transmitting, to the UE, a control message including a third indication of a set of multiple precoder configurations for performing the sweep procedure, where the set of precoder configurations may be included within the set of multiple precoder configurations for performing the sweep procedure, and the second set of precoder configurations may be not included within the set of multiple precoder configurations for performing the sweep procedure.

In some examples of the method, apparatuses, and non-transitory computer-readable medium described herein, the set of reference signals include a first format, and the second set of reference signals include a second format different from the first format.

In some examples of the method, apparatuses, and non-transitory computer-readable medium described herein, each reference signal of the set of reference signals may be reflected by the reconfigurable surface with a precoder configuration of the set of precoder configurations.

In some examples of the method, apparatuses, and non-transitory computer-readable medium described herein, the reconfigurable surface includes a set of multiple reflective surface elements, and each precoder configuration of the set of precoder configurations includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a precoder configuration of the set of precoder configurations, transitioning from a first precoder configuration to a second precoder configuration, or both.

In some examples of the method, apparatuses, and non-transitory computer-readable medium described herein, the set of reference signals include a set of CSI-RSs, and the feedback message includes a CSI report.

DETAILED DESCRIPTION

Figure 1:
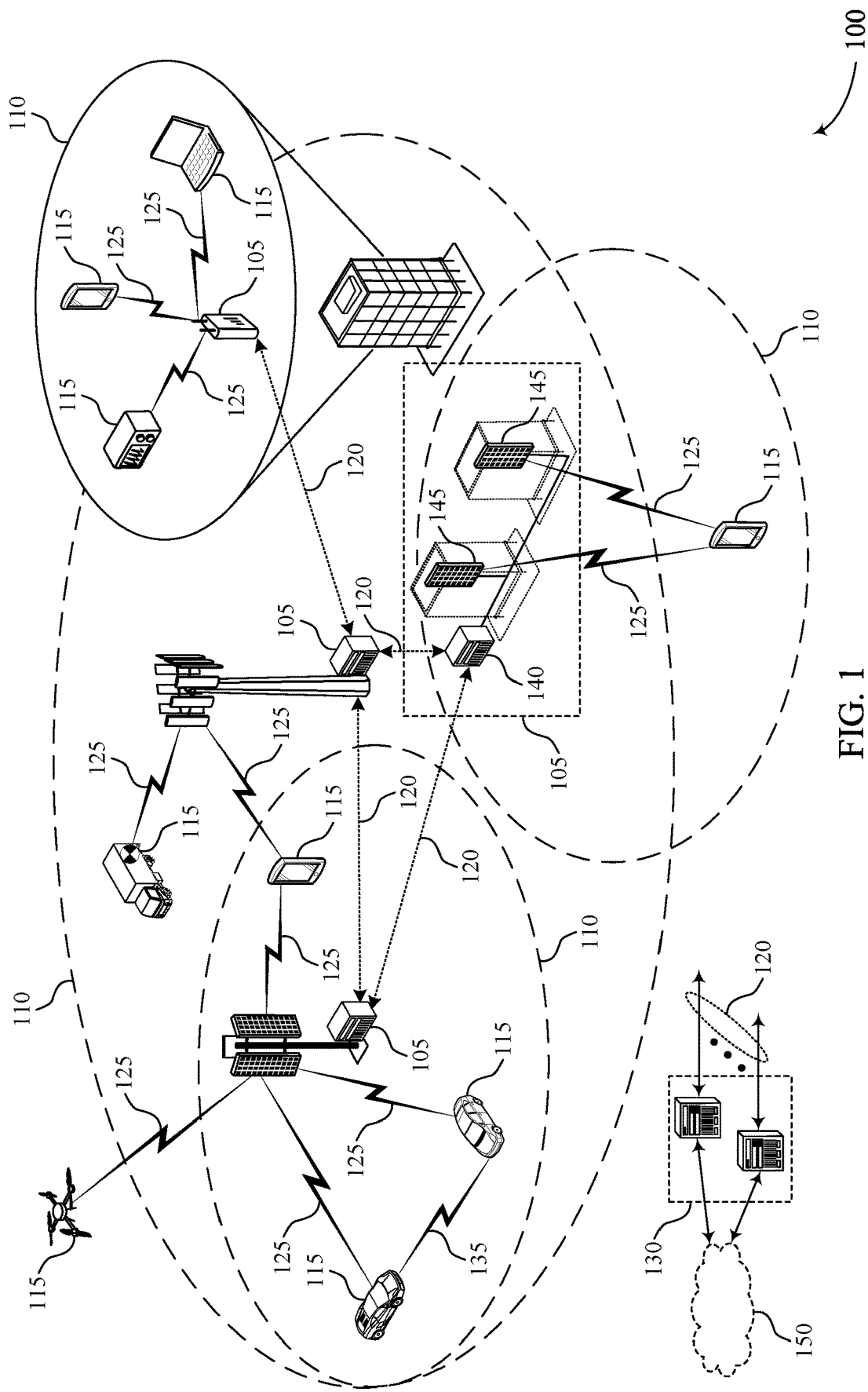
FIG. 1 illustrates an example of a wireless communications system that supports techniques for communicating using a reconfigurable surface in accordance with aspects of the present disclosure.

Some wireless communications systems have used active antenna units (AAUs) in order to increase throughput and increase quantities of wireless devices (e.g., user equipments (UEs)). In some cases, AAUs may be communicatively coupled with a base station, and may relay (e.g., reflect) transmissions between the base station and UEs. In this regard, AAUs may provide for high beamforming gain for communications within the wireless communications system, and may enable a base station to circumvent obstructions which would otherwise interrupt wireless communications. However, AAUs may result in high power consumption, and may therefore be undesirable for widespread use. One alternative to AAUs which has been explored is reconfigurable intelligent surfaces (RISs). In some aspects, RISs may relay (e.g., reflect) transmissions between base stations and UEs via one or more reflective surface elements. As compared to AAUs, RISs are passive devices, so may result in little to no power consumption, thereby improving power efficiency of the network. However, as passive devices, conventional techniques used to generate beamforming configurations for AAUs may not be used in the context of RISs. For example, as passive devices, RISs may be unable to perform coherent combining in order to focus a beam.

Accordingly, to enable higher throughput and reduced power consumption within a wireless communications system, techniques for precoder configuration selection usable by reconfigurable surfaces (e.g., RISs) are described. In particular, techniques described herein are directed to signaling between a base station and a UE via a reconfigurable surface (e.g., RIS), which enables for efficient precoder configuration selection. Specifically, some techniques described herein may utilize a codebook of possible configurations to perform precoder configuration selection for reconfigurable surfaces. For the purposes of the present disclosure, the terms "precoder configuration," "reflection matrix configuration," and like terms, may be used interchangeably to refer to configurations which are usable by a reconfigurable surface to reflect signals incident on the reconfigurable surface.

For example, to configure a reconfigurable surface for downlink communications, a UE may receive a set of reference signals reflected by a reconfigurable surface that uses a set of precoder configurations as part of a sweep procedure used to configure the precoder configuration of the reconfigurable surface. The sweep procedure may be performed to reflect reference signals by the reconfigurable surface using at least a subset of precoder configurations (e.g., reflection matrix configurations). In some aspects, the time and frequency resources used for the sweep procedure may be configured via radio resource control (RRC) signaling, synchronization signal block (SSB) signaling, or both. Upon receiving the reference signals, the UE may perform measurements on each of the reference signals, and may report back to the base station (e.g., via the reconfigurable surface) a preferred precoder configuration (e.g., preferred reflection matrix configuration), an ordered list of precoder configurations, or both. The base station may select a precoder configuration based on the information received from the UE and may cause the reconfigurable surface to be configured to use the selected precoder configuration. Subsequently, the base station and the UE may communicate with one another via the reconfigurable surface using the selected precoder configuration.

In some aspects, the reference signals may be transmitted from the base station to the UE via the reconfigurable surface during a first cycle of the sweep procedure, and the feedback message may be transmitted from the UE to the base station during a second cycle of the sweep procedure. For instance, in order to test four precoder configurations, the base station may transmit four reference signals associated with the four respective precoder configurations at four reference signal instances of a first cycle of the sweep procedure. In this example, if the UE determines that the second reference signal (e.g., second precoder configuration) exhibits the strongest performance, the UE may transmit a feedback message during a second feedback message instance within a second cycle of the sweep procedure corresponding to the second precoder configuration. Subsequent sweep procedures may be used to fine-tune the precoder configurations of the RIS identified by the UE via the feedback messages. In some aspects, similar sweep procedures used to configure the RIS for downlink transmissions may additionally be performed in order to configure the RIS for uplink configurations.

Aspects of the disclosure are initially described in the context of wireless communications systems. Additional aspects of the disclosure are described in the context of an example schematic diagram and an example process flow. Aspects of the disclosure are further illustrated by and described with reference to apparatus diagrams, system diagrams, and flowcharts that relate to techniques for communicating using a reconfigurable surface.

FIG. 1 illustrates an example of a wireless communications system 100 that supports techniques for communicating using a reconfigurable surface in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a ULE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may be configured to communicate with one another via one or more reconfigurable surfaces (e.g., RISs). Moreover, the wireless communications system 100 may support signaling between the UEs 115 and the base stations 105 which enables for efficient precoder selection for reconfigurable surfaces. By enabling efficient precoder selection in the context of reconfigurable surfaces, techniques described herein may provide for improved throughput and improved beamforming gain while simultaneously reducing power consumption associated with other reflective devices (e.g., AAUs).

For example, the wireless communications system 100 may include a reconfigurable surface (e.g., RIS) used to reflect signals between a base station 105 and UE 115. In order to configure the reconfigurable surface for downlink communications, the UE 115 may receive a set of reference signals transmitted by the base station 105 and reflected by the reconfigurable surface using a set of precoder configurations (e.g., set of reflection matrix configurations) during a sweep procedure used to configure the reconfigurable surface. The sweep procedure may be performed to reflect reference signals by the reconfigurable surface using at least a subset of precoder configurations usable by the reconfigurable surface. In some aspects, the time and frequency resources used for the sweep procedure may be configured via RRC signaling, SSB signaling, or both. Upon receiving the reference signals, the UE 115 may perform measurements on each of the reference signals, and may report back to the base station 105 (e.g., via the reconfigurable surface) a preferred precoder configuration (e.g., preferred reflection matrix configuration), an ordered list of precoder configurations, or both. Subsequently, the base station 105 and the UE 115 may communicate with one another via the reconfigurable surface using the preferred precoder configurations indicated by the UE 115.

In some aspects, the reference signals may be transmitted from the base station 105 to the UE 115 via the reconfigurable surface during a first cycle of the sweep procedure, and the feedback message may be transmitted from the UE 115 to the base station 105 during a second cycle of the sweep procedure. For instance, in order to test four precoder configurations, the base station 105 of the wireless communications system 100 may transmit four reference signals associated with the four respective precoder configurations at four reference signal instances of a first cycle of the sweep procedure. In this example, if the UE 115 determines that the second reference signal (e.g., second precoder configuration) exhibits the strongest performance, the UE 115 may transmit a feedback message during a second feedback message instance within a second cycle of the sweep procedure corresponding to the second precoder configuration. Subsequent sweep procedures may be used to fine-tune the precoder configuration(s) used by the reconfigurable surface. In some aspects, similar sweep procedures used to configure the reconfigurable surface for downlink transmissions may additionally be performed in order to configure the reconfigurable surface for uplink transmissions.

Techniques described herein may support signaling which enables for improved precoder configuration selection for reconfigurable surfaces. By enabling for improved precoder configuration selection, techniques described herein may increase throughput within the wireless communications system 100 and provide for improved beamforming gain. Additionally, the techniques described herein may enable base stations 105 to circumvent obstructions which would otherwise interrupt wireless communications, thereby increasing a quantity of UEs 115 which may be communicatively coupled to the network. Furthermore, by improving precoder configuration selection of passive reconfigurable surfaces (e.g., RISs), techniques described herein may reduce a power consumption which is associated with active reconfigurable surfaces (e.g., AAUs), thereby improving the overall power efficiency of the wireless communications system 100.

Figure 2:
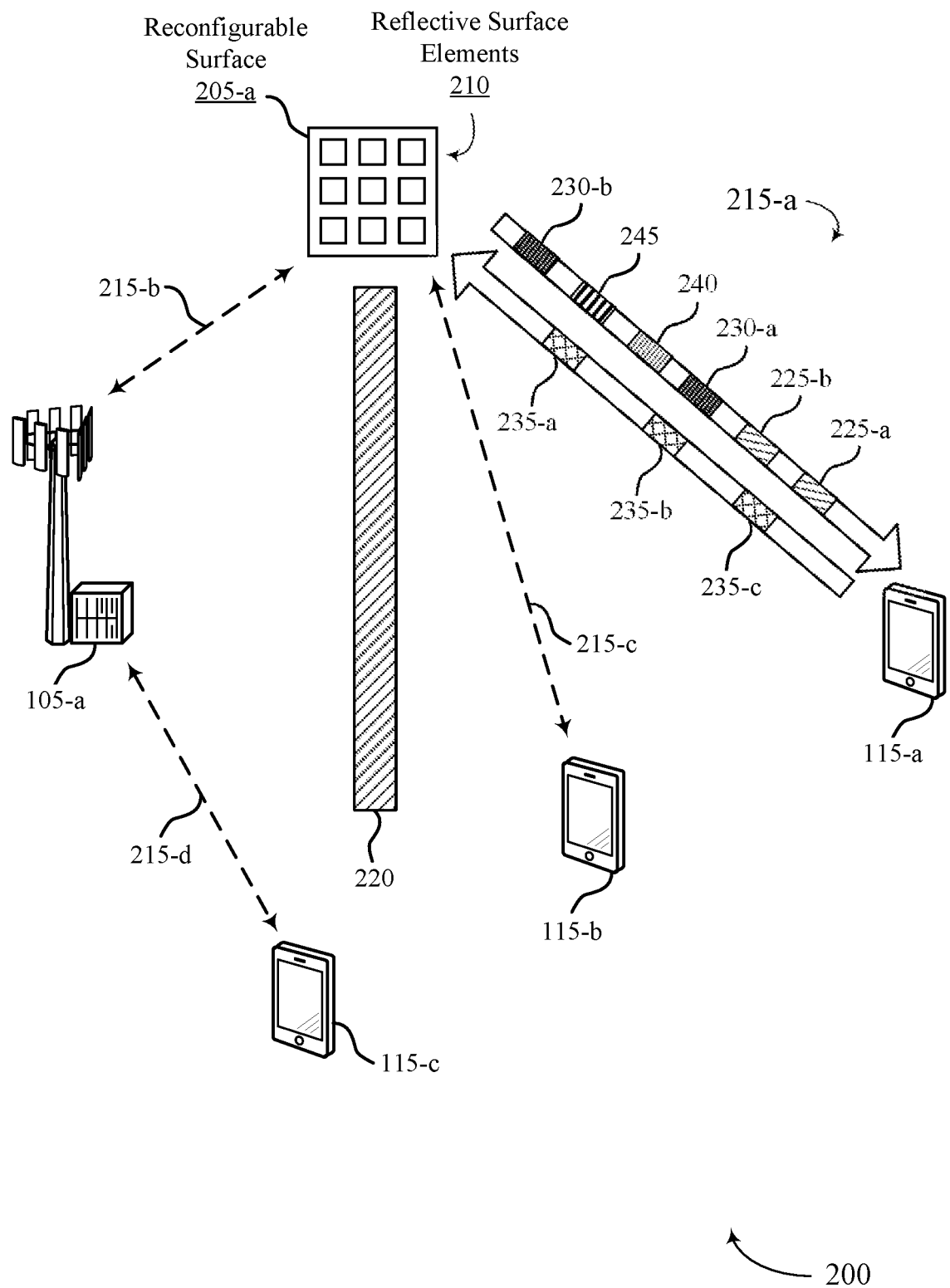
FIG. 2 illustrates an example of a wireless communications system that supports techniques for communicating using a reconfigurable surface in accordance with aspects of the present disclosure.

FIG. 2 illustrates an example of a wireless communications system 200 that supports techniques for communicating using a reconfigurable surface in accordance with aspects of the present disclosure. In some examples, wireless communications system 200 may implement aspects of wireless communications system 100. The wireless communications system 200 may include a first UE 115-*a*, a second UE 115-*b*, a third UE 115-*c*, a base station 105-*a*, and a reconfigurable surface 205-*a*, which may be examples of UEs 115, base stations 105, and reconfigurable surfaces as described with reference to FIG. 1.

In some aspects, the first UE 115-*a* and the second UE 115-*b* may communicate with the base station 105-*a* via the reconfigurable surface 205-*a*. In particular, the reconfigurable surface 205-*a* may be configured to relay (e.g., reflect) signals between the base station 105-*a* and the first UE 115-*a* and/or the second UE 115-*b* via a set of reflective surface elements 210. Each of the UEs 115 may communicate with the base station 105-*a* using one or more communication links 215. For example, the first UE 115-*a* may communicate with the base station 105-*a* via a communication link 215-*a* between the first UE 115-*a* and the reconfigurable surface 205-*a* and a communication link 215-*b* between the reconfigurable surface 205-*a* and the base station 105-*a*. Similarly, the second UE 115-*b* may communicate with the base station 105-*a* via a communication link 215-*c* between the second UE 115-*b* and the reconfigurable surface 205-*a* and the communication link 215-*b* between the reconfigurable surface 205-*a* and the base station 105-*a*. Additionally, the third UE 115-*c* may communicate with the base station 105-*a* via a communication link 215-*d*.

In some cases, the communication links 215 may include examples of access links (e.g., a Uu links). The communication links 215 may include bi-directional links that can include both uplink and downlink communication. For example, the first UE 115-*a* may transmit uplink transmissions, such as uplink control signals or uplink data signals, to the base station 105-*a* via the reconfigurable surface 205-*a* using the communication links 215-*a* and 215-*b*, and the base station 105-*a* may transmit downlink transmissions, such as downlink control signals or downlink data signals, to the first UE 115-*a* via the reconfigurable surface 205-*a* using the communication links 215-*b* and 215-*a*.

As noted previously herein, some wireless communications systems may utilize wireless communications devices (e.g., AAUs, RISs) which are configured to relay (e.g., reflect) signals between other wireless devices. Such devices may be used to increase throughput, improve beamforming gain, and circumvent obstructions to increase a quantity of UEs 115 which may be communicatively coupled to the network. For example, as shown in FIG. 2, an obstruction 220 may block, or otherwise interrupt, direct wireless communications between the base station 105-*a* and the UEs 115-*a* and 115-*b*. In such cases, wireless communications devices (e.g., AAUs, RISs) which are configured to relay (e.g., reflect) signals between other wireless devices may be used to circumvent the obstruction 220 and facilitate communications between the base station 105-*a* and the UEs 115-*a* and 115-*b*.

However, AAUs may result in high power consumption, and may therefore be undesirable for widespread use. Comparatively, reconfigurable surfaces (e.g., RISs) may relay (e.g., reflect) transmissions between the base station 105 and the UEs 115-*a* and 115-*b* via one or more reflective surface elements (e.g., reflective surface elements 210). As compared to AAUs, RISs are passive devices, so may result in little to no power consumption, thereby improving power efficiency of the network. However, as passive devices, conventional techniques used to generate beamforming configurations for AAUs may not be used in the context of RISs. For example, as passive devices, RISs may be unable to perform coherent combining in order to focus a beam.

Accordingly, the wireless communications system 200 may support communications between the base station 105-*a*, the UEs 115, and the reconfigurable surface 205-*a*. More specifically, the wireless communications system 100 may support signaling between the UEs 115-*a* and 115-*b* and the base station 105-*a* via the reconfigurable surface 205-*a* which enables for efficient precoder selection for the reconfigurable surface 205-*a*. By enabling efficient precoder selection in the context of reconfigurable surfaces 205, techniques described herein may provide for improved throughput and improved beamforming gain while simultaneously reducing power consumption associated with other reflective devices (e.g., AAUs).

For example, the reconfigurable surface 205-*a* illustrated in FIG. 2 may include an example of a RIS including a set of reflective surface elements 210. The reconfigurable surface 205-*a* may be said to be "reconfigurable" in that a phase and/or angle of reflection of signals incident on each of the reflective surface elements 210, and therefore an accumulative phase and/or angle of reflection of signals incident on the reconfigurable surface 205-*a*, may be selectively adjusted. In particular, each precoder configuration (e.g., reflection matrix configuration) associated with the reconfigurable surface may include a set of precoders associated with the set of reflective surface elements 210, where each reflective surface element 210 is associated with a respective precoder.

In this regard, the reconfigurable surface 205-*a* may be associated with a set of precoder configurations, where each precoder configuration may be represented by a vector r including a quantity of terms $r_i$ representing precoders or reflective coefficients, and where i is equivalent to a quantity of reflective surface elements 210 of the reconfigurable surface 205-*a*. In other words, a vector r for a reconfigurable surface 205-*a* including nine reflective surface elements 210 (e.g., i=9) may include nine terms (e.g., $r_1$ through $r_9$). Due to the face that the reconfigurable surface 205-*a* includes a passive device (e.g., RIS) which does not perform any signal amplification, each term $r_i$ may include a complex number satisfying $|r_i| \leq 1$. In some aspects, the vector r may be used to generate a diagonal matrix R, in which the diagonal elements of R include the terms $r_i$ of the vector r. In some aspects, the diagonal matrix R may be referred to as a precoder matrix of the reconfigurable surface 205-*a*.

In some aspects, the precoder (e.g., reflective coefficient) used by each respective reflective surface element 210 of the reconfigurable surface 205-*a* may be selected and/or modified by the base station 105-*a* in order to co-phase the reflection from each of the reflective surface elements 210 and increase (e.g., maximize) the reception power at the UE 115. In this regard, the precoder (e.g., reflective coefficient) used by each respective reflective surface element 210 of the reconfigurable surface 205-*a* may be selected and/or modified, which may effectively adjust the accumulative phase and/or accumulative angle of reflection of the reconfigurable surface 205-*a* as a whole. In some aspects, the phase and/or angle of reflection for each reflective surface element 210 may be adjusted by adjusting a resistance, a reactance, or both, of each respective reflective surface element 210. Accordingly, a precoder associated with each reflective surface element 210 may include a set of parameters associated with the reflective surface element 210, including an orientation of the reflective surface element 210, a resistance and/or reactance of the reflective surface element, or any combination thereof. In this regard, the reconfigurable surface 205-*b* may be configured to modify an angle of reflection of signals incident on the reconfigurable surface 205-*a* based on the precoders associated with each of the reflective surface elements 210, by modifying a precoder configuration used by the reconfigurable surface 205-*a*, by transitioning from a first precoder configuration to a second precoder configuration, or any combination thereof.

In some aspects, the base station 105-*a* may transmit a first control message 225-*a* to the first UE 115-*a*, the second UE 115-*b*, or both. In some aspects, the base station 105-*a* may transmit the first control message to the UEs 115-*a* and 115-*b* directly, via the reconfigurable surface 205-*a*, or both. For example, as shown in FIG. 2, the base station 105-*a* may transmit the first control message 225-*a* to the first UE 115-*a* via the reconfigurable surface 205-*a*. The first control message 225-*a* may include an RRC message, an SSB message, or both.

In some aspects, the first control message 225-*a* may include an indication of a set of precoder configurations usable by the reconfigurable surface 205-*a*. For example, the first control message 225-*a* may include an indication of a set of precoder configurations for performing a sweep procedure used for configuring the reconfigurable surface 205-*a*. In this regard, the first control message 225-*a* may include an indication of a codebook or index including a list of precoder configurations which may be used by the reconfigurable surface 205-*a* to reflect signals using the set of reflective surface elements 210.

In some aspects, each precoder configuration of the set of precoder configurations includes a set of precoders associated with the set of reflective surface elements 210 of the reconfigurable surface 205-*a*. For example, in cases where the reconfigurable surface 205-*a* includes ten reflective surface elements 210, each precoder configuration may include ten precoders, one precoder for each of the respective reflective surface elements 210.

The base station 105-*a* may additionally transmit a second control message 225-*b* to the first UE 115-*a*, the second UE 115-*b*, or both. In some aspects, the base station 105-*a* may transmit the second control message to the UEs 115-*a* and 115-*b* directly, via the reconfigurable surface 205-*a*, or both. For example, as shown in FIG. 2, the base station 105-*a* may transmit the second control message 225-*b* to the first UE 115-*a* via the reconfigurable surface 205-*a*. The second control message 225-*b* may include a downlink control information (DCI) message, a MAC-CE message, or both.

In some aspects, the second control message 225-*b* may include an indication of a one or more precoder configurations of the set of precoder configurations indicated in the first control message 225-*a* which are to be used to perform a sweep procedure for configuring the reconfigurable surface 205-*a*. In this regard, the UEs 115-*a* and 115-*b* may be configured (e.g., pre-configured via RRC signaling and/or SSB signaling) with a set of potential precoder configurations usable by the reconfigurable surface 205-*a* via the first control message 225-*a*, and may be instructed which precoder configurations are to be used by the reconfigurable surface 205-*a* for performing a sweep procedure. For example, the first control message 225-*a* may indicate two hundred precoder configurations usable by the reconfigurable surface 205-*a* for reflecting signals. In this example, the second control message 225-*b* may indicate five precoder configurations of the two hundred potential precoder configurations are to be used by the reconfigurable surface 205-*a* for performing the sweep procedure.

In some aspects, indications of precoder configurations in the first control message 225-*a* and/or the second control message 225-*b* may be indicated via index values associated with various subsets of precoder configurations listed in a look-up table. For example, the UEs 115 may be configured to utilize one or more look-up tables to determine that a first index value in the second control message 225-*b* may be associated with a first subset of precoder configurations, and a second index value in the second control message 225-*b* may be associated with a second subset of precoder configurations.

In some aspects, the first control message 225-*a*, the second control message 225-*b*, or both, may indicate a set of resources for performing the sweep procedure for configuring the reconfigurable surface 205-*a*. For example, the first control message 225-*a*, the second control message 225-*b*, or both, may include an indication of a set of time resources, a set of frequency resources, a set of spatial resources, or any combination thereof, which are associated with the sweep procedure. Additionally or alternatively, the first control message 225-*a*, the second control message 225-*b*, or both, may indicate a position (e.g., geographical position) of the reconfigurable surface 205-*a*, an orientation of the reconfigurable surface 205-*a*, or both.

In some aspects, the first UE 115-*a*, the second UE 115-*b*, or both, may receive a set of reference signals 230-*a* transmitted by the base station 105-*a* and reflected by the reconfigurable surface 205-*a*. The set of reference signals 230-*a* may be transmitted during (e.g., as part of) a sweep procedure for configuring the reconfigurable surface 205-*a*. In some aspects, the set of reference signals 230-*a* may be reflected by the reconfigurable surface 205-*a* using a set of precoder configurations indicated in the first control message 225-*a*, the second control message 225-*b*, or both. For example, the set of reference signals 230-*a* may be reflected by the reconfigurable surface 205-*a* using a subset of precoder configurations indicated in the second control message 225-*b*, where the subset of precoder configurations are included within a set of potential precoder configurations indicated in the first control message 225-*a*.

In this regard, the UEs 115-*a* and 115-*b* may receive, and the base station 105-*a* may transmit, the set of reference signals 230-*a* based on receiving or transmitting the first control message 225-*a*, receiving or transmitting the second control message 225-*b*, or both. For example, the first UE 115-*a* may receive the set of reference signals 230-*a* based on receiving the indications of the precoder configurations which are to be used for the sweep procedure, based on receiving the indication of the position and/or orientation of the reconfigurable surface 205-*a*, based on receiving the indication of the set of resources for performing the sweep procedure, or any combination thereof.

In some aspects, the set of reference signals 230-*a* may be transmitted within a set of reference signal occasions of a sweep procedure associated with configuring the reconfigurable surface 205-*a*. The sweep procedure may be used to configure the reconfigurable surface 205-*a* with different precoder configurations of the set of precoder configurations for reflecting signals at the reconfigurable surface 205-*a*. The sweep procedure may include a set of reference signal occasions in which reference signals may be transmitted (e.g., reflected) by the reconfigurable surface 205-*a* according to different precoder configurations.

For example, the second control message 225-*b* may indicate four precoder configurations which are to be used for the sweep procedure. In this example, the base station 105-*a* may transmit the set of reference signals 230-*a* within the set of reference signal occasions such that each reference signal 230-*a* of the set of reference signals 230-*a* is reflected by the reconfigurable surface 205-*a* using a different precoder configuration. For instance, the base station 105-*a* may transmit a first reference signal at a first reference signal occasion such that the reconfigurable surface 205-*a* reflects the first reference signal using a first precoder configuration. Similarly, the base station 105-*a* may transmit a second reference signal, a third reference signal, and a fourth reference signal at a second reference signal occasion, a third reference signal occasion, and a fourth reference signal occasion, respectively. In this regard, the reconfigurable surface 205-*a* may reflect each reference signal transmitted within each reference signal occasion using a respective precoder configuration (e.g., second reference signal reflected using second precoder configuration, third reference signal reflected using third precoder configuration, fourth reference signal reflected using fourth precoder configuration).

In some aspects, the set of reference signals 230-*a* may be received within the set of reference signal occasions of a first cycle of the sweep procedure for configuring the reconfigurable surface 205-*a*. In some aspects, the set of reference signals 230-*a* transmitted or received may include a set of CSI-RSs. Additionally, in some cases, the reference signals of the set of reference signals 230-*a* reflected by the reconfigurable surface 205-*a* may include a different format of reference signal as compared to reference signals which are not reflected by the reconfigurable surface 205-*a*. For example, the reference signals of the set of reference signals 230-*a* transmitted and reflected by the reconfigurable surface 205-*a* may be less complex (e.g., simpler) and may include less information as compared to reference signals which are transmitted directly from the base station 105-*a* to the first UE 115-*a* (e.g., transmitted without reflection from the reconfigurable surface 205-*a*).

Upon receiving the set of reference signals 230-*a*, the first UE 115-*a*, second UE 115-*b*, or both, may perform a set of measurements on the set of reference signals 230-*a* received during the first sweep procedure. In some aspects, the UEs 115 may perform the measurements based on receiving the first control message 225-*a*, receiving the second control message 225-*b*, receiving the set of reference signals 230-*a*, or any combination thereof. For example, the first UE 115-*a* may perform the measurements on the set of reference signals 230-*a* based on receiving the indication of the set of resources for performing the sweep procedure. The measurements performed on the set of reference signals 230-*a* may include any measurements known in the art including, but not limited to, received signal strength indicator (RSSI)

measurements, reference signal received power (RSRP) measurements, reference signal received quality (RSRQ) measurements, SNR measurements, SINR measurements, or any combination thereof.

In some aspects, the first UE 115-a, the second UE 115-b, or both, may identify at least one precoder configuration of the set of precoder configurations used for the sweep procedure. The UEs 115 may identify the at least one precoder configuration used for the sweep procedure based on performing the measurements on the set of reference signals 230-a. In particular, the UEs 115 may identify preferred precoder configurations, un-preferred precoder configurations, relative rankings between the respective precoder configurations used for the sweep procedure, or any combination thereof. For example, in cases where the set of reference signals 230-a are reflected by the reconfigurable surface 205-a using four separate precoder configurations, respectively, the first UE 115-a may determine one or more precoder configurations which results in the highest signal quality or strength, may determine a relative priority ranking (e.g., order of preference) between the four precoder configurations, or any combination thereof.

In some aspects, the first UE 115-a may transmit a feedback message 235-a to the base station 105-a. In some aspects, the first UE 115-a may transmit the feedback message 235-a to the base station 105-a via the reconfigurable surface 205-a (e.g., the feedback message 235-a may be reflected by the reconfigurable surface 205-a to the base station 105-a). The feedback message 235-a may include a CSI report. The first UE 115-a may transmit the feedback message 235-a to the base station 105-a (via the reconfigurable surface 205-a) based on receiving the first control message 225-a, receiving the second control message 225-b, receiving the set of reference signals 230-a, performing the measurements on the set of reference signals 230-a, identifying the at least one precoder configuration, or any combination thereof.

For example, in some aspects, the feedback message 235-a may include an indication of the at least one precoder configuration of the set of precoder configurations used for the sweep procedure and identified by the first UE 115-a. In this regard, the feedback message 235-a may be used to indicate to the base station 105-a which precoder configuration(s) are preferred by the first UE 115-a, which precoder configuration(s) are un-preferred by the first UE 115-a, relative priority rankings (e.g., order of preference) of the respective precoder configurations, or any combination thereof. Additionally or alternatively, the feedback message 235-a may include indications of the measurements performed on reference signals of the set of reference signals 230-a which were reflected according to the respective precoder configurations. In some cases, the indications of the identified precoder matrixes, the relative priorities or preferences of the precoder configurations, the measurements performed on the reference signals 230, or any combination thereof, may be indicated in a dedicated field (e.g., bit field) of the feedback message 235-a (e.g., dedicated field of a CSI report).

For instance, the feedback message 235-a may include an indication of a first precoder configuration and a second precoder configuration of the set of precoder configurations used for the sweep procedure when transmitting the set of reference signals 230-a. In this example, the feedback message 235-a may additionally include an indication of a priority (e.g., preference) associated with the first precoder configuration and/or second precoder configuration, an indication of measurements performed on reference signals of the set of reference signals 230-a which were reflected by the reconfigurable surface 205-a using the first precoder configuration and/or the second precoder configuration, or any combination thereof.

In some cases, the first UE 115-a may transmit the feedback message 235-a within a feedback message occasion of a second cycle of the sweep procedure, where the second cycle is subsequent to the first cycle. For example, the set of reference signals 230-a may be transmitted within a set of reference signal occasions of a first cycle of the sweep procedure. For instance, in cases where four precoder configurations are to be used for the sweep procedure, the first cycle of the sweep procedure may include four reference signal occasions, such that each reference signal occasion is associated with a respective precoder configuration. Continuing with the same example, a second cycle of the sweep procedure subsequent to the first cycle may include four feedback message occasions, such that each feedback message occasion is associated with a respective precoder configuration. In this regard, the sweep procedure may include a first cycle which cycles, or rotates, through the four respective precoder configurations, and may further include a second cycle which cycles, or rotates, through the four respective precoder configurations. The cycles of the sweep procedure will be discussed in further detail herein with respect to FIG. 3.

In some aspects, the first UE 115-a may identify at least one feedback message occasion of the second cycle of the sweep procedure that is associated with the at least one identified precoder configuration, and may transmit the feedback message 235-a within the identified feedback message occasion of the second cycle of the sweep procedure. For example, in case where the sweep procedure includes four separate precoder configurations, the first UE 115-a may identify that a second reference signal of the set of reference signals 230-a received within a second reference signal occasion using a second precoder configuration results in the highest signal performance (e.g., highest signal strength, highest signal quality) at the first UE 115-a. In this example, the first UE 115-a may identify that a second feedback message occasion of the second cycle of the sweep procedure is associated with the second precoder configuration, and may thereby transmit the feedback message 235-a within the second feedback message occasion of the second cycle of the sweep procedure.

Similarly, the second UE 115-b may additionally transmit a feedback message to the base station 105-a. In some aspects, the second UE 115-a may transmit the feedback message to the base station 105-a via the reconfigurable surface 205-a (e.g., the feedback message may be reflected by the reconfigurable surface 205-a to the base station 105-a). The feedback message may include a CSI report. As noted previously herein with respect to the feedback message 235-a transmitted by the first UE 115-a, the second UE 115-b may transmit the feedback message to the base station 105-a (via the reconfigurable surface 205-a) based on receiving the first control message 225-a, receiving the second control message 225-b, receiving the set of reference signals 230-a, performing the measurements on the set of reference signals 230-a, identifying the at least one precoder configuration, or any combination thereof.

In some aspects, the feedback message transmitted by the second UE 115-b may be used to indicate to the base station 105-a which precoder configuration(s) are preferred by the second UE 115-b, which precoder configuration(s) are un-preferred by the second UE 115-b, relative priority rankings (e.g., order of preference) of the respective precoder configurations, or any combination thereof. Additionally or alternatively, the feedback message may include indications of the measurements performed on reference signals which were reflected according to the respective precoder configurations. In some aspects, the precoder configurations (e.g., preferred precoder configurations, un-preferred precoder configurations) which are indicated via the feedback messages transmitted by the first and second UEs 115 may be the same or different.

Upon receiving the feedback message 235-*a* from the first UE 115-*a* and/or receiving a feedback message from the second UE 115-*b*, the base station 105-*a* may identify a precoder configuration which will be used by the reconfigurable surface 205-*c* for reflecting downlink transmissions 240 to the first UE 115-*a*, the second UE 115-*b*, or both. In some aspects, the base station 105-*a* may determine the precoder configuration at 440 based on receiving the feedback messages from the UEs 115 at 430 and 435. For example, the base station 105-*a* may determine the precoder configuration which will be used by the reconfigurable surface 205-*a* based on the indications of preferred or un-preferred precoders in the feedback messages (e.g., feedback message 235-*a*), the indications of the relative priorities of the precoder configurations in the feedback messages (e.g., feedback message 235-*a*), or any combination thereof.

Subsequently, the base station 105-*a* may transmit one or more downlink transmissions 240 to the first UE 115-*a* and/or the second UE 115-*b* via the identified precoder configuration. The one or more downlink transmissions 240 may be reflected by the reconfigurable surface 205-*a* (e.g., RIS) using the identified precoder configuration.

In some cases, it may be beneficial to fine-tune the precoder configuration which will be used by the reconfigurable surface 205-*a* by performing channel estimation using the determined precoder configuration. For example, in some cases, the first UE 115-*a* may receive an additional reference signal 245 from the base station 105-*a*. In some aspects, the additional reference signal 245 may be reflected by the reconfigurable surface 205-*a* using the at least one precoder indicated in the feedback message 235-*a* transmitted by the first UE 115-*a*. In this regard, the additional reference signal 245 may be transmitted by the base station 105-*a* and reflected by the reconfigurable surface 205-*c* using a preferred precoder configuration which was identified by the first UE 115-*a* and indicated in the feedback message 235-*a*. In some aspects, the additional reference signal 245 may include a CSI-RS.

Continuing with the same example, the first UE 115-*a* may transmit a second feedback message 235-*b* to the base station 105-*c* based on (e.g., in response to) receiving the additional reference signal 245. In some aspects, the second feedback message 235-*b* may be transmitted by the first UE 115-*a* to the base station 105-*a* via the reconfigurable surface 205-*a*. The second feedback message 235-*b* may include a CSI report, and may include data indicative of channel state information between the base station 105-*a* and the reconfigurable surface 205-*a*, between the reconfigurable surface 205-*a* and the first UE 115-*a*, or both. In this regard, the base station 105-*a* and the first UE 115-*a* may exchange the additional reference signal 245 and the second feedback message 235-*b* in order to estimate the channel between the base station 105-*a*, the reconfigurable surface 205-*a*, the first UE 115-*a*, or any combination thereof. More particularly, the base station 105-*a* and the first UE 115-*a* may exchange the additional reference signal 245 and the second feedback message 235-*b* in order to estimate the channel using the at least one precoder configuration indicated in the feedback message 235-*a* transmitted by the first UE 115-*a*.

In some aspects, the base station 105-*c* may be configured to utilize the data indicative of the channel state information indicated in the second feedback message 235-*b* in order to perform channel estimation. Additionally, by performing channel estimation for wireless communications carried out via the reconfigurable surface 205-*a* using the at least one precoder configuration, the base station 105-*a* may be configured to adjust (e.g., optimize) the precoder configuration used by the reconfigurable surface 205-*a* in order to improve wireless communications. For example, by performing channel estimation, the base station 105-*a* may be configured to selectively adjust one or more precoders (e.g., reflective coefficients) associated with one or more reflective surface elements of the reconfigurable surface 205-*a* in order to improve the efficiency and reliability of wireless communications. The base station 105-*a* may then transmit downlink transmissions 240 to the UEs 115-*a* and/or 115-*b* based on modifying the precoder configuration used by the reconfigurable surface 205-*a* in response to the channel estimations.

In additional or alternative cases, the base station 105-*a* and the first UE 115-*b* may adjust (e.g., modify, optimize) the precoder configuration identified during the first sweep procedure (e.g., based on the set of reference signals 230-*a* and feedback message 235-*a*) by performing additional sweep procedures (e.g., fine-tuning sweep procedures). For example, the first UE 115-*a* may receive a second set of reference signals 230-*b* transmitted by the base station 105-*a* and reflected by the reconfigurable surface 205-*a*. The second set of reference signals 230-*b* may be transmitted during (e.g., as part of) a second sweep procedure for configuring the reconfigurable surface 205-*a*. In some aspects, the base station 105-*a* may transmit, and the first UE 115-*a* may receive, the second set of reference signals 230-*b* based on transmitting or receiving the first control message 225-*a*, transmitting or receiving the second control message 225-*b*, performing the measurements on the set of reference signals 230-*a*, identifying the at least one precoder configuration, transmitting or receiving the feedback message 235-*a*, or any combination thereof.

In some aspects, the second set of reference signals 230-*b* may be transmitted within a second set of reference signal occasions of a second sweep procedure associated with configuring the reconfigurable surface 205-*a*. For example, the set of reference signals 230-*a* and feedback message 235-*a* may be transmitted and received during first sweep procedure associated with configuring the reconfigurable surface 205-*a*, and the second set of reference signals 230-*b* may be transmitted and received in a second sweep procedure associated with configuring (e.g., fine-tuning) the reconfigurable surface 205-*a*.

In some aspects, the second set of reference signals 230-*b* may be reflected by the reconfigurable surface 205-*a* using a second set of precoder configurations indicated in the first control message 225-*a*, the second control message 225-*b*, a different control message, or any combination thereof. The second set of precoder configurations used to reflect the second set of reference signals 230-*b* may be different from the set of precoder configurations used to reflect the set of reference signals 230-*a*. In some cases, the base station 105-*a* may identify or generate the second set of precoder configurations based on the at least one precoder configuration identified in the feedback message 235-*a* received from the first UE 115-*a* during the first sweep procedure. For example, the base station 105-*a* may make one or more small adjustments to the at least one precoder configuration identified in the feedback message 235-*a* in order to identify or generate the second set of precoder configurations. In this regard, the second set of precoder configurations may each include slight variations of the at least one identified precoder configuration, in which one or more parameters of the at least one identified precoder configuration have been modified.

Moreover, in some cases, the second set of precoder configurations used to reflect the second set of reference signals 230-*b* may include precoder configurations which are not included in a configured codebook or index of potential precoder configurations usable by the reconfigurable surface 205-*a*. For example, the first control message 225-*a* (e.g., RRC message, SSB message) may include indicate a set of precoder configurations usable by the reconfigurable surface 205-*a* for performing sweep procedures. In this example, the set of precoder configurations used to reflect the set of reference signals 230-*a* may be included within the precoder configurations indicated in the first control message 225-*a*, and the second set of precoder configurations used to reflect the second set of reference signals 230-*b* may not be included within the precoder configurations indicated in the first control message 225-*b*. For instance, in cases where the base station 105-*a* makes small modifications to the at least one identified precoder configuration identified in the feedback message 235-*a* to identify or generate the second set of precoder configurations, the second set of precoder configurations may not be included within a set of potential precoder configurations which were identified (e.g., configured) via the first control message 225-*a*.

In some aspects, the set of reference signals 230-*a* transmitted within the first sweep procedure may include a different format than the second set of reference signals 230-*b* transmitted within the second sweep procedure. For example, the set of reference signals 230-*a* may include a first format, and the second set of reference signals 230-*b* may include a second format which is different from the first format. For instance, the first format associated with the set of reference signals 230-*a* may be limited in the frequency domain to a few consecutive resource blocks and/or may be more sparse in the frequency domain and/or time domain as compared to the second format associated with the second set of reference signals 230-*b*.

In some aspects, the first UE 115-*a* may perform a set of measurements on the second set of reference signals 230-*b* received during the second sweep procedure. In some aspects, the first UE 115-*a* may perform the measurements based on receiving the first control message 225-*a*, receiving the second control message 225-*b*, receiving the second set of reference signals 230-*b*, or any combination thereof. For example, the first UE 115-*a* may perform the measurements on the second set of reference signals 230-*b* based on receiving a control message (e.g., first control message 225-*a*, second control message 225-*c*, a different control message) including an indication of a set of resources for performing the second sweep procedure. The measurements performed on the second set of reference signals 230-*b* may include any measurements known in the art including, but not limited to, RSSI measurements, RSRP measurements, RSRQ measurements, SNR measurements, SINR measurements, or any combination thereof.

In some aspects, the first UE 115-*a* may identify at least one precoder configuration of the second set of precoder configurations used to reflect the second set of reference signals 230-*b* during the second sweep procedure. The first UE 115-*a* may identify the at least one precoder configuration used for the second sweep procedure based on performing the measurements on the second set of reference signals 230-*b*. In particular, the first UE 115-*a* may identify preferred precoder configurations, un-preferred precoder configurations, relative rankings between the respective precoder configurations used for the second sweep procedure, or any combination thereof. For example, in cases where the second set of reference signals 230-*b* are reflected by the reconfigurable surface 205-*a* using four separate precoder configurations (e.g., second set of precoder configurations includes four separate precoder configurations), respectively, the first UE 115-*a* may determine one or more precoder configurations from the second set of precoder configurations which results in the highest signal quality or strength, may determine a relative priority ranking (e.g., order of preference) between the four precoder configurations, or any combination thereof.

Upon identifying the at least one precoder configuration of the second set of precoder configurations, the first UE 115-*a* may transmit a feedback message 235-*c* to the base station 105-*a*. In some aspects, the first UE 115-*a* may transmit the feedback message 235-*c* to the base station 105-*a* via the reconfigurable surface 205-*a* (e.g., the feedback message 235-*c* may be reflected by the reconfigurable surface 205-*a* to the base station 105-*a*). The feedback message 235-*c* may include a CSI report. The first UE 115-*a* may transmit the feedback message 235-*c* to the base station 105-*a* (via the reconfigurable surface 205-*a*) based on receiving the first control message 225-*a*, receiving the second control message 225-*b*, receiving the second set of reference signals 230-*b*, performing the measurements on the second set of reference signals 230-*b*, identifying the at least one precoder configuration of the second set of precoder configurations, or any combination thereof.

In some aspects, the feedback message 235-*c* transmitted by the first UE 115-*a* may be used to indicate to the base station 105-*a* which precoder configuration(s) from the second set of precoder configurations are preferred by the first UE 115-*a*, which precoder configuration(s) from the second set of precoder configurations are un-preferred by the second UE 115-*b*, relative priority rankings (e.g., order of preference) of the respective precoder configurations from the second set of precoder configurations, or any combination thereof. Additionally or alternatively, the feedback message 235-*c* may include indications of the measurements performed on reference signals of the second set of reference signals 230-*b* which were reflected according to the respective precoder configurations from the second set of precoder configurations.

In some aspects, the base station 105-*a* may determine one or more precoder configurations which are to be used by the reconfigurable surface 205-*c* for transmitting downlink transmissions 240 between the base station 105-*a* and the first UE 115-*a*, the second UE 115-*b*, or both, based on receiving feedback messages 235 from the first UE 115-*a* and/or the second UE 115-*b*. In particular, the base station 105-*a* may determine the one or more precoder configurations which will be used by the reconfigurable surface 205-*a* based on the indications of the preferred or un-preferred precoder configurations identified by the respective UEs 115.

For example, in cases where both the first UE 115-*a* and the second UE 115-*b* identify the same precoder configuration as a preferred precoder configuration, the base station 105-*a* may determine the identified precoder configuration as the precoder configuration to be used by the reconfigurable surface 205-*a*. By way of another example, the first UE 115-*b* may identify a first precoder configuration as a preferred precoder configuration, and may indicate that a second precoder configuration is the second preferred precoder configuration. Comparatively, the second UE 115-*b* may identify a third precoder configuration as a preferred precoder configuration, and may indicate that the second precoder configuration is the second preferred precoder configuration. In this example, the base station 105-*a* may identify the second precoder configuration as the precoder configuration which will be used by the reconfigurable surface 205-*a* due to the fact that both UEs 115 identified the second precoder configuration as exhibiting sufficient performance for efficient and reliable communications.

In some aspects, the base station 105-*a* may report the one or more precoder configurations which will be used by the reconfigurable surface 205-*a* for downlink transmissions 240 to the first UE 115-*a*, the second UE 115-*b*, or both. In this regard, the base station 105-*c* may inform the UEs 115 which precoder configuration will be used by the reconfigurable surface 205-*a* for communicating with the base station 105-*a* via the reconfigurable surface 205-*a*.

In some aspects, the first UE 115-*a*, the second UE 115-*b*, or both, may communicate with the base station 105-*a* based on the one or more precoder configurations determined by the base station 105-*b*. In this regard, the UEs 115-*a* and/or 115-*b* may receive downlink transmissions from the base station 105-*a* which are reflected by the reconfigurable surface 205-*a* using the determined precoder configuration. Accordingly, the UEs 115 may communicate with the base station 105-*a* via the reconfigurable surface 205-*a* based on transmitting the respective feedback messages 235 including the indications of the preferred or un-preferred precoder configurations and/or priorities of precoder configurations.

It is noted herein that FIG. 2 is shown and described as including signaling which is used to configure the reconfigurable surface 205-*a* for downlink transmissions. Additional aspects of the present disclosure may additionally be understood to support signaling which is used to configure the reconfigurable surface 205-*a* for uplink transmissions. For example, when configuring the reconfigurable surface for uplink transmissions, the first UE 115-*a* may transmit sets of reference signals 230 to the base station 105-*a* via the reconfigurable surface during one or more sweep procedures. The base station 105-*a* may perform measurements on the received reference signals 230, and may determine (e.g., select) precoder configurations which will be used by the reconfigurable surface 205-*a* for reflecting uplink transmissions from the first UE 115-*a* and/or the second UE 115-*b* to the base station 105-*b*. In this regard, any discussion associated with the process of configuring the reconfigurable surface 205-*a* for downlink transmissions 240 may additionally be understood as applying to the process of configuring the reconfigurable surface 205-*a* for uplink transmissions.

In some aspects, the reconfigurable surface 205-*a* may be configured with a common precoder configuration for reflecting uplink transmissions and downlink transmissions. Additionally or alternatively, the reconfigurable surface 205-*a* may be configured with different precoder configurations for performing uplink transmissions and downlink transmissions. Techniques for configuring the reconfigurable surface 205-*a* for downlink transmissions are described in further detail herein with respect to FIG. 4. Comparatively, techniques for configuring the reconfigurable surface 205-*a* for uplink transmissions are described in further detail herein with respect to FIG. 5.

Techniques described herein may support signaling which enables for improved precoder configuration selection for the reconfigurable surface 205-*a*. By enabling for improved precoder configuration selection, techniques described herein may increase throughput within the wireless communications system 200 and provide for improved beamforming gain. Additionally, the techniques described herein may enable the base station 105-*a* to circumvent obstructions which would otherwise interrupt wireless communications, thereby increasing a quantity of UEs 115 which may be communicatively coupled to the network. Furthermore, by improving precoder configuration selection of the passive reconfigurable surface 205-*a* (e.g., RIS), techniques described herein may reduce a power consumption which is associated with active reconfigurable surfaces (e.g., AAUs), thereby improving the overall power efficiency of the wireless communications system.

Figure 3:
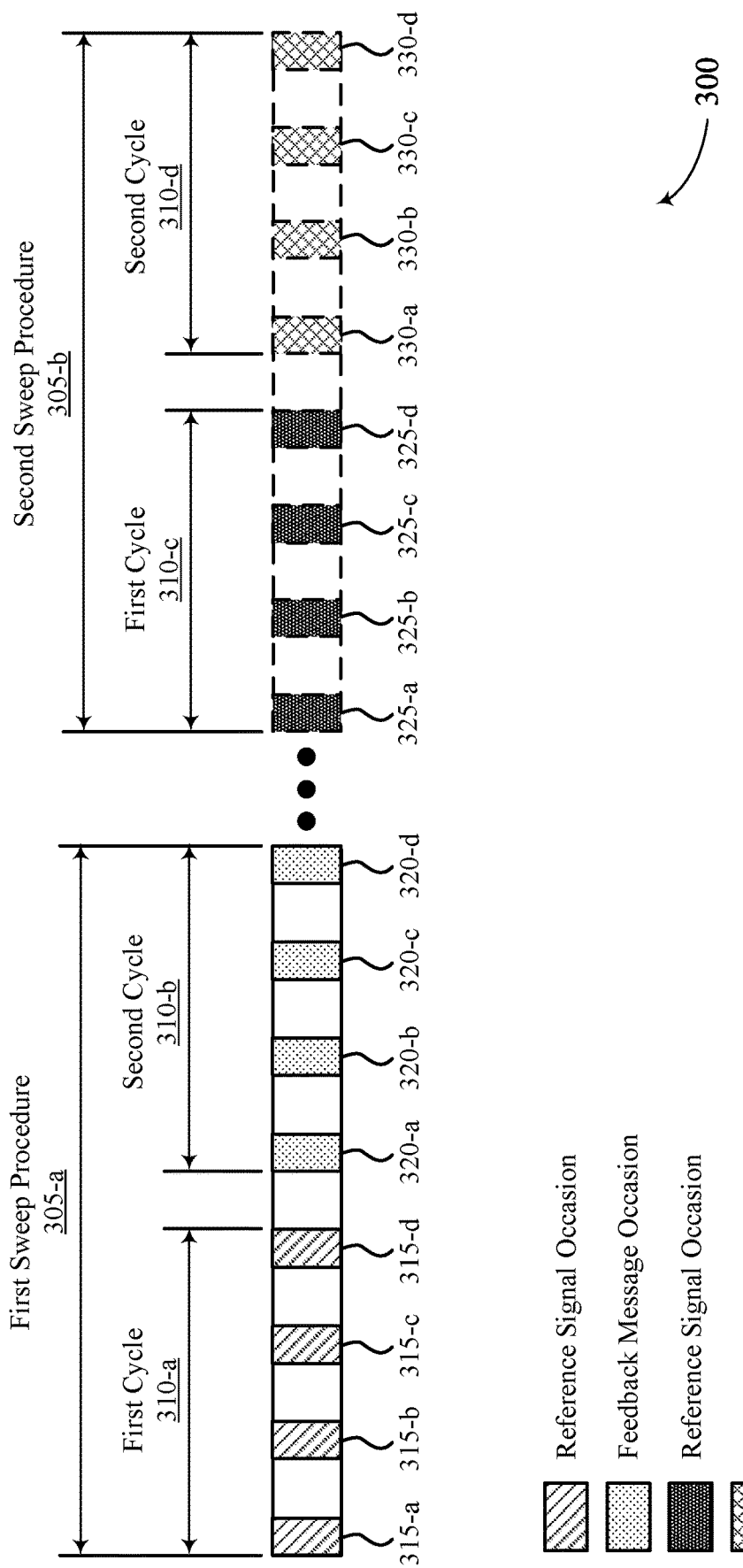
FIG. 3 illustrates an example of a schematic diagram that supports techniques for communicating using a reconfigurable surface in accordance with aspects of the present disclosure.

FIG. 3 illustrates an example of a schematic diagram 300 that supports techniques for communicating using a reconfigurable surface in accordance with aspects of the present disclosure. In some examples, schematic diagram 300 may implement, or be implemented by, aspects of wireless communications system 100, wireless communications system 200, or both. In some aspects, the schematic diagram 300 illustrates sweep procedures for configuring a reconfigurable surface 205-*a* for uplink and/or downlink transmissions.

In some aspects, techniques described herein are directed to the use of sweep procedures 305 for configuring a reconfigurable surface 205 to reflect uplink and/or downlink transmissions. In some cases, a reconfigurable surface 205 may be configured to reflect uplink and/or downlink transmissions via signaling carried out within a first sweep procedure 305-*a*, a second sweep procedure 305-*b*, or both. In some aspects, the first sweep procedure 305-*a* may include a first cycle 310-*a* including a set of reference signal occasions 315. The first sweep procedure 305-*a* may additionally include a second cycle 310-*b* subsequent to the first cycle 310-*a*, where the second cycle 310-*b* includes a set of feedback message occasions 320. Similarly, the second sweep procedure 305-*b* may include a first cycle 310-*c* including a set of reference signal occasions 325, and a second cycle 310-*d* including a set of feedback message occasions 330.

In the context of configuring a reconfigurable surface 205 to reflect downlink transmissions, the sets of reference signal occasions 315 and 325 may be used by a base station 105 to transmit reference signals to UEs 115, and the sets of feedback message occasions 320 and 330 may be used by the UEs 115 to transmit feedback messages to the base station 105 in response to the received reference signals. Conversely, in the context of configuring a reconfigurable surface 205 to reflect uplink transmissions, the sets of reference signal occasions 315 and 325 may be used by UEs 115 to transmit reference signals to the base station 105, and the sets of feedback message occasions 320 and 330 may be used by the base station 105 to transmit feedback messages to the UEs 115 in response to the received reference signals.

For example, in the context of configuring a reconfigurable surface 205 for downlink transmissions, a UE 115 may receive a set of reference signals transmitted by a base station 105-*b* and reflected by a reconfigurable surface 205 during (e.g., as part of) the first sweep procedure 305-*a* for configuring the reconfigurable surface 205. In some aspects, the set of reference signals may be reflected by the reconfigurable surface 205 using a set of precoder configurations indicated in control messages (e.g., RRC messages, SSB messages, DCI messages, MAC-CE messages). In some aspects, the set of reference signals may be transmitted (e.g., reflected) within the set of reference signal occasions 315 of the first sweep procedure 305-*a* associated with configuring the reconfigurable surface 205

For example, the control signaling may be used to indicate to the UE 115 that four precoder configurations associated with the reconfigurable surface 205 are to be used (e.g., tested) for the first sweep procedure 305-*a*. In this example, the base station 105 may transmit the set of reference signals within the set of reference signal occasions 315 such that each reference signal is reflected by the reconfigurable surface 205 using a different precoder configuration. For instance, the base station 105 may transmit a first reference signal at a first reference signal occasion 315-*a* of the first sweep procedure 305-*a* such that the reconfigurable surface 205 reflects the first reference signal within the first reference signal occasion 315-*a* using a first precoder configuration. Similarly, the base station 105 may transmit a second reference signal, a third reference signal, and a fourth reference signal at a second reference signal occasion 315-*b*, a third reference signal occasion 315-*c*, and a fourth reference signal occasion 315-*d*, respectively. In this regard, the reconfigurable surface 205 may reflect each reference signal transmitted within each reference signal occasion 315 using a respective precoder configuration. For instance, the second reference signal may be reflected within the second reference signal occasion 315-*b* using the second precoder configuration, the third reference signal may be reflected within the third reference signal occasion 315-*c* using the third precoder configuration, and the fourth reference signal may be reflected within the fourth reference signal occasion 315-*d* using the fourth precoder configuration.

In some aspects, the UE 115 may be configured to perform measurements on the reference signals received within the reference signal occasions 315 of the first sweep procedure 305-*a*. In particular, the UE 115 may be configured to perform the measurements in order to identify one or more preferred precoder configurations used within the first sweep procedure 305-*a*, one or more un-preferred precoder configurations used within the first sweep procedure 305-*a*, a relative priority (e.g., ranking) of the precoder configurations used within the first sweep procedure 305-*a*, or any combination thereof.

For example, the UE 115 may determine that the second reference signal transmitted (e.g., reflected) within the second reference signal occasion 315-*b* exhibits the highest signal quality or strength, and may therefore identify the second precoder as the best (e.g., preferred) precoder. In this example, the UE 115 may additionally determine a relative priority of the remaining precoder configurations in the order of the first precoder configuration, the fourth precoder configuration, and the third precoder configuration, indicating that the first precoder configuration is the next best, followed by the fourth precoder configuration, and finally the third precoder configuration.

Upon identifying the at least one precoder configuration used within the first sweep procedure 305-*a*, the UE 115 may transmit a feedback message to the base station 105. In some aspects, the UE 115 may transmit the feedback message may include an indication of the at least one precoder configuration of the set of precoder configurations used for the first sweep procedure 305-*a*. In this regard, the feedback message may be used to indicate to the base station 105 which precoder configuration(s) used in the first sweep procedure 305-*a* are preferred by the UE 115, which precoder configuration(s) used in the first sweep procedure 305-*a* are un-preferred by the UE 115, a relative priority rankings (e.g., order of preference) of the respective precoder configurations used in the first sweep procedure 305-*a*, or any combination thereof. Additionally or alternatively, the feedback message may include indications of the measurements performed on reference signals which were reflected according to the respective precoder configurations.

For example, continuing with the same example above in which the second precoder exhibits the highest signal quality or performance, the feedback message may include an indication of a priority or preference of the second precoder configuration over the other precoder configurations. The feedback message may further indicate a relative priority of the remaining precoder configurations, an indication of measurements performed on reference signals which were reflected by the reconfigurable surface 205 using the respective precoder configurations, or any combination thereof.

In some cases, the UE 115 may transmit the feedback message within a feedback message occasion 320 of the second cycle 310-*b* of the first sweep procedure 305-*a*. As shown in FIG. 3, the second cycle 310-*b* may be subsequent to the first cycle 310-*a*. In some aspects, each of the feedback message occasions 320 may be associated with a different precoder configuration used to transmit (e.g., reflect) the reference signals within the reference signal occasions 315. For instance, as described previously herein, the first reference signal occasion 315-*a* may be associated with the first precoder configuration, the second reference signal occasion 315-*b* may be associated with the second precoder configuration, the third reference signal occasion 315-*c* may be associated with the third precoder configuration, and the fourth reference signal occasion 315-*d* may be associated with the fourth precoder configuration. In this example, the first feedback message occasion 320-*a* may be associated with the first precoder configuration, the second feedback message occasion 3120-*b* may be associated with the second precoder configuration, the third feedback message occasion 320-*c* may be associated with the third precoder configuration, and the fourth feedback message occasion 320-*d* may be associated with the fourth precoder configuration. In this regard, the reference signal occasions 315 and feedback message occasions 320 may be arranged such that the first sweep procedure 305-*a* cycles, or rotates, through the respective precoder configurations associated with the respective reference signal occasions 315 and feedback message occasions 320.

In some aspects, the UE 115 may identify at least one feedback message occasion 320 of the second cycle 310-*b* of the first sweep procedure 305-*a* that is associated with the at least one identified precoder configuration, and may transmit the feedback message within the identified feedback message occasion 320 of the second cycle 310-*b* of the first sweep procedure 305-*a*. For example, in the case where the first sweep procedure 305-*a* includes four separate precoder configurations, the UE 115 may identify that a second reference signal received within the second reference signal occasion 315-*b* using the second precoder configuration results in the highest signal performance (e.g., highest signal strength, highest signal quality) at the UE 115. In this example, the UE 115 may identify that the second feedback message occasion 320-*b* of the second cycle 310-*b* of the first sweep procedure 305-*a* is associated with the second precoder configuration, and may thereby transmit the feedback message within the second feedback message occasion 320-*b* of the second cycle 310-*b* of the first sweep procedure 305-*a*.

In some aspects, upon receiving the feedback message within the second cycle 310-*b* of the first sweep procedure 305-*a*, the base station 105 may be configured to determine (e.g., select) a precoder configuration which will be used by the reconfigurable surface 205 to reflect downlink transmissions to the UE 115. In some cases, the base station 105 may determine the precoder configuration based on the indications of precoder configurations included within the feedback message (e.g., indications of preferred precoder configurations, un-preferred precoder configurations, relative priorities of precoder configurations, or any combination thereof). In this regard, in some cases, the base station 105 may determine the precoder configuration based identifying the feedback message occasion 320 in which the feedback message was received.

In some cases, as described previously herein, the base station 105 and the UE 115 may be configured to perform a second sweep procedure 305-*b* to modify (e.g., fine-tune) the precoder configuration determined as a result of the first sweep procedure 305-*a*. For example, the base station 105 may identify or generate a second set of precoder configurations based on the precoder configuration which was determined based on the first sweep procedure 305-*a*. The base station 105 may identify the second set of precoder configurations by selectively modifying one or more parameters of the first precoder configuration, such that each precoder configuration of the second set of precoder configurations includes a slight modification of the precoder configuration determined based on the first sweep procedure 305-*a*.

Upon identifying the second set of precoder configurations to be used for the second sweep procedure 305-*b*, the base station 105 may transmit a second set of reference signals at the respective reference signal occasions 325 of the first cycle 310-*c* of the second sweep procedure 305-*b*. Each reference signal of the second set of reference signals may be transmitted (e.g., reflected) in a respective reference signal occasion 325 according to a respective precoder configuration of the second set of precoder configurations. It is noted herein that the quantities of precoder configurations within the first and second sets of precoder configurations may be the same or different.

Continuing with reference to the second sweep procedure 305-*b*, the UE 115 may perform measurements on the reference signals received within the first cycle 310-*c* of the second sweep procedure 305-*b*, and may identify one or more precoder configurations of the second set of precoder configurations. In particular, the UE 115 may identify preferred precoder configurations of the second set of precoder configurations, un-preferred precoder configurations of the second set of precoder configurations, a relative priority of the precoder configurations of the second set of precoder configurations, or any combination thereof. The UE 115 may then transmit a feedback message indicating the one or more identified precoder configurations within a feedback message occasion 330 of the second cycle 310-*d* of the second sweep procedure 305-*b*. In some aspect, the UE 115 may transmit the feedback message within the feedback message occasions 330 which is associated with the one or more identified precoder configurations, as described previously herein.

Figure 4:
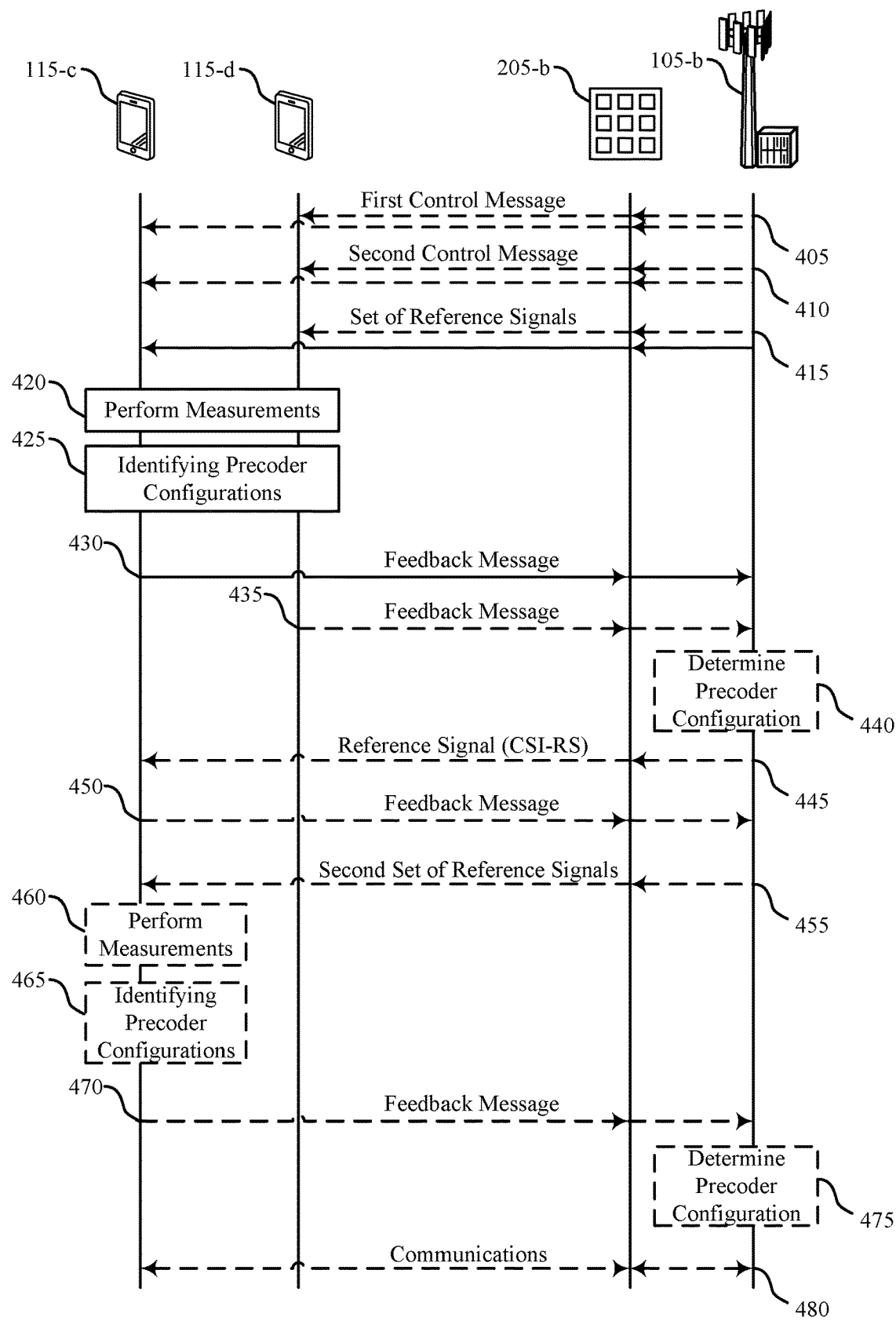
FIG. 4 illustrates an example of a process flow that supports techniques for communicating using a reconfigurable surface in accordance with aspects of the present disclosure.

FIG. 4 illustrates an example of a process flow 400 that supports techniques for communicating using a reconfigurable surface in accordance with aspects of the present disclosure. In some examples, process flow 400 may implement, or be implemented by, aspects of wireless communications system 100, wireless communications system 200, schematic diagram 300, or any combination thereof. In particular, the process flow 400 may implement, or be implemented by, aspects of wireless communications system 100, wireless communications system 200, schematic diagram 300, or any combination thereof, in order to configure reconfigurable surfaces 205 for downlink transmissions. For example, the process flow 400 may illustrate a UE 115 *c* receiving a first set of reference signals from a base station 105-*b* via a reconfigurable surface 205-*b*, performing measurements on the first set of reference signals, transmitting a feedback message to the base station 105-*b*, and communicating with the base station 105-*b* via the reconfigurable surface 205-*b* based on the transmitted feedback message, as described with reference to FIGS. 1-3, among other aspects.

The process flow 400 may include a first UE 115-*c*, a second UE 115-*d*, a reconfigurable surface 205-*b*, and a base station 105-*b*, which may be examples of UEs 115, reconfigurable surfaces 205, and base stations 105, as described with reference to FIGS. 1-3. In some cases, the reconfigurable surface 205-*b* may include an example of a RIS including a set of reflective surface elements, as described in further detail herein with reference to FIG. 2. The reconfigurable surface 205-*b* may be said to be "reconfigurable" in that an angle of reflection of signals incident on each of the reflective surface elements, and therefore an accumulative angle of reflection of signals incident on the reconfigurable surface 205-*b*, may be selectively adjusted. In particular, a precoder (e.g., reflective coefficient) used by each respective reflective surface element of the reconfigurable surface 205-*b* may be selected and/or modified, which may effectively adjust the accumulative angle of reflection of the reconfigurable surface 205-*b* as a whole. In this regard, the reconfigurable surface 205-*b* may be configured to modify an angle of reflection of signals incident on the reconfigurable surface 205-*b* based on the precoders associated with each of the reflective surface elements, by modifying a precoder configuration used by the reconfigurable surface 205-*b*, by transitioning from a first precoder configuration to a second precoder configuration, or any combination thereof.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the base station 105-*b* may transmit a first control message to the first UE 115-*c*, the second UE 115-*d*, or both. In some aspects, the base station 105-*b* may transmit the first control message to the UEs 115-*c* and 115-*d* directly, via the reconfigurable surface 205-*b*, or both. The first control message may include an RRC message, an SSB message, or both.

In some aspects, the first control message may include an indication of a set of precoder configurations usable by the reconfigurable surface. For example, the first control message may include an indication of a set of precoder configurations for performing a sweep procedure used for configuring the reconfigurable surface. In this regard, the first control message may include an indication of a codebook or index including a list of precoder configurations which may be used by the reconfigurable surface 205-*b* to reflect signals using the set of reflective surface elements. In some aspects, each precoder configuration of the set of precoder configurations includes a set of precoders associated with the set of reflective surface elements of the reconfigurable surface 205-*b*. For example, in cases where the reconfigurable surface includes ten reflective surface elements, each precoder configuration may include ten precoders, one precoder for each of the respective reflective surface elements.

At 410, the base station 105-*b* may transmit a second control message to the first UE 115-*c*, the second UE 115-*d*, or both. In some aspects, the base station 105-*b* may transmit the second control message to the UEs 115-*c* and 115-*d* directly, via the reconfigurable surface 205-*b*, or both. The second control message may include a DCI message, a MAC-CE message, or both.

In some aspects, the second control message may include an indication of a one or more precoder configurations of the set of precoder configurations indicated in the first control message which are to be used to perform a sweep procedure for configuring the reconfigurable surface 205-*b*. In this regard, the UEs 115-*c* and 115-*d* may be configured (e.g., pre-configured via RRC signaling and/or SSB signaling) with a set of potential precoder configurations usable by the reconfigurable surface 205-*b* via the first control message, and may be instructed which precoder configurations are to be used by the reconfigurable surface for performing a sweep procedure. For example, the first control message may indicate two hundred precoder configurations usable by the reconfigurable surface 205-*b* for reflecting signals. In this example, the second control message may indicate five precoder configurations of the two hundred potential precoder configurations are to be used by the reconfigurable surface 205-*b* for performing the sweep procedure.

In some aspects, indications of precoder configurations in the first control message and/or the second control message may be indicated via index values associated with various subsets of precoder configurations listed in a look-up table. For example, the UEs 115 may be configured to utilize one or more look-up tables to determine that a first index value in the second control message may be associated with a first subset of precoder configurations, and a second index value in the second control message may be associated with a second subset of precoder configurations.

In some aspects, the first control message received at 405, the second control message received at 410, or both, may indicate a set of resources for performing the sweep procedure for configuring the reconfigurable surface 205-*b*. For example, the first control message, the second control message, or both, may include an indication of a set of time resources, a set of frequency resources, a set of spatial resources, or any combination thereof, which are associated with the sweep procedure. Additionally or alternatively, the first control message, the second control message, or both, may indicate a position (e.g., geographical position) of the reconfigurable surface 205-*b*, an orientation of the reconfigurable surface 205-*b*, or both.

At 415, the first UE 115-*b*, the second UE 115-*b*, or both, may receive a set of reference signals transmitted by the base station 105-*b* and reflected by the reconfigurable surface 205-*b*. The set of reference signals may be transmitted during (e.g., as part of) a sweep procedure for configuring the reconfigurable surface 205-*b*. In some aspects, the set of reference signals may be reflected by the reconfigurable surface 205-*b* using a set of precoder configurations indicated in the first control message, the second control message, or both. For example, the set of reference signals may be reflected by the reconfigurable surface 205-*b* using a subset of precoder configurations indicated in the second control message, where the subset of precoder configurations are included within a set of potential precoder configurations indicated in the first control message.

In this regard, the UEs 115-*c* and 115-*d* may receive, and the base station 105-*b* may transmit, the set of reference signals at 415 based on receiving or transmitting the first control message at 405, receiving or transmitting the second control message at 410, or both. For example, the UEs 115-*c* and/or 115-*d* may receive the set of reference signals at 415 based on receiving the indications of the precoder configurations which are to be used for the sweep procedure, based on receiving the indication of the position and/or orientation of the reconfigurable surface 205-*b*, based on receiving the indication of the set of resources for performing the sweep procedure, or any combination thereof.

In some aspects, the set of reference signals may be transmitted within a set of reference signal occasions of a sweep procedure associated with configuring the reconfigurable surface 205-*b*. The sweep procedure may be used to configure the reconfigurable surface 205-*b* with different precoder configurations of the set of precoder configurations for reflecting signals at the reconfigurable surface 205-*b*. The sweep procedure may include a set of reference signal occasions in which reference signals may be transmitted (e.g., reflected) by the reconfigurable surface 205-*b* according to different precoder configurations.

For example, the second control message may indicate four precoder configurations which are to be used for the sweep procedure. In this example, the base station 105-*b* may transmit the set of reference signals within the set of reference signal occasions such that each reference signal is reflected by the reconfigurable surface 205-*b* using a different precoder configuration. For instance, the base station 105-*b* may transmit a first reference signal at a first reference signal occasion such that the reconfigurable surface 205-*b* reflects the first reference signal using a first precoder configuration. Similarly, the base station 105-*b* may transmit a second reference signal, a third reference signal, and a fourth reference signal at a second reference signal occasion, a third reference signal occasion, and a fourth reference signal occasion, respectively. In this regard, the reconfigurable surface 205-*b* may reflect each reference signal transmitted within each reference signal occasion using a respective precoder configuration (e.g., second reference signal reflected using second precoder configuration, third reference signal reflected using third precoder configuration, fourth reference signal reflected using fourth precoder configuration).

In some aspects, the set of reference signals received at 415 may be received within the set of reference signal occasions of a first cycle of the sweep procedure for configuring the reconfigurable surface 205-*b*. In some aspects, the set of reference signals transmitted or received at 415 may include a set of CSI-RSs. Additionally, in some cases, the reference signals of the set of reference signals reflected by the reconfigurable surface 205-*b* at 415 may include a different format of reference signal as compared to reference signals which are not reflected by the reconfigurable surface 205-*b*. For example, the reference signals transmitted and reflected by the reconfigurable surface 205-*b* at 415 may be less complex (e.g., simpler) and may include less information as compared to reference signals which are transmitted directly from the base station 105-*b* to the UEs 115-*c* and 115-*d* (e.g., transmitted without reflection from the reconfigurable surface 205-*b*).

At 420, the first UE 115-*c*, second UE 115-*d*, or both, may perform a set of measurements on the set of reference signals received during the sweep procedure at 415. In some aspects, the UEs 115 may perform the measurements based on receiving the first control message at 405, receiving the second control message at 410, receiving the set of reference signals at 415, or any combination thereof. For example, the UEs 115 may perform the measurements at 420 based on receiving the indication of the set of resources for performing the sweep procedure. The measurements performed at 420 may include any measurements known in the art including, but not limited to, RSSI measurements, RSRP measurements, RSRQ measurements, SNR measurements, SINR measurements, or any combination thereof.

At 425, the first UE 115-c, the second UE 115-d, or both, may identify at least one precoder configuration of the set of precoder configurations used for the sweep procedure. The UEs 115 may identify the at least one precoder configuration used for the sweep procedure based on performing the measurements at 420. In particular, the UEs 115 may identify preferred precoder configurations, un-preferred precoder configurations, relative rankings between the respective precoder configurations used for the sweep procedure, or any combination thereof. For example, in cases where the set of reference signals received at 415 are reflected by the reconfigurable surface 205-b using four separate precoder configurations, respectively, the UEs 115 may determine one or more precoder configurations which results in the highest signal quality or strength, may determine a relative priority ranking (e.g., order of preference) between the four precoder configurations, or any combination thereof.

At 430, the first UE 115-c may transmit a feedback message to the base station 105-b. In some aspects, the first UE 115-c may transmit the feedback message to the base station 105-b via the reconfigurable surface 205-b (e.g., the feedback message may be reflected by the reconfigurable surface 205-b to the base station 105-b). The feedback message may include a CSI report. The first UE 115-c may transmit the feedback message to the base station 105-b (via the reconfigurable surface 205-b) based on receiving the first control message at 405, receiving the second control message at 410, receiving the set of reference signals at 415, performing the measurements at 420, identifying the at least one precoder configuration at 425, or any combination thereof.

For example, in some aspects, the feedback message transmitted at 430 may include an indication of the at least one precoder configuration of the set of precoder configurations used for the sweep procedure and identified at 425. In this regard, the feedback message may be used to indicate to the base station 105-b which precoder configuration(s) are preferred by the first UE 115-c, which precoder configuration(s) are un-preferred by the first UE 115-c, relative priority rankings (e.g., order of preference) of the respective precoder configurations, or any combination thereof. Additionally or alternatively, the feedback message may include indications of the measurements performed on reference signals which were reflected according to the respective precoder configurations.

For example, the feedback message may include an indication of a first precoder configuration and a second precoder configuration of the set of precoder configurations used for the sweep procedure. In this example, the feedback message may additionally include an indication of a priority (e.g., preference) associated with the first precoder configuration and/or second precoder configuration, an indication of measurements performed on reference signals which were reflected by the reconfigurable surface 205-b using the first precoder configuration and/or the second precoder configuration, or any combination thereof.

In some cases, the first UE 115-c may transmit the feedback message at 430 within a feedback message occasion of a second cycle of the sweep procedure. For example, the set of reference signals at 415 may be transmitted within a set of reference signal occasions of a first cycle of the sweep procedure. For instance, in cases where four precoder configurations are to be used for the sweep procedure, the first cycle of the sweep procedure may include four reference signal occasions, such that each reference signal occasion is associated with a respective precoder configuration. Continuing with the same example, a second cycle of the sweep procedure may also include four feedback message occasions, such that each feedback message occasion is associated with a respective precoder configurations. In this regard, the sweep procedure may include a first cycle which cycles, or rotates, through the four respective precoder configurations, and may further include a second cycle which cycles, or rotates, through the four respective precoder configurations.

In some aspects, the first UE 115-c may identify at least one feedback message occasion of the second cycle of the sweep procedure that is associated with the at least one precoder configuration identified at 435, and may transmit the feedback message within the identified feedback message occasion of the second cycle of the sweep procedure. For example, in the case where the sweep procedure includes four separate precoder configurations, the first UE 115-b may identify that a second reference signal received within a second reference signal occasion using a second precoder configuration results in the highest signal performance (e.g., highest signal strength, highest signal quality) at the first UE 115-c. In this example, the first UE 115-c may identify that a second feedback message occasion of the second cycle of the sweep procedure is associated with the second precoder configuration, and may thereby transmit the feedback message at 430 within the second feedback message occasion of the second cycle of the sweep procedure.

At 435, the second UE 115-c may transmit a feedback message to the base station 105-b. In some aspects, the second UE 115-c may transmit the feedback message to the base station 105-b via the reconfigurable surface 205-b (e.g., the feedback message may be reflected by the reconfigurable surface 205-b to the base station 105-b). The feedback message may include a CSI report. As noted previously herein with respect to the feedback message transmitted by the first UE 115-c at 430, the second UE 115-d may transmit the feedback message to the base station 105-b (via the reconfigurable surface 205-b) based on receiving the first control message at 405, receiving the second control message at 410, receiving the set of reference signals at 415, performing the measurements at 420, identifying the at least one precoder configuration at 425, or any combination thereof.

In some aspects, the feedback message transmitted by the second UE 115-d may be used to indicate to the base station 105-b which precoder configuration(s) are preferred by the second UE 115-d, which precoder configuration(s) are un-preferred by the second UE 115-d, relative priority rankings (e.g., order of preference) of the respective precoder configurations, or any combination thereof. Additionally or alternatively, the feedback message may include indications of the measurements performed on reference signals which were reflected according to the respective precoder configurations. In some aspects, the precoder configurations (e.g., preferred precoder configurations, un-preferred precoder configurations) which are indicated via the feedback messages transmitted by the first and second UEs 115 may be the same or different.

At 440, the base station 105-*b* may identify a precoder configuration which will be used by the reconfigurable surface 205-*c* for reflecting downlink transmissions to the first UE 115-*c*, the second UE 115-*d*, or both. In some aspects, the base station 105-*b* may determine the precoder configuration at 440 based on receiving the feedback messages from the UEs 115 at 430 and 435. For example, the base station 105-*b* may determine the precoder configuration which will be used by the reconfigurable surface 205-*b* based on the indications of preferred or un-preferred precoders in the feedback messages, the indications of the relative priorities of the precoder configurations in the feedback messages, or any combination thereof.

In some cases, it may be beneficial to fine-tune the precoder configuration which will be used by the reconfigurable surface 205-*b* by performing channel estimation using the determined precoder configuration. In such cases, process flow 400 may proceed to 445.

At 445, the first UE 115-*c* may receive an additional reference signal from the base station 105-*b*. In some aspects, the additional reference signal may be reflected by the reconfigurable surface 205-*b* using the at least one precoder indicated in the feedback message transmitted by the first UE 115-*c* at 430. In this regard, the additional reference signal may be transmitted by the base station 105-*b* and reflected by the reconfigurable surface 205-*c* using a preferred precoder configuration which was identified by the first UE 115-*c* and indicated in the feedback message at 430. In some aspects, the additional reference signal transmitted at 445 may include a CSI-RS.

At 450, the first UE 115-*c* may transmit a second feedback message to the base station 105-*c* based on (e.g., in response to) receiving the additional reference signal at 440. In some aspects, the second feedback message may be transmitted by the first UE 115-*c* to the base station 105-*b* via the reconfigurable surface 205-*b*. The second feedback message may include a CSI report, and may include data indicative of channel state information between the base station 105-*b* and the reconfigurable surface 205-*b*, between the reconfigurable surface 205-*b* and the first UE 115-*c*, or both. In this regard, the base station 105-*b* and the first UE 115-*c* may exchange the additional reference signal at 440 and the second feedback message at 445 in order to estimate the channel between the base station 105-*b*, the reconfigurable surface 205-*b*, the first UE 115-*c*, or any combination thereof. More particularly, the base station 105-*b* and the first UE 115-*c* may exchange the additional reference signal at 445 and the second feedback message at 450 in order to estimate the channel using the at least one precoder configuration indicated in the feedback message transmitted by the first UE 115-*c* at 430.

In some aspects, the base station 105-*c* may be configured to utilize the data indicative of the channel state information indicated in the second feedback message in order to perform channel estimation. Additionally, by performing channel estimation for wireless communications carried out via the reconfigurable surface 205-*b* using the at least one precoder configuration, the base station 105-*b* may be configured to adjust (e.g., optimize) the precoder configuration used by the reconfigurable surface 205-*b* in order to improve wireless communications. For example, by performing channel estimation, the base station 105-*b* may be configured to selectively adjust one or more precoders (e.g., reflective coefficients) associated with one or more reflective surface elements of the reconfigurable surface 205-*b* in order to improve the efficiency and reliability of wireless communications.

In additional or alternative cases, the base station 105-*b* and the first UE 115-*b* may adjust (e.g., modify, optimize) the precoder configuration identified at 440 and used by the reconfigurable surface 205-*b* by performing additional sweep procedures (e.g., fine-tuning sweep procedures). In such cases, process flow 400 may proceed to 455.

At 455, the first UE 115-*b* may receive a second set of reference signals transmitted by the base station 105-*b* and reflected by the reconfigurable surface 205-*b*. The second set of reference signals may be transmitted during (e.g., as part of) a second sweep procedure for configuring the reconfigurable surface 205-*b*. In some aspects, the base station 105-*b* may transmit, and the first UE 115-*c* may receive, the second set of reference signals based on transmitting or receiving the first control message at 405, transmitting or receiving the second control message at 410, performing the measurements at 420, identifying the at least one precoder configuration at 425, transmitting or receiving the feedback message(s) at 430 and/or 435, or any combination thereof.

In some aspects, the second set of reference signals may be transmitted within a second set of reference signal occasions of a second sweep procedure associated with configuring the reconfigurable surface 205-*b*. For example, set of reference signals and feedback message at 415 and 430, respectively, may be transmitted and received during first sweep procedure associated with configuring the reconfigurable surface, and the second set of reference signals at 450 may be transmitted and received in a second sweep procedure associated with configuring (e.g., fine-tuning) the reconfigurable surface 205-*b*.

In some aspects, the second set of reference signals may be reflected by the reconfigurable surface 205-*b* using a second set of precoder configurations indicated in the first control message, the second control message, a different control message, or any combination thereof. The second set of precoder configurations may be different from the set of precoder configurations used to reflect the set of reference signals at 415. In some cases, the base station 105-*b* may identify or generate the second set of precoder configurations based on the at least one precoder configuration identified in the feedback message received from the first UE 115-*c* at 430. For example, the base station 105-*b* may make one or more small adjustments to the at least one precoder configuration identified in the feedback message received at 430 in order to identify or generate the second set of precoder configurations. In this regard, the second set of precoder configurations may each include slight variations of the at least one identified precoder configuration, in which one or more parameters of the at least one identified precoder configuration have been modified.

Moreover, in some cases, the second set of precoder configurations used to reflect the second set of reference signals at 455 may include precoder configurations which are not included in a configured codebook or index of potential precoder configurations usable by the reconfigurable surface 205-*b*. For example, the first control message transmitted and received at 405 may include indicate a set of precoder configurations usable by the reconfigurable surface 205-*b* for performing a sweep procedure. In this example, the set of precoder configurations used to reflect the set of reference signals at 415 may be included within the precoder configurations indicated in the first control message, and the second set of precoder configurations used to reflect the set of reference signals at 455 may not be included within the precoder configurations indicated in the first control message. For instance, in cases where the base station 105-*b* makes small modifications to the at least one identified precoder configuration identified in the feedback message at 430 to identify or generate the second set of precoder configurations, the second set of precoder configurations may not be included within a set of potential precoder configurations which were identified (e.g., configured) via the first control message at 405.

In some aspects, the set of reference signals transmitted within the first sweep procedure at 415 may include a different format than the reference signals transmitted within the second sweep procedure at 455. For example, the set of reference signals transmitted and received at 415 may include a first format, and the second set of reference signals transmitted and received at 455 may include a second format which is different from the first format. For instance, the first format associated with the set of reference signals at 415 may be limited in the frequency domain to a few consecutive resource blocks and/or may be more sparse in the frequency domain and/or time domain as compared to the second format associated with the second set of reference signals at 455.

At 460, the first UE 115-*c* may perform a set of measurements on the second set of reference signals received during the second sweep procedure at 455. In some aspects, the first UE 115-*c* may perform the measurements based on receiving the first control message at 405, receiving the second control message at 410, receiving the second set of reference signals at 455, or any combination thereof. For example, the first UE 115-*c* may perform the measurements at 460 based on receiving a control message (e.g., first control message, second control message, a different control message) including an indication of a set of resources for performing the second sweep procedure. The measurements performed at 460 may include any measurements known in the art including, but not limited to, RSSI measurements, RSRP measurements, RSRQ measurements, SNR measurements, SINR measurements, or any combination thereof.

At 465, the first UE 115-*c* may identify at least one precoder configuration of the second set of precoder configurations used for the second sweep procedure at 455. The first UE 115-*c* may identify the at least one precoder configuration used for the second sweep procedure based on performing the measurements at 460. In particular, the first UE 115-*c* may identify preferred precoder configurations, un-preferred precoder configurations, relative rankings between the respective precoder configurations used for the sweep procedure, or any combination thereof. For example, in cases where the second set of reference signals received at 455 are reflected by the reconfigurable surface 205-*b* using four separate precoder configurations (e.g., second set of precoder configurations includes four separate precoder configurations), respectively, the first UE 115-*c* may determine one or more precoder configurations from the second set of precoder configurations which results in the highest signal quality or strength, may determine a relative priority ranking (e.g., order of preference) between the four precoder configurations, or any combination thereof.

At 470, the first UE 115-*c* may transmit a feedback message to the base station 105-*b*. In some aspects, the first UE 115-*c* may transmit the feedback message to the base station 105-*b* via the reconfigurable surface 205-*b* (e.g., the feedback message may be reflected by the reconfigurable surface 205-*b* to the base station 105-*b*). The feedback message may include a CSI report. The first UE 115-*c* may transmit the feedback message to the base station 105-*b* (via the reconfigurable surface 205-*b*) based on receiving the first control message at 405, receiving the second control message at 410, receiving the second set of reference signals at 455, performing the measurements at 460, identifying the at least one precoder configuration at 465, or any combination thereof.

In some aspects, the feedback message transmitted by the first UE 115-*c* at 470 may be used to indicate to the base station 105-*b* which precoder configuration(s) from the second set of precoder configurations are preferred by the first UE 115-*c*, which precoder configuration(s) from the second set of precoder configurations are un-preferred by the second UE 115-*d*, relative priority rankings (e.g., order of preference) of the respective precoder configurations from the second set of precoder configurations, or any combination thereof. Additionally or alternatively, the feedback message may include indications of the measurements performed on reference signals which were reflected according to the respective precoder configurations from the second set of precoder configurations.

At 480, the base station 105-*b* may determine one or more precoder configurations which are to be used by the reconfigurable surface for communications between the base station 105-*b* and the first UE 115-*c*, the second UE 115-*b*, or both. The base station 105-*b* may be configured to determine the one or more precoder configurations which will be used by the reconfigurable surface 205-*b* based on receiving the feedback message from the first UE 115-*c* at 430, receiving the feedback message from the second UE 115-*d* at 435, receiving the feedback messages from the first UE 115-*c* at 450 and/or 470, or any combination thereof. In particular, the base station 105-*b* may determine the one or more precoder configurations which will be used by the reconfigurable surface based on the indications of the preferred or un-preferred precoder configurations identified by the respective UEs 115-*c*.

For example, in cases where both the first UE 115-*c* and the second UE 115-*d* identify the same precoder configuration as a preferred precoder configuration, the base station 105-*b* may determine the identified precoder configuration as the precoder configuration to be used by the reconfigurable surface 205-*b*. By way of another example, the first UE 115-*b* may identify a first precoder configuration as a preferred precoder configuration, and may indicate that a second precoder configuration is the second preferred precoder configuration. Comparatively, the second UE 115-*d* may identify a third precoder configuration as a preferred precoder configuration, and may indicate that the second precoder configuration is the second preferred precoder configuration. In this example, the base station 105-*b* may identify the second precoder configuration as the precoder configuration which will be used by the reconfigurable surface 205-*b* due to the fact that both UEs 115 identified the second precoder configuration as exhibiting sufficient performance for efficient and reliable communications.

In some aspects, the base station 105-*b* may report the one or more precoder configurations determined at 475 to the first UE 115-*c*, the second UE 115-*d*, or both. In this regard, the base station 105-*c* may inform the UEs 115 which precoder configuration will be used by the reconfigurable surface 205-*b* for communicating with the base station 105-*b* via the reconfigurable surface 205-*b*.

At 480, the first UE 115-*c*, the second UE 115-*b*, or both, may communicate with the base station 105-*b* based on the one or more precoder configurations determined at 440. Additionally or alternatively, the UEs 115 may communicate with the base station 105-*b* based on the one or more precoder configurations (e.g., fine-tuned or modified precoder configurations) determined at 475. In this regard, the UEs 115 may communicate with the base station 105-*b* via the reconfigurable surface 205-*b* based on transmitting the respective feedback messages including the indications of the preferred or un-preferred precoder configurations and/or priorities of precoder configurations at 430, 435, 450, 470, or any combination thereof. For example, at 480, the base station 105-*b* may transmit a downlink transmission to the first UE 115-*c* using the precoder configuration determined at 440, 470, or both.

Techniques described herein may support signaling which enables for improved precoder configuration selection for the reconfigurable surface 205-*b*. By enabling for improved precoder configuration selection, techniques described herein may increase throughput within a wireless communications system (e.g., wireless communications system 100 or 200) and provide for improved beamforming gain. Additionally, the techniques described herein may enable the base station 105-*b* to circumvent obstructions which would otherwise interrupt wireless communications, thereby increasing a quantity of UEs 115 which may be communicatively coupled to the network. Furthermore, by improving precoder configuration selection of the passive reconfigurable surface 205-*b* (e.g., RIS), techniques described herein may reduce a power consumption which is associated with active reconfigurable surfaces (e.g., AAUs), thereby improving the overall power efficiency of the wireless communications system.

Figure 5:
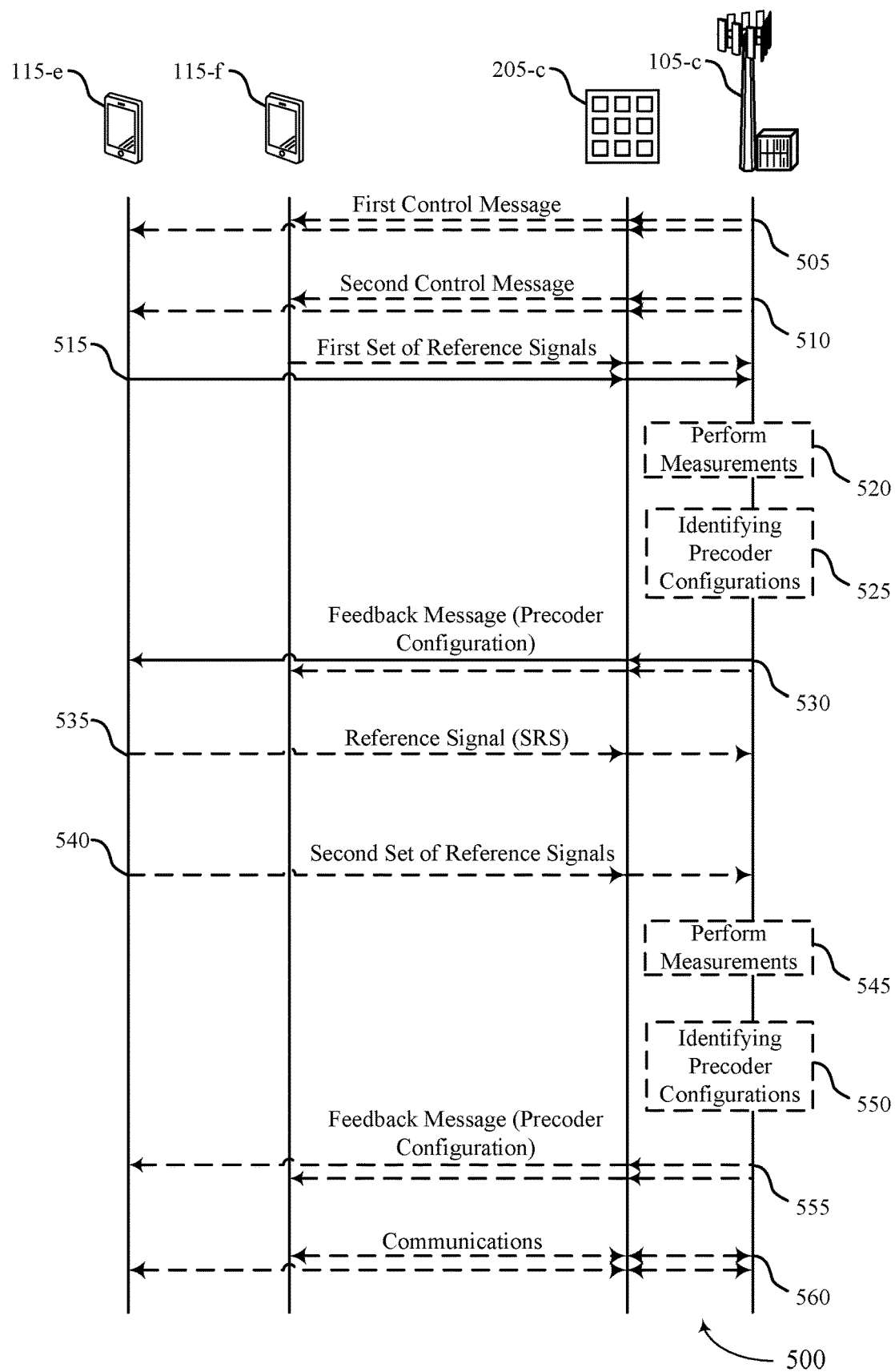
FIG. 5 illustrates an example of a process flow that supports techniques for communicating using a reconfigurable surface in accordance with aspects of the present disclosure.

FIG. 5 illustrates an example of a process flow 500 that supports techniques for communicating using a reconfigurable surface in accordance with aspects of the present disclosure. In some examples, process flow 500 may implement, or be implemented by, aspects of wireless communications system 100, wireless communications system 200, schematic diagram 300, or any combination thereof. In particular, the process flow 500 may implement, or be implemented by, aspects of wireless communications system 100, wireless communications system 200, schematic diagram 300, or any combination thereof, in order to configure reconfigurable surfaces 205 for uplink transmissions. For example, the process flow 500 may illustrate a UE 115-*c* transmitting a first set of reference signals to a base station 105-*b* via a reconfigurable surface 205-*b*, receiving a feedback message to the base station 105-*b*, and communicating with the base station 105-*b* via the reconfigurable surface 205-*b* based on the received feedback message, as described with reference to FIGS. 1-3, among other aspects.

The process flow 500 may include a first UE 115-*e*, a second UE 115-*f*, a reconfigurable surface 205-*c*, and a base station 105-*c*, which may be examples of UEs 115, reconfigurable surfaces 205, and base stations 105, as described with reference to FIGS. 1-4. As compared to the process flow 400 illustrated in FIG. 4 may be used for configuring the reconfigurable surface 205-*b* for downlink transmissions, the process flow 500 illustrated in FIG. 5 may be used for configuring the reconfigurable surface 205-*c* for uplink transmissions. Accordingly, any discussion regarding process flow 400 may be understood as applying to process flow 500, to the extent applicable.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the base station 105-*c* may transmit a first control message to the first UE 115-*e*, the second UE 115-*f*, or both. In some aspects, the base station 105-*c* may transmit the first control message to the UEs 115-*e* and 115-*f* directly, via the reconfigurable surface 205-*c*, or both. The first control message may include an RRC message, an SSB message, or both.

In some aspects, the first control message may include an indication of a set of precoder configurations usable by the reconfigurable surface. For example, the first control message may include an indication of a set of precoder configurations for performing a sweep procedure used for configuring the reconfigurable surface 205-*c*. In this regard, the first control message may include an indication of a codebook or index including a list of precoder configurations which may be used by the reconfigurable surface 205-*c* to reflect signals using the set of reflective surface elements. In some aspects, each precoder configuration of the set of precoder configurations includes a set of precoders associated with the set of reflective surface elements of the reconfigurable surface 205-*c*. For example, in cases where the reconfigurable surface includes ten reflective surface elements, each precoder configuration may include ten precoders, one precoder for each of the respective reflective surface elements.

At 510, the base station 105-*c* may transmit a second control message to the first UE 115-*e*, the second UE 115-*f*, or both. In some aspects, the base station 105-*c* may transmit the second control message to the UEs 115-*e* and 115-*f* directly, via the reconfigurable surface 205-*c*, or both. The second control message may include a DCI message, a MAC-CE message, or both.

In some aspects, the second control message may include an indication of a one or more precoder configurations of the set of precoder configurations indicated in the first control message which are to be used to perform a sweep procedure for configuring the reconfigurable surface 205-*c*. In this regard, the UEs 115-*e* and 115-*f* may be configured (e.g., pre-configured via RRC signaling and/or SSB signaling) with a set of potential precoder configurations usable by the reconfigurable surface 205-*c* via the first control message, and may be instructed which precoder configurations are to be used by the reconfigurable surface for performing a sweep procedure. For example, the first control message may indicate two hundred precoder configurations usable by the reconfigurable surface 205-*c* for reflecting signals. In this example, the second control message may indicate five precoder configurations of the two hundred potential precoder configurations are to be used by the reconfigurable surface 205-*c* for performing the sweep procedure.

In some aspects, the first control message received at 505, the second control message received at 510, or both, may indicate a set of resources for performing the sweep procedure for configuring the reconfigurable surface 205-*c*. For example, the first control message, the second control message, or both, may include an indication of a set of time resources, a set of frequency resources, a set of spatial resources, or any combination thereof, which are associated with the sweep procedure. Additionally or alternatively, the first control message, the second control message, or both, may indicate a position (e.g., geographical position) of the reconfigurable surface 205-*c*, an orientation of the reconfigurable surface 205-*c*, or both.

At 515, the first UE 115-*b*, the second UE 115-*b*, or both, may transmit a set of reference signals to the base station 105-*c* via the reconfigurable surface 205-*c*. The set of reference signals may be transmitted during (e.g., as part of) a sweep procedure for configuring the reconfigurable surface 205-*c*. In some aspects, the set of reference signals may be reflected by the reconfigurable surface 205-*c* using a set of precoder configurations indicated in the first control message, the second control message, or both. For example, the set of reference signals may be reflected by the reconfigurable surface 205-*c* using a subset of precoder configurations indicated in the second control message, where the subset of precoder configurations are included within a set of potential precoder configurations indicated in the first control message.

In this regard, the UEs 115-*e* and 115-*f* may transmit, and the base station 105-*c* may receive, the set of reference signals at 515 based on receiving or transmitting the first control message at 505, receiving or transmitting the second control message at 510, or both. For example, the UEs 115-*e* and/or 115-*f* may transmit the set of reference signals at 515 based on receiving the indications of the precoder configurations which are to be used for the sweep procedure, based on receiving the indication of the position and/or orientation of the reconfigurable surface 205-*c*, based on receiving the indication of the set of resources for performing the sweep procedure, or any combination thereof.

In some aspects, the set of reference signals may be transmitted within a set of reference signal occasions of a sweep procedure associated with configuring the reconfigurable surface 205-*c*. The sweep procedure may be used to configure the reconfigurable surface 205-*c* with different precoder configurations of the set of precoder configurations for reflecting signals at the reconfigurable surface 205-*c*. The sweep procedure may include a set of reference signal occasions in which reference signals may be transmitted (e.g., reflected) by the reconfigurable surface 205-*c* according to different precoder configurations.

At 520, the base station 105-*c* may perform a set of measurements on the set of reference signals received from the first UE 115-*e* and/or the second UE 115-*f* during the sweep procedure at 515. In some aspects, the base station 105-*c* may perform the measurements based on transmitting the first control message at 505, transmitting the second control message at 510, receiving the set of reference signals at 515, or any combination thereof. The measurements performed at 520 may include any measurements known in the art including, but not limited to, RSSI measurements, RSRP measurements, RSRQ measurements, SNR measurements, SINR measurements, or any combination thereof.

At 525, the base station 105-*c* may identify at least one precoder configuration of the set of precoder configurations used for the sweep procedure. The base station 105-*c* may identify the at least one precoder configuration used for the sweep procedure based on performing the measurements at 520. In particular, the base station 105-*c* may identify preferred precoder configurations, un-preferred precoder configurations, relative rankings between the respective precoder configurations used for the sweep procedure, or any combination thereof.

At 530, the base station 105-*c* may transmit a feedback message to the first UE 115-*e*, the second UE 115-*f*, or both. In some aspects, the base station 105-*c* may transmit the feedback message to the UEs 115 via the reconfigurable surface 205-*c* (e.g., the feedback message may be reflected by the reconfigurable surface 205-*c* to the UEs 115). The feedback message may include a CSI report. The base station 105-*c* may transmit the feedback message to the UEs 115 (via the reconfigurable surface 205-*c*) based on transmitting the first control message at 505, transmitting the second control message at 510, receiving the set of reference signals at 515, performing the measurements at 520, identifying the at least one precoder configuration at 525, or any combination thereof.

For example, in some aspects, the feedback message transmitted at 4 430 may include an indication of the at least one precoder configuration of the set of precoder configurations used for the sweep procedure and identified at 525. In this regard, the feedback message may be used to indicate to the UEs 115 which precoder configuration(s) will be used by the reconfigurable surface 205-*c* to reflect uplink transmissions from the UEs 115 to the base station. Additionally or alternatively, the feedback message may include indications of the measurements performed on reference signals which were reflected according to the respective precoder configurations. In some cases, the base station 105-*c* may transmit the feedback message at 530 within a feedback message occasion of a second cycle of the sweep procedure. For example, the base station 105-*c* may transmit the feedback message at 530 within a feedback message occasion which is associated with a feedback message occasion with a second cycle of the sweep procedure which is associated with the at least one precoder configuration identified at 525.

At 535, the first UE 115-*c* may transmit a reference signal (e.g., SRS) to the base station 105-*c*. In some aspects, the reference signal may be reflected by the reconfigurable surface 205-*c* using the at least one precoder indicated in the feedback message transmitted by the base station 105-*c* at 530. In some aspects, the base station 105-*c* may be configured to utilize the reference signal received at 535 to estimate a channel between the base station 105-*c* and the reconfigurable surface 205-*c*, between the reconfigurable surface 205-*c* and the first UE 115-*c*, or both. In this regard, the base station 105-*c* may be configured to perform channel estimation using the identified precoder configuration in order to fine-tune (e.g., modify) the identified precoder configuration and improve wireless communications.

In additional or alternative cases, the base station 105-*c* and the first UE 115-*b* may adjust (e.g., modify, optimize) the precoder configuration used by the reconfigurable surface 205-*c* by performing additional sweep procedures (e.g., fine-tuning sweep procedures). In such cases, process flow 500 may proceed to 540.

At 540, the first UE 115-*e* may transmit a second set of reference signals to the base station 105-*c* via the reconfigurable surface 205-*c*. The second set of reference signals may be transmitted during (e.g., as part of) a second sweep procedure for configuring the reconfigurable surface 205-*c*. In some aspects, the base station 105-*c* may receive, and the first UE 115-*e* may transmit, the second set of reference signals based on transmitting or receiving the first control message at 505, transmitting or receiving the second control message at 510, performing the measurements at 520, identifying the at least one precoder configuration at 525, transmitting or receiving the feedback message(s) at 530, or any combination thereof.

In some aspects, the second set of reference signals may be transmitted within a second set of reference signal occasions of a second sweep procedure associated with configuring the reconfigurable surface 205-*c*. In some aspects, the second set of reference signals may be reflected by the reconfigurable surface 205-*c* using a second set of precoder configurations indicated in the first control message, the second control message, a different control message, or any combination thereof. The second set of precoder configurations may be different from the set of precoder configurations used to reflect the set of reference signals at 415. In some cases, the base station 105-c may identify or generate the second set of precoder configurations based on the at least one precoder configuration identified at 525. For example, the base station 105-c may make one or more small adjustments to the at least one precoder configuration identified at 525 in order to identify or generate the second set of precoder configurations used for the second sweep procedure.

At 545, the base station 105-c may perform a set of measurements on the second set of reference signals received during the second sweep procedure at 540. In some aspects, the base station 105-c may perform the measurements based on transmitting the first control message at 505, transmitting the second control message at 510, receiving the second set of reference signals at 540, or any combination thereof. The measurements performed at 545 may include any measurements known in the art including, but not limited to, RSSI measurements, RSRP measurements, RSRQ measurements, SNR measurements, SINR measurements, or any combination thereof.

At 550, the base station 105-c may identify at least one precoder configuration of the second set of precoder configurations used for the second sweep procedure at 540. The base station 105-c may identify the at least one precoder configuration used for the second sweep procedure based on performing the measurements at 545. In particular, the base station 105-c may identify preferred precoder configurations, un-preferred precoder configurations, relative rankings between the respective precoder configurations used for the second sweep procedure, or any combination thereof.

At 555, the base station 105-c may transmit a feedback message to the first UE 115-e, the second UE 115-f, or both. In some aspects, the base station 105-c may transmit the feedback message to the UEs 115 via the reconfigurable surface 205-c (e.g., the feedback message may be reflected by the reconfigurable surface 205-c to the UEs 115). In some aspects, the feedback message may include an indication as to which precoder configuration will be used by the reconfigurable surface 205-c to reflect uplink signals from the UEs 115 to the base station 105-c.

At 560, the first UE 115-e, the second UE 115-b, or both, may communicate with the base station 105-c based on the one or more precoder configurations determined at 550. In this regard, the UEs 115 may communicate with the base station 105-c via the reconfigurable surface 205-c based on transmitting the sets of reference signals during the first sweep procedure, the second sweep procedure, or both. Additionally, the UEs 115 may communicate with the base station 105-c based on the one or more precoder configurations indicated in the feedback messages transmitted by the base station 105-c at 530 and/or 555. For example, at 560, UEs 115 may transmit uplink transmissions to the base station 105-c, where the uplink transmissions are reflected by the reconfigurable surface 205-c using the precoder configuration determined at 525 and/or 550. using the precoder configuration determined at 470.

Techniques described herein may support signaling which enables for improved precoder configuration selection for the reconfigurable surface 205-c. By enabling for improved precoder configuration selection, techniques described herein may increase throughput within a wireless communications system (e.g., wireless communications system 100 or 200) and provide for improved beamforming gain. Additionally, the techniques described herein may enable the base station 105-c to circumvent obstructions which would otherwise interrupt wireless communications, thereby increasing a quantity of UEs 115 which may be communicatively coupled to the network. Furthermore, by improving precoder configuration selection of the passive reconfigurable surface 205-c (e.g., RIS), techniques described herein may reduce a power consumption which is associated with active reconfigurable surfaces (e.g., AAUs), thereby improving the overall power efficiency of the wireless communications system.

Figure 6:
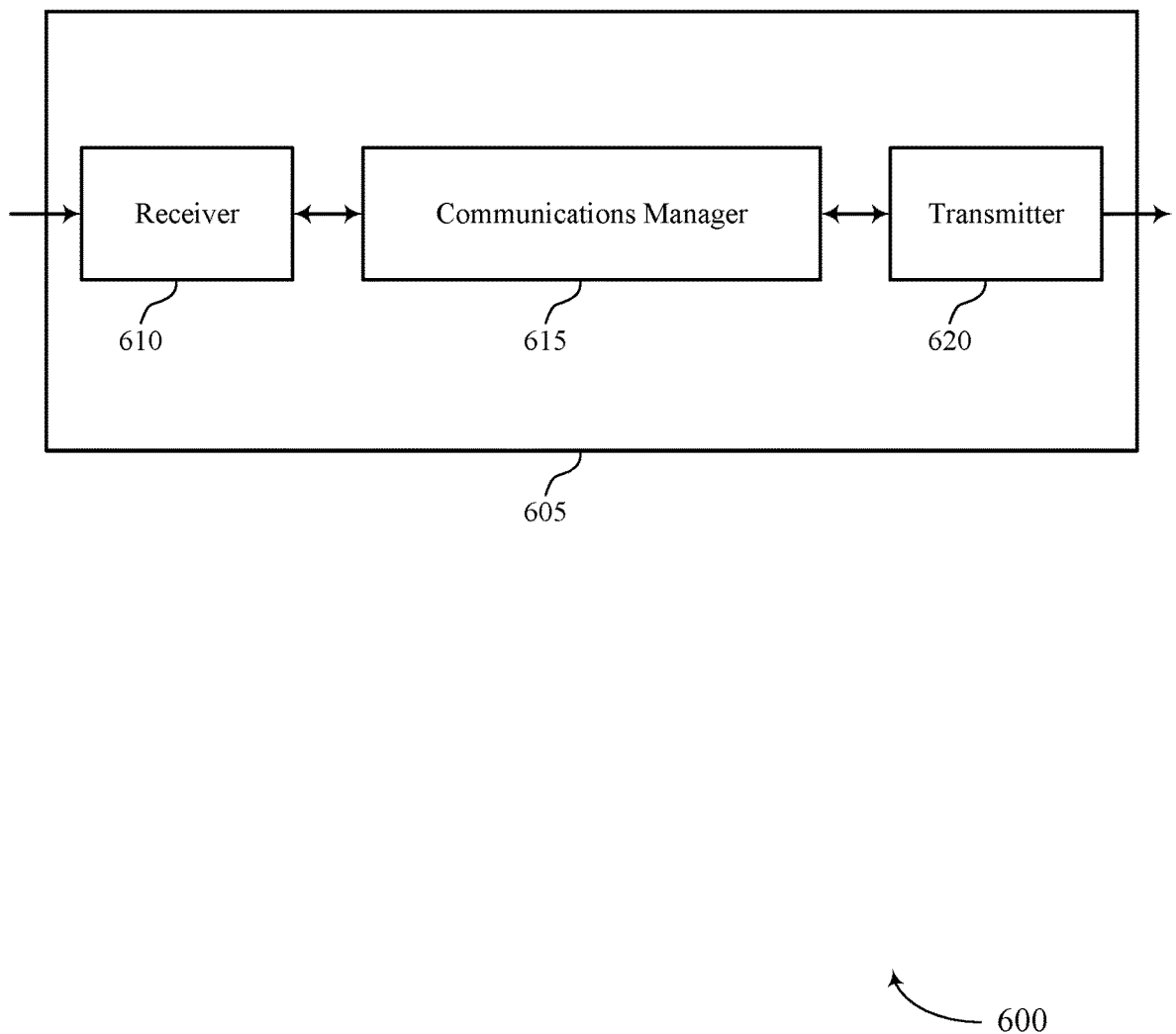
FIGS. 6 and 7 show block diagrams of devices that support techniques for communicating using a reconfigurable surface in accordance with aspects of the present disclosure.

FIG. 6 shows a block diagram 600 of a device 605 that supports techniques for communicating using a reconfigurable surface in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for communicating using a reconfigurable surface, etc.). Information may be passed on to other components of the device 605. The receiver 610 may be an example of aspects of the transceiver 920 described with reference to FIG. 9. The receiver 610 may utilize a single antenna or a set of antennas.

In the context of a sweep procedure associated with configuring a reconfigurable surface 205 for downlink communications, the communications manager 615 may receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the base station via the reconfigurable surface, a feedback message including an indication of at least one precoder configuration of the set of precoder configurations based on receiving the set of reference signals, and receive, from the base station via the reconfigurable surface, a downlink transmission based on transmitting the feedback message.

In the context of a sweep procedure associated with configuring a reconfigurable surface 205 for uplink communications, the communications manager 615 may also transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, receive, from the base station and reflected by the reconfigurable surface, a feedback message including an indication of at least one precoder configuration of the set of precoder configurations based on transmitting the set of reference signals, and transmit, to the base station via the reconfigurable surface, an uplink transmission based on receiving the feedback message. The communications manager 615 may be an example of aspects of the communications manager 910 described herein.

The actions performed by the communications manager 615 as described herein may be implemented to realize one or more potential advantages. For example, enabling for improved precoder configuration selection, techniques described herein may increase throughput within a wireless communications system (e.g., wireless communications system 100 or 200) and provide for improved beamforming gain. Additionally, the techniques described herein may enable the base station 105 to circumvent obstructions which would otherwise interrupt wireless communications, thereby increasing a quantity of UEs 115 which may be communicatively coupled to the network. Furthermore, by improving precoder configuration selection of the passive reconfigurable surface 205 (e.g., RIS), techniques described herein may reduce a power consumption which is associated with active reconfigurable surfaces (e.g., AAUs), thereby improving the overall power efficiency of the wireless communications system.

Based on providing more efficient precoder configuration selection in the context of reconfigurable surfaces 205, a processor of the UE 115 (e.g., a processor controlling the receiver 610, the communications manager 615, the transmitter 620, etc.) may reduce processing resources used for wireless communications. For example, by improving precoder selection for reconfigurable surfaces, the efficiency and reliability of wireless communications carried out via the reconfigurable surface 205 may be improved. Moreover, by improving the selection of precoder configurations, techniques described herein may reduce the number of retransmissions used to successfully receive downlink transmissions and perform uplink transmissions at the UE 115, correspondingly reducing a number of times the processor ramps up processing power and turns on processing units to handle downlink reception and uplink transmission.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
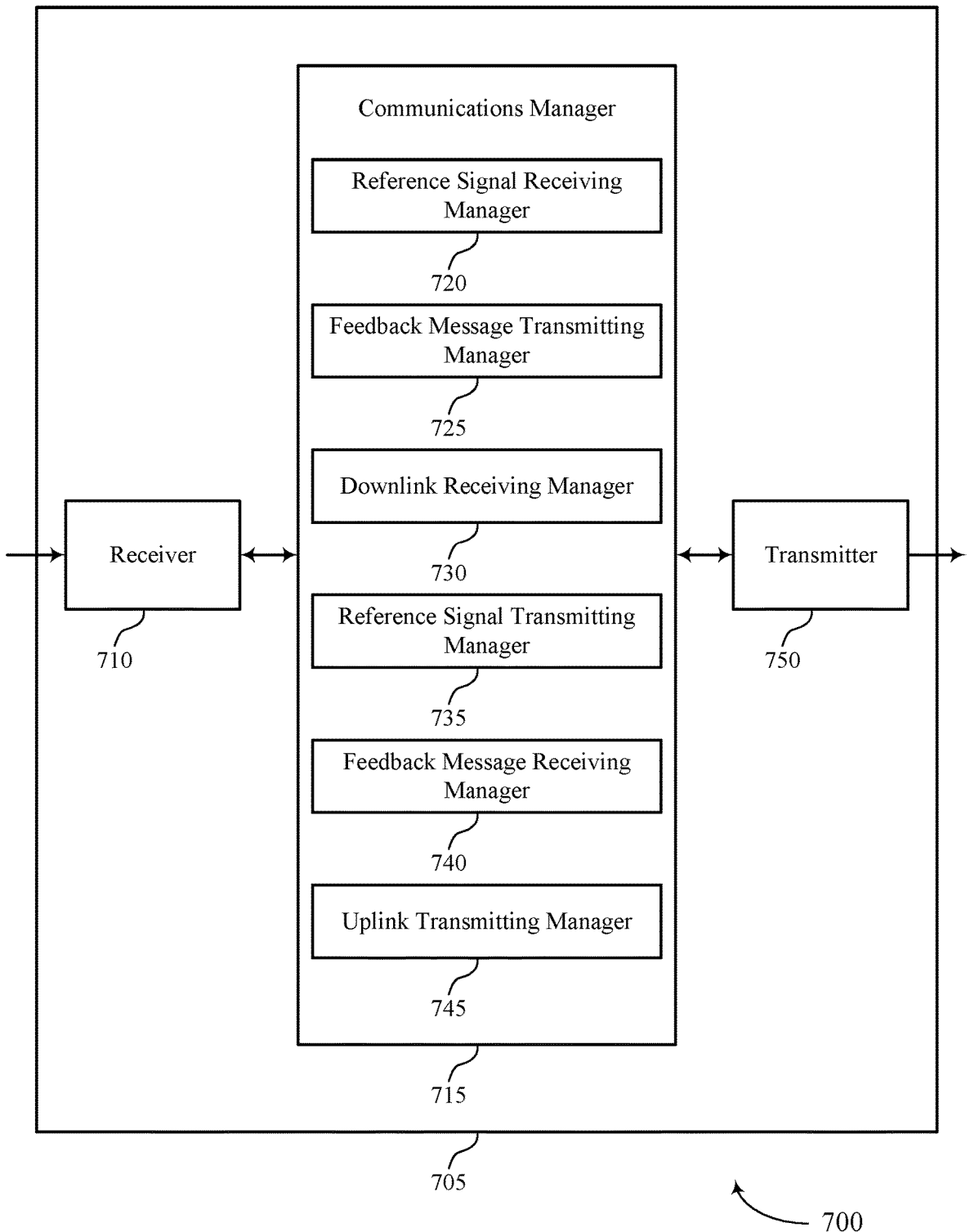

FIG. 7 shows a block diagram 700 of a device 705 that supports techniques for communicating using a reconfigurable surface in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to techniques for communicating using a reconfigurable surface, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a reference signal receiving manager 720, a feedback message transmitting manager 725, a downlink receiving manager 730, a reference signal transmitting manager 735, a feedback message receiving manager 740, and an uplink transmitting manager 745. The communications manager 715 may be an example of aspects of the communications manager 910 described herein.

The reference signal receiving manager 720 may receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals.

The feedback message transmitting manager 725 may transmit, to the base station via the reconfigurable surface, a feedback message including an indication of at least one precoder configuration of the set of precoder configurations based on receiving the set of reference signals.

The downlink receiving manager 730 may receive, from the base station via the reconfigurable surface, a downlink transmission based on transmitting the feedback message.

The reference signal transmitting manager 735 may transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals.

The feedback message receiving manager 740 may receive, from the base station and reflected by the reconfigurable surface, a feedback message including an indication of at least one precoder configuration of the set of precoder configurations based on transmitting the set of reference signals.

The uplink transmitting manager 745 may transmit, to the base station via the reconfigurable surface, an uplink transmission based on receiving the feedback message.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
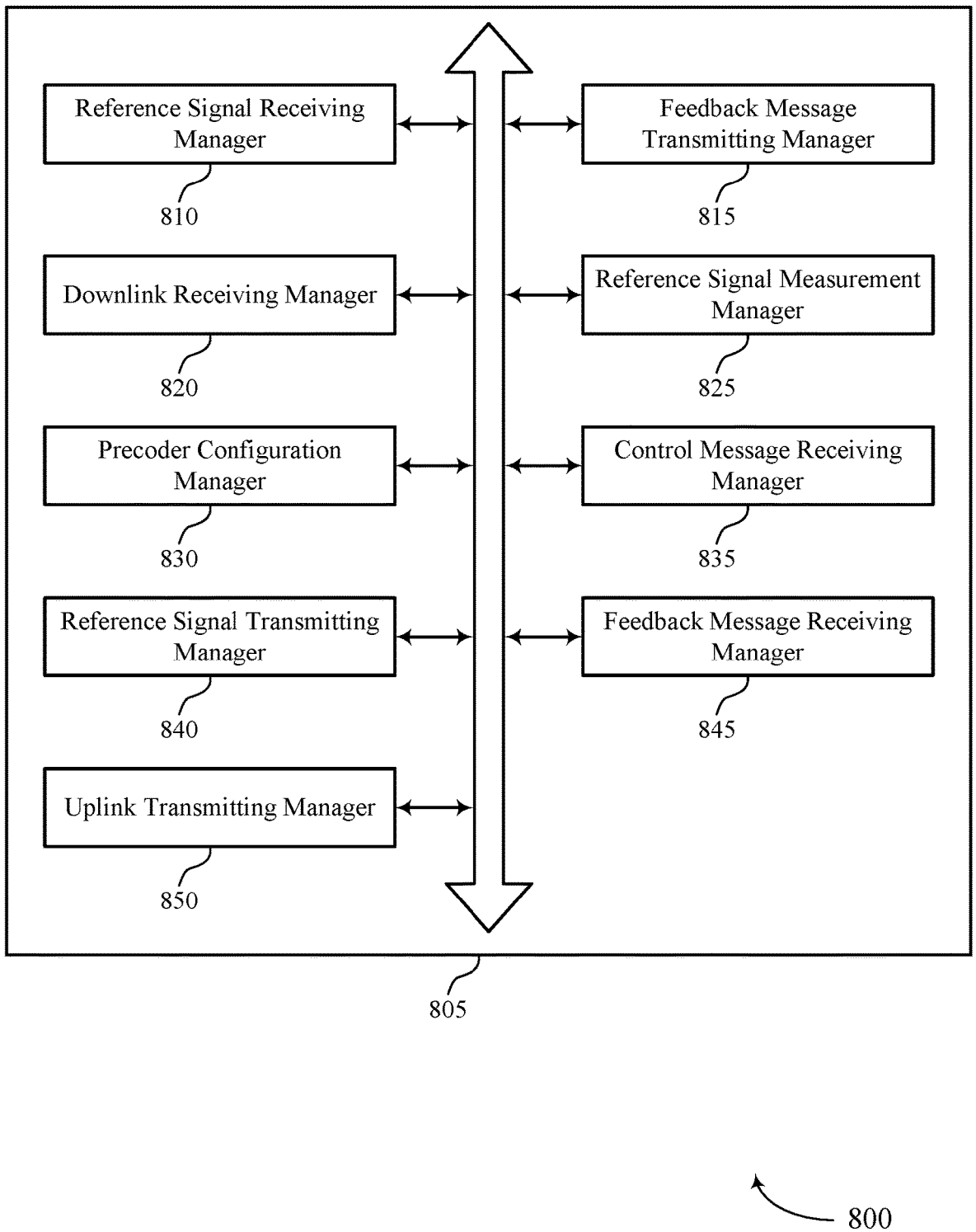
FIG. 8 shows a block diagram of a communications manager that supports techniques for communicating using a reconfigurable surface in accordance with aspects of the present disclosure.

FIG. 8 shows a block diagram 800 of a communications manager 805 that supports techniques for communicating using a reconfigurable surface in accordance with aspects of the present disclosure. The communications manager 805 may be an example of aspects of a communications manager 615, a communications manager 715, or a communications manager 910 described herein. The communications manager 805 may include a reference signal receiving manager 810, a feedback message transmitting manager 815, a downlink receiving manager 820, a reference signal measurement manager 825, a precoder configuration manager 830, a control message receiving manager 835, a reference signal transmitting manager 840, a feedback message receiving manager 845, and an uplink transmitting manager 850. Each of these modules may communicate, directly or indirectly, with one another (e.g., via one or more buses).

The reference signal receiving manager 810 may receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals. In some examples, receiving the set of reference signals further includes receiving the set of reference signals within the set of reference signal occasions of a first cycle of the sweep procedure.

In some examples, the reference signal receiving manager 810 may receive, from the base station, an additional reference signal reflected by the reconfigurable surface using the at least one precoder configuration. In some examples, the reference signal receiving manager 810 may receive, from the base station via the reconfigurable surface, a second set of reference signals reflected by the reconfigurable surface using a second set of precoder configurations based on transmitting the feedback message, where the second set of precoder configurations is different from the set of precoder configurations, where the second set of reference signals are transmitted within a second set of reference signal occasions of a second sweep procedure associated with configuring the reconfigurable surface.

In some cases, the set of reference signals include a first format, and where the second set of reference signals include a second format different from the first format. In some cases, each reference signal of the set of reference signals are reflected by the reconfigurable surface with a precoder configuration of the set of precoder configurations. In some cases, the set of reference signals include a set of CSI-RSs, and where the feedback message includes a CSI report.

The feedback message transmitting manager 815 may transmit, to the base station via the reconfigurable surface, a feedback message including an indication of at least one precoder configuration of the set of precoder configurations based on receiving the set of reference signals. In some examples, transmitting the feedback message further includes transmitting the feedback message within a feedback message occasion of a second cycle of the sweep procedure, where the second cycle of the sweep procedure is subsequent to the first cycle of the sweep procedure. In some examples, the feedback message transmitting manager 815 may identify at least one feedback message occasion of the second cycle of the sweep procedure that is associated with the at least one precoder configuration, where the feedback message is transmitted within the at least one feedback message occasion of the second cycle of the sweep procedure.

In some examples, the feedback message transmitting manager 815 may transmit, to the base station via the feedback message, a second indication of a first precoder configuration and a second precoder configuration of the set of precoder configurations, where receiving the downlink transmission is based on transmitting the second indication of the first precoder configuration and the second precoder configuration. In some examples, the feedback message transmitting manager 815 may transmit, to the base station via the feedback message, a third indication of a priority associated with the first precoder configuration and the second precoder configuration, measurements performed on reference signals associated with the first precoder configuration and the second precoder configuration, or both, where receiving the downlink transmission is based on transmitting the third indication.

In some examples, the feedback message transmitting manager 815 may transmit, to the base station via the reconfigurable surface, a second feedback message including data indicative of CSI between the base station and the reconfigurable surface, between the reconfigurable surface and the UE, or both. In some examples, the feedback message transmitting manager 815 may transmit, to the base station via the reconfigurable surface, a second feedback message including a second indication of one or more precoder configurations of the second set of precoder configurations based on receiving the second set of reference signals.

The downlink receiving manager 820 may receive, from the base station via the reconfigurable surface, a downlink transmission based on transmitting the feedback message. In some examples, the downlink receiving manager 820 may communicate with the base station via the reconfigurable surface based on transmitting the second feedback message. In some examples, the downlink receiving manager 820 may receive, from the base station via the reconfigurable surface, a second downlink transmission based on transmitting the second feedback message.

The reference signal transmitting manager 840 may transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals. In some examples, transmitting the set of reference signals further includes transmitting the set of reference signals within the set of reference signal occasions of a first cycle of the sweep procedure.

In some examples, the reference signal transmitting manager 840 may transmit, to the base station, an additional reference signal reflected by the reconfigurable surface using the at least one precoder configuration. In some examples, the reference signal transmitting manager 840 may transmit, to the base station via the reconfigurable surface, a second set of reference signals reflected by the reconfigurable surface using a second set of precoder configurations based on receiving the feedback message, where the second set of precoder configurations is different from the set of precoder configurations, where the second set of reference signals are transmitted within a second set of reference signal occasions of a second sweep procedure associated with configuring the reconfigurable surface.

In some cases, the set of reference signals include a first format, and where the second set of reference signals include a second format different from the first format. In some cases, each reference signal of the set of reference signals are reflected by the reconfigurable surface with a precoder configuration of the set of precoder configurations. In some cases, the set of reference signals include a set of CSI-RSs, and where the feedback message includes a CSI report.

The feedback message receiving manager 845 may receive, from the base station and reflected by the reconfigurable surface, a feedback message including an indication of at least one precoder configuration of the set of precoder configurations based on transmitting the set of reference signals. In some examples, receiving the feedback message further includes receiving the feedback message within a feedback message occasion of a second cycle of the sweep procedure, where the second cycle of the sweep procedure is subsequent to the first cycle of the sweep procedure. In some examples, the feedback message receiving manager 845 may receive, from the base station via the reconfigurable surface, a second feedback message including a second indication of one or more precoder configurations of the second set of precoder configurations based on transmitting the second set of reference signals. In some cases, the feedback message is received within at least one feedback message occasion of the second cycle of the sweep procedure that is associated with the at least one precoder configuration.

The uplink transmitting manager 850 may transmit, to the base station via the reconfigurable surface, an uplink transmission based on receiving the feedback message. In some examples, the uplink transmitting manager 850 may communicate with the base station via the reconfigurable surface based on transmitting the additional reference signal. In some examples, the uplink transmitting manager 850 may transmit, to the base station via the reconfigurable surface, a second uplink transmission based on receiving the second feedback message.

The reference signal measurement manager 825 may perform a set of measurements on the set of reference signals received during the sweep procedure.

The precoder configuration manager 830 may identify the at least one precoder configuration of the set of precoder configurations based on performing the set of measurements, where transmitting the feedback message is based on identifying the at least one precoder configuration.

In some cases, the reconfigurable surface includes a set of reflective surface elements, and where each precoder configuration of the set of precoder configurations includes a set of precoders associated with the set of reflective surface elements. In some cases, the reconfigurable surface is configured to modify an angle of reflection of signals incident on the reconfigurable surface based on the set of precoders associated with the set of reflective surface elements. In some cases, the reconfigurable surface is configured to modify an angle of reflection of signals incident on the reconfigurable surface by modifying a precoder configuration of the set of precoder configurations, transitioning from a first precoder configuration to a second precoder configuration, or both. In some cases, the reconfigurable surface includes a set of reflective surface elements, and where each precoder configuration of the set of precoder configurations includes a set of precoders associated with the set of reflective surface elements.

The control message receiving manager 835 may receive, from the base station, a control message indicating a position of the reconfigurable surface, an orientation of the reconfigurable surface, or both, where receiving the set of reference signals, transmitting the feedback message, or both, is based on receiving the control message. In some examples, the control message receiving manager 835 may receive, from the base station, a first control message including a first indication of a set of precoder configurations for performing the sweep procedure. In some examples, the control message receiving manager 835 may receive, from the base station, a second control message including a second indication of the set of precoder configurations from the set of precoder configurations for performing the sweep procedure, where receiving the set of reference signals reflected by the reconfigurable surface using the set of precoder configurations is based on receiving the second control message.

In some examples, the control message receiving manager 835 may receive, from the base station, a control message including a second indication of a set of resources associated with the sweep procedure, where receiving the set of reference signals, transmitting the feedback message, or both, is based on receiving the control message. In some examples, the control message receiving manager 835 may receive, from the base station, a control message including a third indication of a set of precoder configurations for performing the sweep procedure, where the set of precoder configurations are included within the set of precoder configurations for performing the sweep procedure, and the second set of precoder configurations are not included within the set of precoder configurations for performing the sweep procedure.

In some examples, the control message receiving manager 835 may receive, from the base station, a control message indicating a position of the reconfigurable surface, an orientation of the reconfigurable surface, or both, where transmitting the set of reference signals, receiving the feedback message, or both, is based on receiving the control message. In some examples, the control message receiving manager 835 may receive, from the base station, a first control message including a first indication of a set of precoder configurations for performing the sweep procedure.

In some examples, the control message receiving manager 835 may receive, from the base station, a second control message including a second indication of the set of precoder configurations from the set of precoder configurations for performing the sweep procedure, where transmitting the set of reference signals reflected by the reconfigurable surface using the set of precoder configurations is based on receiving the second control message. In some examples, the control message receiving manager 835 may receive, from the base station, a control message including a second indication of a set of resources associated with the sweep procedure, where transmitting the set of reference signals, receiving the feedback message, or both, is based on receiving the control message. In some examples, the control message receiving manager 835 may receive, from the base station, a control message including a third indication of a set of precoder configurations for performing the sweep procedure, where the set of precoder configurations are included within the set of precoder configurations for performing the sweep procedure, and the second set of precoder configurations are not included within the set of precoder configurations for performing the sweep procedure. In some cases, the first control message includes an RRC message, an SSB message, or both, and where the second control message includes a DCI message, a MAC-CE message, or both.

Figure 9:
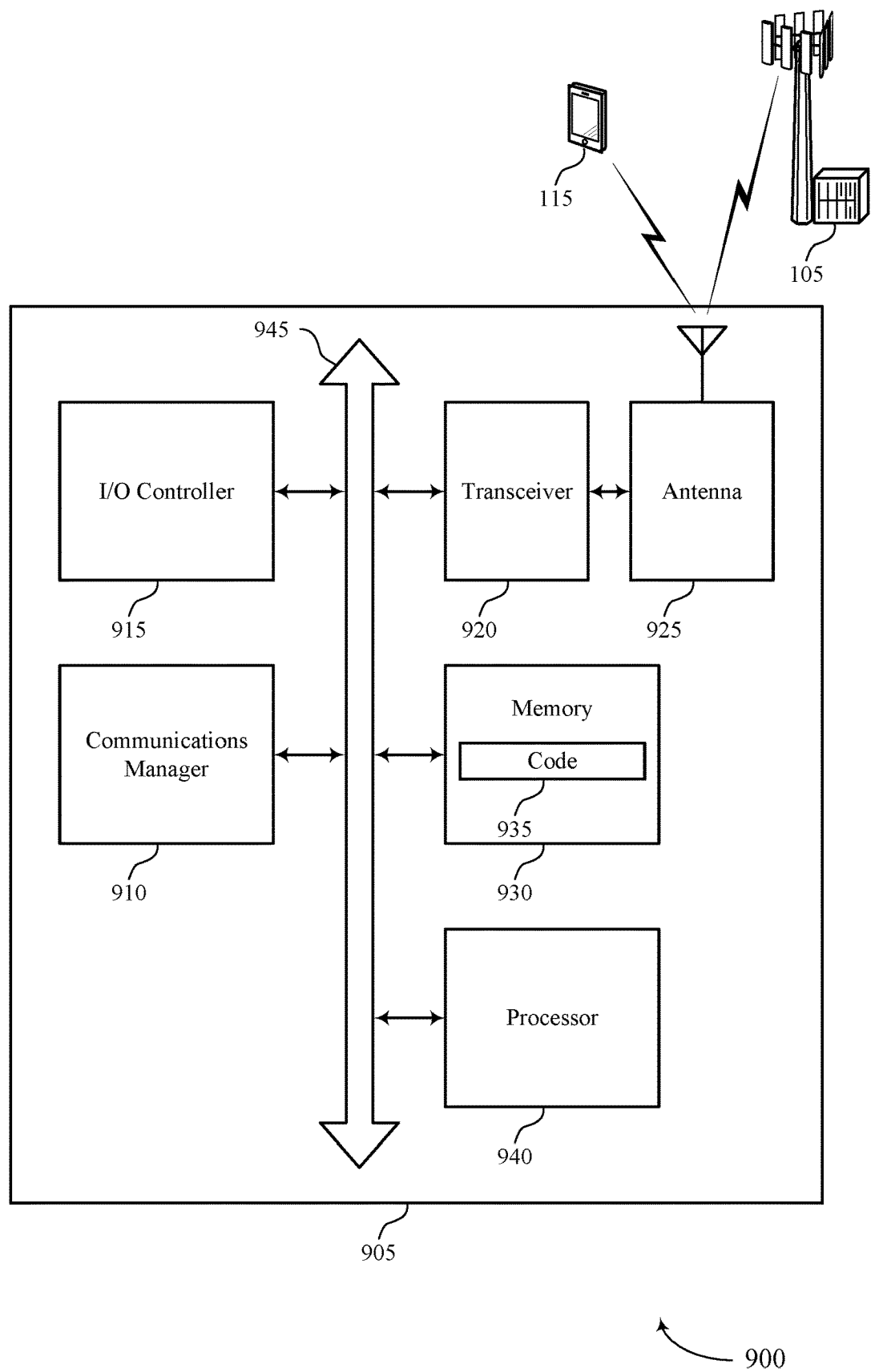
FIG. 9 shows a diagram of a system including a device that supports techniques for communicating using a reconfigurable surface in accordance with aspects of the present disclosure.

FIG. 9 shows a diagram of a system 900 including a device 905 that supports techniques for communicating using a reconfigurable surface in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the base station via the reconfigurable surface, a feedback message including an indication of at least one precoder configuration of the set of precoder configurations based on receiving the set of reference signals, and receive, from the base station via the reconfigurable surface, a downlink transmission based on transmitting the feedback message. The communications manager 910 may also transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals, receive, from the base station and reflected by the reconfigurable surface, a feedback message including an indication of at least one precoder configuration of the set of precoder configurations based on transmitting the set of reference signals, and transmit, to the base station via the reconfigurable surface, an uplink transmission based on receiving the feedback message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for communicating using a reconfigurable surface).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
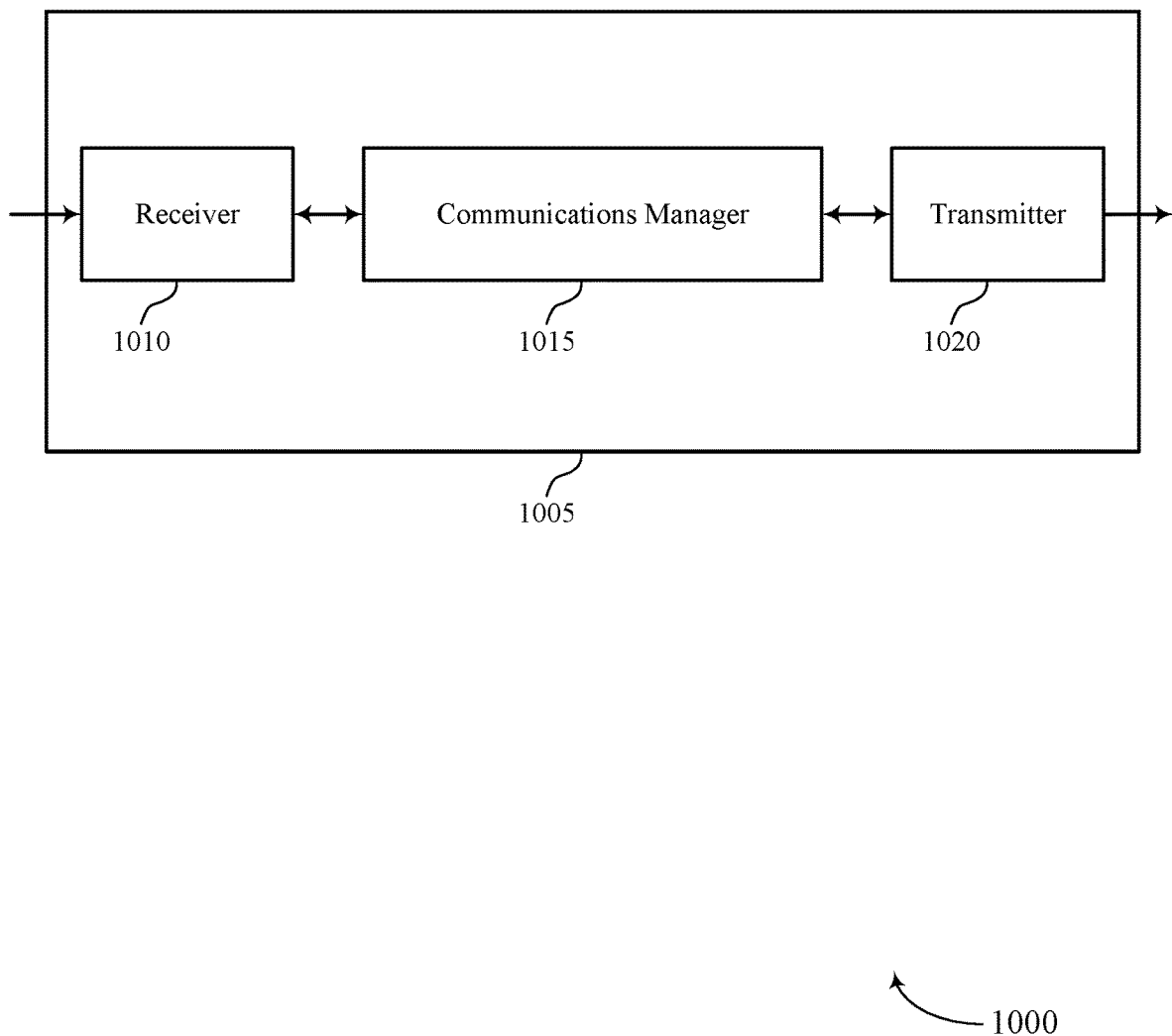
FIGS. 10 and 11 show block diagrams of devices that support techniques for communicating using a reconfigurable surface in accordance with aspects of the present disclosure.

FIG. 10 shows a block diagram 1000 of a device 1005 that supports techniques for communicating using a reconfigurable surface in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for communicating using a reconfigurable surface, etc.). Information may be passed on to other components of the device 1005. The receiver 1010 may be an example of aspects of the transceiver 1320 described with reference to FIG. 13. The receiver 1010 may utilize a single antenna or a set of antennas.

In the context of a sweep procedure associated with configuring a reconfigurable surface 205 for downlink communications, the communications manager 1015 may transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, receive, from the UE and reflected by the reconfigurable surface, a feedback message including an indication of at least one precoder configuration of the set of precoder configurations based on transmitting the set of reference signals, and transmit, to the UE via the reconfigurable surface, a downlink transmission based on transmitting the feedback message.

In the context of a sweep procedure associated with configuring a reconfigurable surface 205 for uplink communications, the communications manager 1015 may also receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the UE via the reconfigurable surface, a feedback message including an indication of at least one precoder configuration of the set of precoder configurations based on receiving the set of reference signals, and receive, from the UE via the reconfigurable surface, an uplink transmission based on transmitting the feedback message. The communications manager 1015 may be an example of aspects of the communications manager 1310 described herein.

The actions performed by the communications manager 1015 as described herein may be implemented to realize one or more potential advantages. For example, enabling for improved precoder configuration selection, techniques described herein may increase throughput within a wireless communications system (e.g., wireless communications system 100 or 200) and provide for improved beamforming gain. Additionally, the techniques described herein may enable the base station 105 to circumvent obstructions which would otherwise interrupt wireless communications, thereby increasing a quantity of UEs 115 which may be communicatively coupled to the network. Furthermore, by improving precoder configuration selection of the passive reconfigurable surface 205 (e.g., RIS), techniques described herein may reduce a power consumption which is associated with active reconfigurable surfaces (e.g., AAUs), thereby improving the overall power efficiency of the wireless communications system.

Based on providing more efficient precoder configuration selection in the context of reconfigurable surfaces 205, a processor of the base station 105 (e.g., a processor controlling the receiver 1010, the communications manager 1015, the transmitter 1020, etc.) may reduce processing resources used for wireless communications. For example, by improving precoder selection for reconfigurable surfaces, the efficiency and reliability of wireless communications carried out via the reconfigurable surface 205 may be improved. Moreover, by improving the selection of precoder configurations, techniques described herein may reduce the number of retransmissions used to successfully receive uplink transmissions and perform downlink transmissions at the base station 105, correspondingly reducing a number of times the processor ramps up processing power and turns on processing units to handle uplink reception and downlink transmission.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
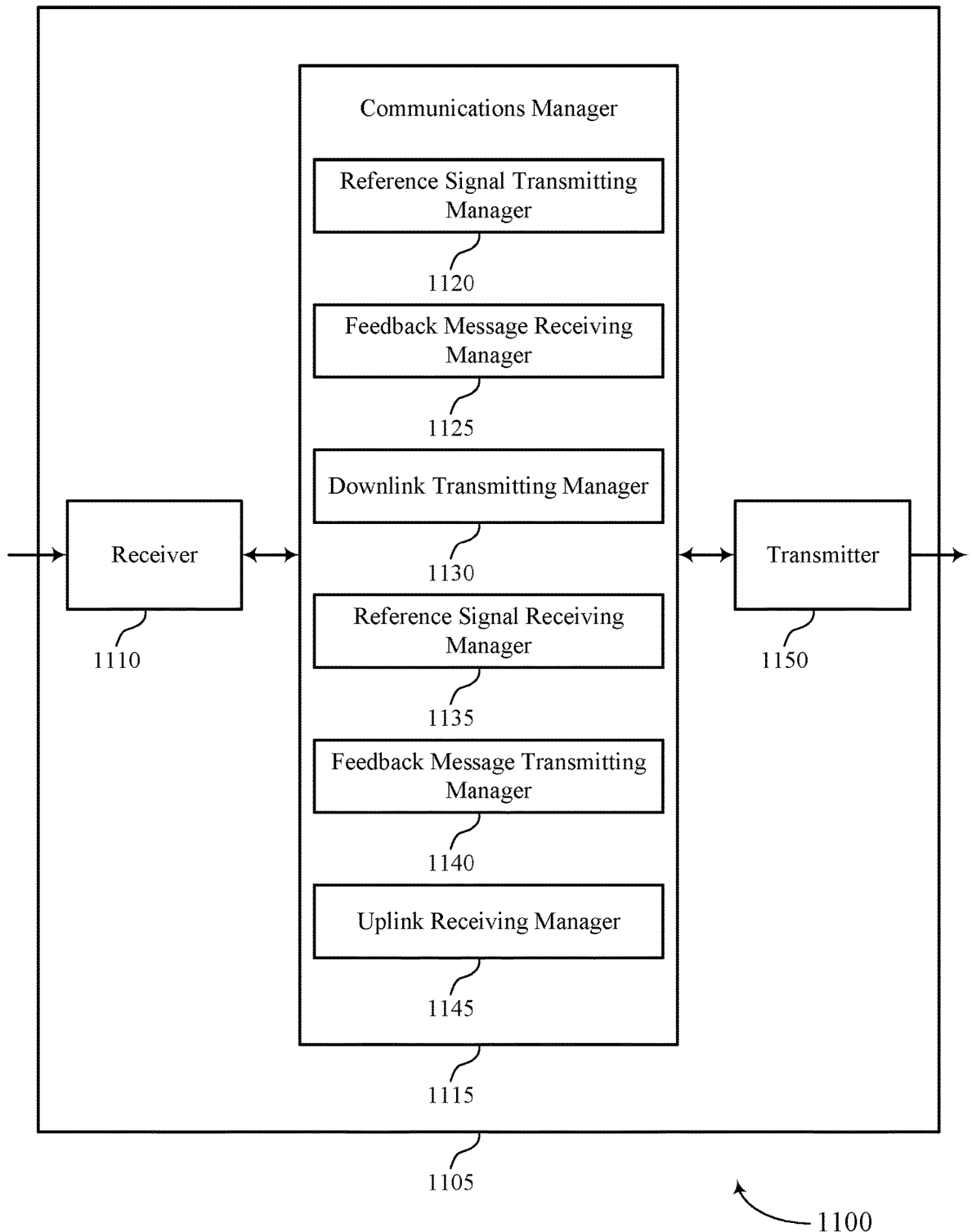

FIG. 11 shows a block diagram 1100 of a device 1105 that supports techniques for communicating using a reconfigurable surface in accordance with aspects of the present disclosure. The device 1105 may be an example of aspects of a device 1005, or a base station 105 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for communicating using a reconfigurable surface, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal transmitting manager 1120, a feedback message receiving manager 1125, a downlink transmitting manager 1130, a reference signal receiving manager 1135, a feedback message transmitting manager 1140, and an uplink receiving manager 1145. The communications manager 1115 may be an example of aspects of the communications manager 1310 described herein.

The reference signal transmitting manager 1120 may transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals.

The feedback message receiving manager 1125 may receive, from the UE and reflected by the reconfigurable surface, a feedback message including an indication of at least one precoder configuration of the set of precoder configurations based on transmitting the set of reference signals.

The downlink transmitting manager 1130 may transmit, to the UE via the reconfigurable surface, a downlink transmission based on transmitting the feedback message.

The reference signal receiving manager 1135 may receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals.

The feedback message transmitting manager 1140 may transmit, to the UE via the reconfigurable surface, a feedback message including an indication of at least one precoder configuration of the set of precoder configurations based on receiving the set of reference signals.

The uplink receiving manager 1145 may receive, from the UE via the reconfigurable surface, an uplink transmission based on transmitting the feedback message.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
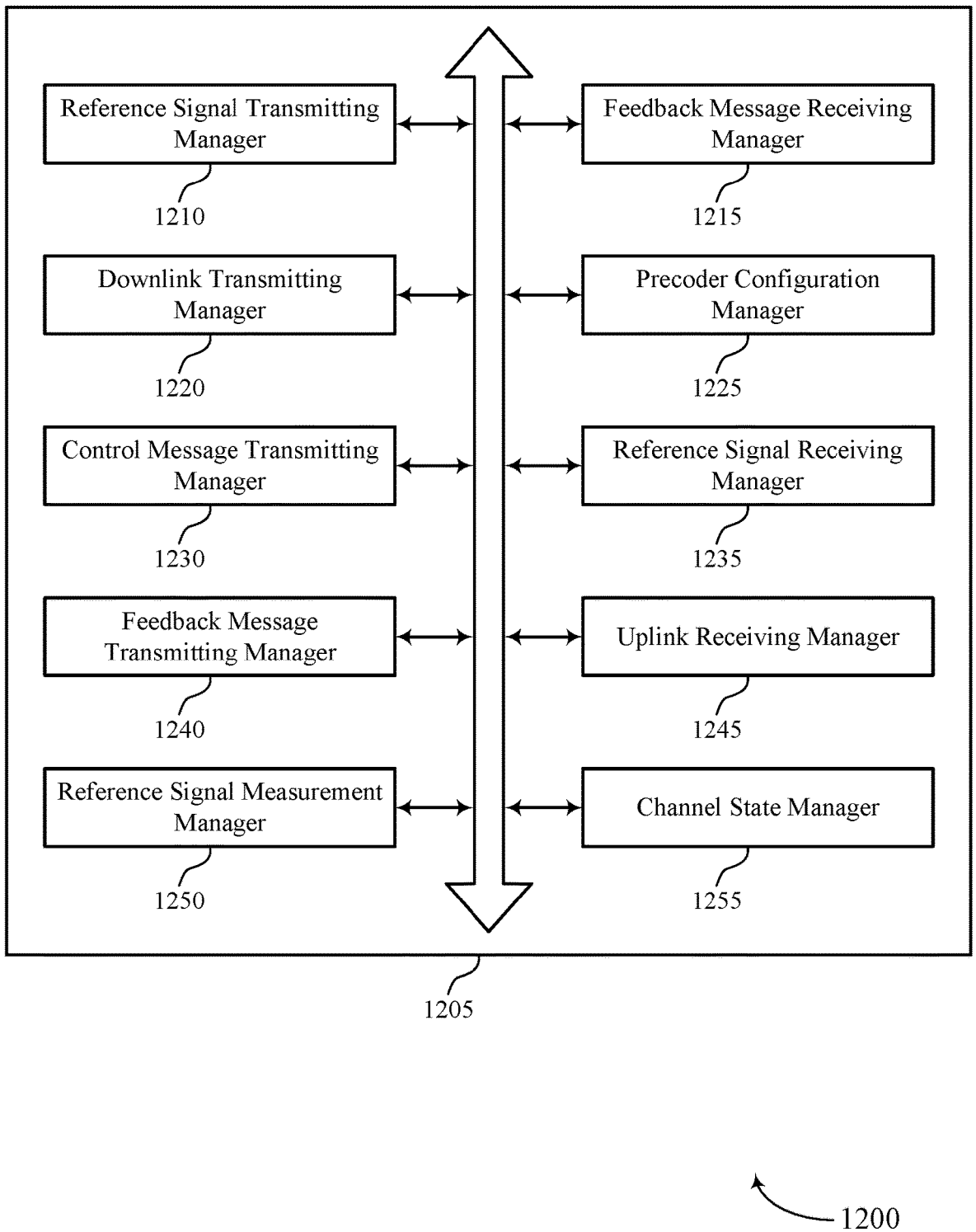
FIG. 12 shows a block diagram of a communications manager that supports techniques for communicating using a reconfigurable surface in accordance with aspects of the present disclosure.

FIG. 12 shows a block diagram 1200 of a communications manager 1205 that supports techniques for communicating using a reconfigurable surface in accordance with aspects of the present disclosure. The communications manager 1205 may be an example of aspects of a communications manager 1015, a communications manager 1115, or a communications manager 1310 described herein. The communications manager 1205 may include a reference signal transmitting manager 1210, a feedback message receiving manager 1215, a downlink transmitting manager 1220, a precoder configuration manager 1225, a control message transmitting manager 1230, a reference signal receiving manager 1235, a feedback message transmitting manager 1240, an uplink receiving manager 1245, a reference signal measurement manager 1250, and a channel state manager 1255. Each of these modules may communicate, directly or indirectly, with one another (e.g., via one or more buses).

The reference signal transmitting manager 1210 may transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals. In some examples, the reference signal transmitting manager 1210 may transmit, to a second UE via the reconfigurable surface, a second set of reference signals reflected by the reconfigurable surface using the set of precoder configurations. In some examples, transmitting the set of reference signals further includes transmitting the set of reference signals within the set of reference signal occasions of a first cycle of the sweep procedure.

In some examples, the reference signal transmitting manager 1210 may transmit, to the UE, an additional reference signal reflected by the reconfigurable surface using the at least one precoder configuration. In some examples, the reference signal transmitting manager 1210 may transmit, to the UE via the reconfigurable surface, a second set of reference signals reflected by the reconfigurable surface using a second set of precoder configurations based on receiving the feedback message, where the second set of precoder configurations is different from the set of precoder configurations, where the second set of reference signals are transmitted within a second set of reference signal occasions of a second sweep procedure associated with configuring the reconfigurable surface. In some cases, the set of reference signals include a first format, and where the second set of reference signals include a second format different from the first format. In some cases, the set of reference signals include a set of CSI-RSs, and where the feedback message includes a CSI report.

The feedback message receiving manager 1215 may receive, from the UE and reflected by the reconfigurable surface, a feedback message including an indication of at least one precoder configuration of the set of precoder configurations based on transmitting the set of reference signals. In some examples, the feedback message receiving manager 1215 may receive, from the second UE via the reconfigurable surface, a second feedback message including a second indication of one or more precoder configurations of the set of precoder configurations based on transmitting the second set of reference signals. In some examples, receiving the feedback message further includes receiving the feedback message within a feedback message occasion of a second cycle of the sweep procedure, where the second cycle of the sweep procedure is subsequent to the first cycle of the sweep procedure.

In some examples, the feedback message receiving manager 1215 may receive, from the UE via the feedback message, a second indication of a first precoder configuration and a second precoder configuration of the set of precoder configurations, where transmitting the downlink transmission is based on receiving the second indication of the first precoder configuration and the second precoder configuration. In some examples, the feedback message receiving manager 1215 may receive, from the UE via the feedback message, a third indication of a priority associated with the first precoder configuration and the second precoder configuration, measurements performed on reference signals associated with the first precoder configuration and the second precoder configuration, or both, where transmitting the downlink transmission is based on receiving the third indication. In some examples, the feedback message receiving manager 1215 may receive, from the UE via the reconfigurable surface, a second feedback message including data indicative of CSI between the base station and the reconfigurable surface, between the reconfigurable surface and the UE, or both.

In some examples, the feedback message receiving manager 1215 may receive, from the UE via the reconfigurable surface, a second feedback message including a second indication of one or more precoder configurations of the second set of precoder configurations based on transmitting the second set of reference signals. In some cases, the feedback message is received within at least one feedback message occasion of the second cycle of the sweep procedure that is associated with the at least one precoder configuration.

The downlink transmitting manager 1220 may transmit, to the UE via the reconfigurable surface, a downlink transmission based on transmitting the feedback message. In some examples, the downlink transmitting manager 1220 may transmit, to the UE and the second UE via the reconfigurable surface, a second downlink transmission based on the selected precoder configuration. In some examples, the downlink transmitting manager 1220 may communicate with the UE via the reconfigurable surface based on receiving the second feedback message. In some examples, the downlink transmitting manager 1220 may transmit, to the UE via the reconfigurable surface, a second downlink transmission based on receiving the second feedback message.

The reference signal receiving manager 1235 may receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals. In some examples, receiving the set of reference signals further includes receiving the set of reference signals within the set of reference signal occasions of a first cycle of the sweep procedure.

In some examples, the reference signal receiving manager 1235 may receive, from the UE, an additional reference signal reflected by the reconfigurable surface using the at least one precoder configuration. In some examples, the reference signal receiving manager 1235 may receive, from the UE via the reconfigurable surface, a second set of reference signals reflected by the reconfigurable surface using a second set of precoder configurations based on transmitting the feedback message, where the second set of precoder configurations is different from the set of precoder configurations, where the second set of reference signals are transmitted within a second set of reference signal occasions of a second sweep procedure associated with configuring the reconfigurable surface.

In some cases, the set of reference signals include a first format, and where the second set of reference signals include a second format different from the first format. In some cases, each reference signal of the set of reference signals are reflected by the reconfigurable surface with a precoder configuration of the set of precoder configurations. In some cases, the set of reference signals include a set of CSI-RSs, and where the feedback message includes a CSI report.

The feedback message transmitting manager 1240 may transmit, to the UE via the reconfigurable surface, a feedback message including an indication of at least one precoder configuration of the set of precoder configurations based on receiving the set of reference signals. In some examples, transmitting the feedback message further includes transmitting the feedback message within a feedback message occasion of a second cycle of the sweep procedure, where the second cycle of the sweep procedure is subsequent to the first cycle of the sweep procedure.

In some examples, the feedback message transmitting manager 1240 may identify at least one feedback message occasion of the second cycle of the sweep procedure that is associated with the at least one precoder configuration, where the feedback message is transmitted within the at least one feedback message occasion of the second cycle of the sweep procedure. In some examples, the feedback message transmitting manager 1240 may transmit, to the UE via the reconfigurable surface, a second feedback message including a second indication of one or more precoder configurations of the second set of precoder configurations based on receiving the second set of reference signals.

The uplink receiving manager 1245 may receive, from the UE via the reconfigurable surface, an uplink transmission based on transmitting the feedback message. In some examples, the uplink receiving manager 1245 may communicate with the base station via the reconfigurable surface based on determining the CSI. In some examples, the uplink receiving manager 1245 may receive, from the UE via the reconfigurable surface, a second uplink transmission based on transmitting the second feedback message.

The precoder configuration manager 1225 may select a precoder configuration of the set of precoder configurations based on receiving the indication of the at least one precoder configuration from the UE and receiving the second indication of the one or more precoder configurations from the second UE. In some examples, the precoder configuration manager 1225 may identify the at least one precoder configuration of the set of precoder configurations based on performing the set of measurements, where transmitting the feedback message is based on identifying the at least one precoder configuration.

In some cases, each reference signal of the set of reference signals are reflected by the reconfigurable surface with a precoder configuration of the set of precoder configurations. In some cases, the reconfigurable surface includes a set of reflective surface elements, and where each precoder configuration of the set of precoder configurations includes a set of precoders associated with the set of reflective surface elements. In some cases, the reconfigurable surface is configured to modify an angle of reflection of signals incident on the reconfigurable surface based on the set of precoders associated with the set of reflective surface elements. In some cases, the reconfigurable surface is configured to modify an angle of reflection of signals incident on the reconfigurable surface by modifying a precoder configuration of the set of precoder configurations, transitioning from a first precoder configuration to a second precoder configuration, or both.

The control message transmitting manager 1230 may transmit, to the UE, a control message indicating a position of the reconfigurable surface, an orientation of the reconfigurable surface, or both, where transmitting the set of reference signals, receiving the feedback message, or both, is based on transmitting the control message. In some examples, the control message transmitting manager 1230 may transmit, to the UE, a first control message including a first indication of a set of precoder configurations for performing the sweep procedure. In some examples, the control message transmitting manager 1230 may transmit, to the UE, a second control message including a second indication of the set of precoder configurations from the set of precoder configurations for performing the sweep procedure, where transmitting the set of reference signals reflected by the reconfigurable surface using the set of precoder configurations is based on transmitting the second control message.

In some examples, the control message transmitting manager 1230 may transmit, to the UE, a control message including a second indication of a set of resources associated with the sweep procedure, where transmitting the set of reference signals, receiving the feedback message, or both, is based on transmitting the control message. In some examples, the control message transmitting manager 1230 may transmit, to the UE, a control message including a third indication of a set of precoder configurations for performing the sweep procedure, where the set of precoder configurations are included within the set of precoder configurations for performing the sweep procedure, and the second set of precoder configurations are not included within the set of precoder configurations for performing the sweep procedure. In some examples, the control message transmitting manager 1230 may transmit, to the UE, a control message indicating a position of the reconfigurable surface, an orientation of the reconfigurable surface, or both, where receiving the set of reference signals, transmitting the feedback message, or both, is based on transmitting the control message.

In some examples, the control message transmitting manager 1230 may transmit, to the UE, a first control message including a first indication of a set of precoder configurations for performing the sweep procedure. In some examples, the control message transmitting manager 1230 may transmit, to the UE, a second control message including a second indication of the set of precoder configurations from the set of precoder configurations for performing the sweep procedure, where receiving the set of reference signals reflected by the reconfigurable surface using the set of precoder configurations is based on transmitting the second control message. In some examples, the control message transmitting manager 1230 may transmit, to the UE, a control message including a second indication of a set of resources associated with the sweep procedure, where receiving the set of reference signals, transmitting the feedback message, or both, is based on transmitting the control message.

In some examples, the control message transmitting manager 1230 may transmit, to the UE, a control message including a third indication of a set of precoder configurations for performing the sweep procedure, where the set of precoder configurations are included within the set of precoder configurations for performing the sweep procedure, and the second set of precoder configurations are not included within the set of precoder configurations for performing the sweep procedure. In some cases, the first control message includes an RRC message, an SSB message, or both, and where the second control message includes a DCI message, a MAC-CE message, or both.

The reference signal measurement manager 1250 may perform a set of measurements on the set of reference signals received during the sweep procedure.

The channel state manager 1255 may determine CSI between the base station and the reconfigurable surface, between the reconfigurable surface and the UE, or both.

Figure 13:
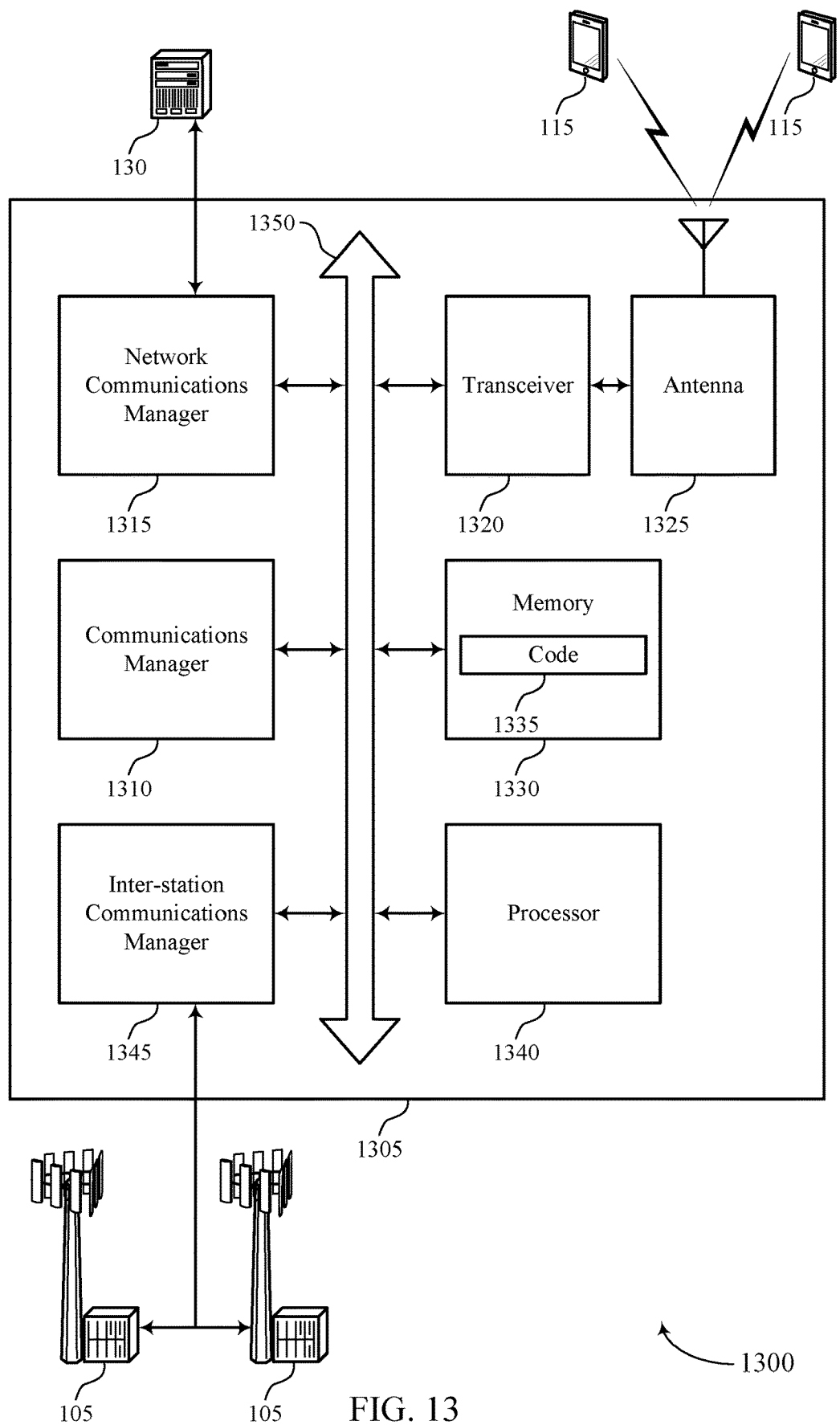
FIG. 13 shows a diagram of a system including a device that supports techniques for communicating using a reconfigurable surface in accordance with aspects of the present disclosure.

FIG. 13 shows a diagram of a system 1300 including a device 1305 that supports techniques for communicating using a reconfigurable surface in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals, receive, from the UE and reflected by the reconfigurable surface, a feedback message including an indication of at least one precoder configuration of the set of precoder configurations based on transmitting the set of reference signals, and transmit, to the UE via the reconfigurable surface, a downlink transmission based on transmitting the feedback message. The communications manager 1310 may also receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals, transmit, to the UE via the reconfigurable surface, a feedback message including an indication of at least one precoder configuration of the set of precoder configurations based on receiving the set of reference signals, and receive, from the UE via the reconfigurable surface, an uplink transmission based on transmitting the feedback message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for communicating using a reconfigurable surface).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
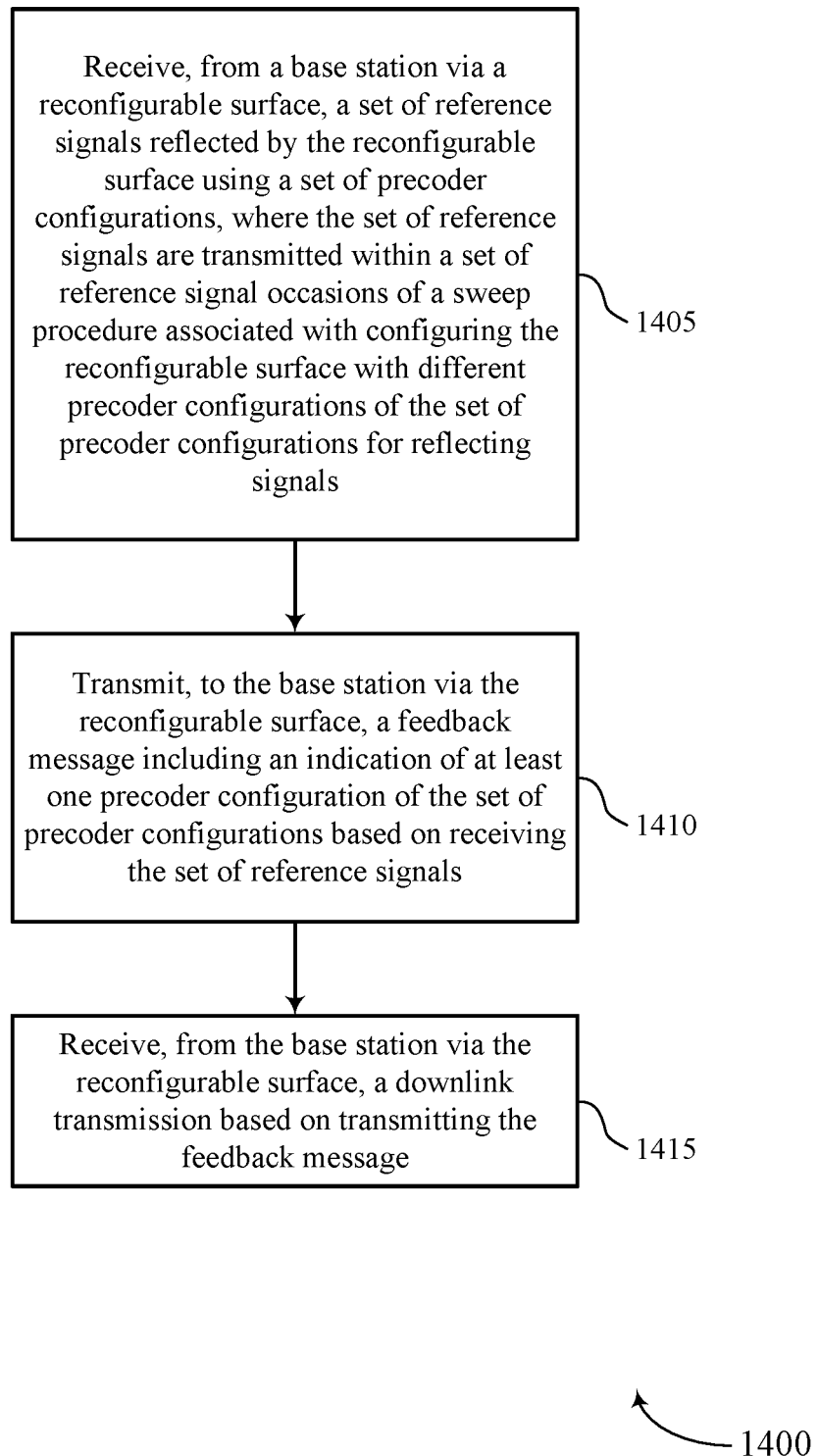
FIGS. 14 through 17 show flowcharts illustrating methods that support techniques for communicating using a reconfigurable surface in accordance with aspects of the present disclosure.

FIG. 14 shows a flowchart illustrating a method 1400 that supports techniques for communicating using a reconfigurable surface in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals. The operations of 1405 may be performed according to the methods described herein. In some examples, aspects of the operations of 1405 may be performed by a reference signal receiving manager as described with reference to FIGS. 6 through 9.

At 1410, the UE may transmit, to the base station via the reconfigurable surface, a feedback message including an indication of at least one precoder configuration of the set of precoder configurations based on receiving the set of reference signals. The operations of 1410 may be performed according to the methods described herein. In some examples, aspects of the operations of 1410 may be performed by a feedback message transmitting manager as described with reference to FIGS. 6 through 9.

At 1415, the UE may receive, from the base station via the reconfigurable surface, a downlink transmission based on transmitting the feedback message. The operations of 1415 may be performed according to the methods described herein. In some examples, aspects of the operations of 1415 may be performed by a downlink receiving manager as described with reference to FIGS. 6 through 9.

Figure 15:
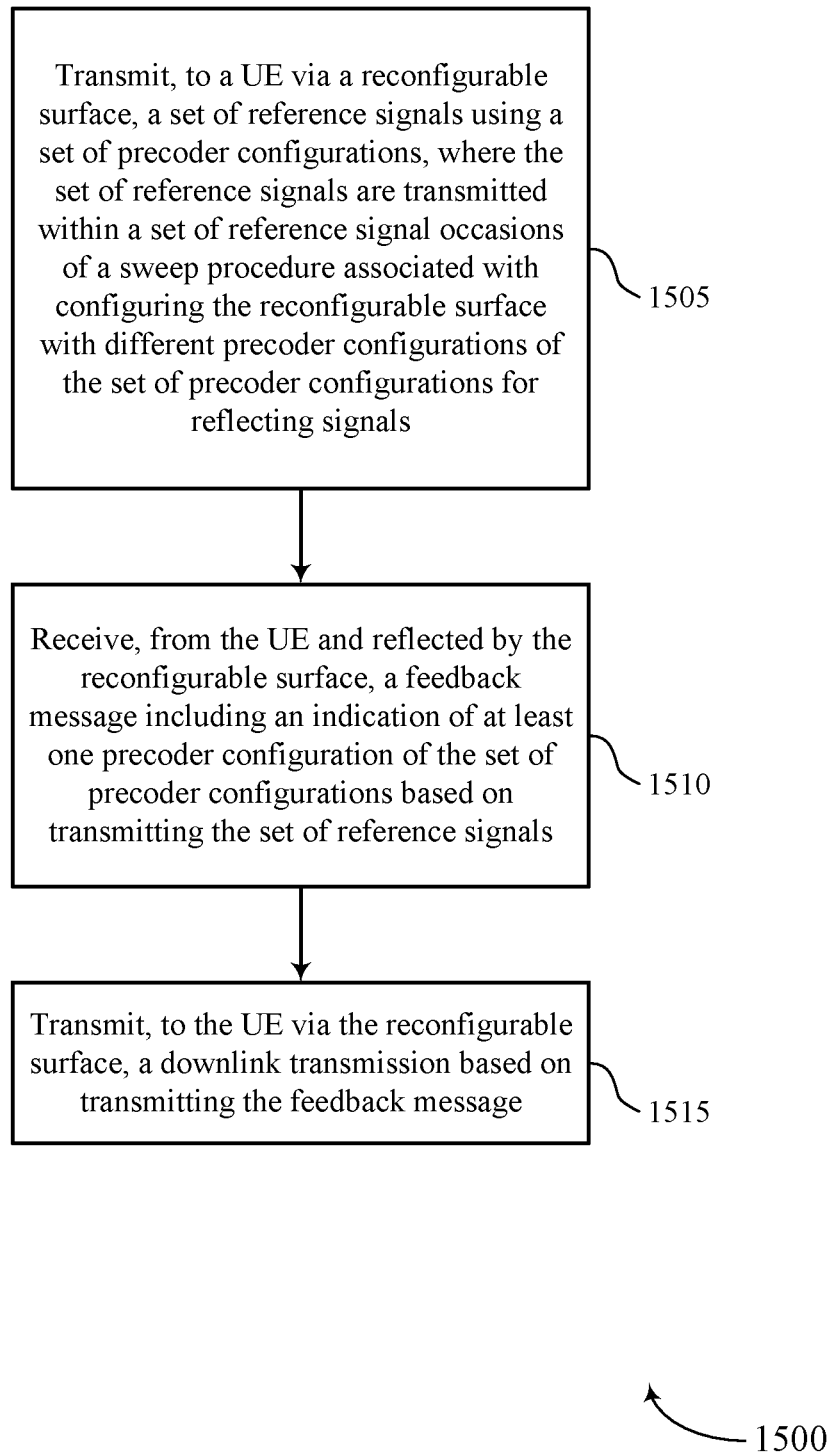

FIG. 15 shows a flowchart illustrating a method 1500 that supports techniques for communicating using a reconfigurable surface in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE via a reconfigurable surface, a set of reference signals using a set of precoder configurations, where the set of reference signals are transmitted within a set of reference signal occasions of a sweep procedure associated with configuring the reconfigurable surface with different precoder configurations of the set of precoder configurations for reflecting signals. The operations of 1505 may be performed according to the methods described herein. In some examples, aspects of the operations of 1505 may be performed by a reference signal transmitting manager as described with reference to FIGS. 10 through 13.

At 1510, the base station may receive, from the UE and reflected by the reconfigurable surface, a feedback message including an indication of at least one precoder configuration of the set of precoder configurations based on transmitting the set of reference signals. The operations of 1510 may be performed according to the methods described herein. In some examples, aspects of the operations of 1510 may be performed by a feedback message receiving manager as described with reference to FIGS. 10 through 13.

At 1515, the base station may transmit, to the UE via the reconfigurable surface, a downlink transmission based on transmitting the feedback message. The operations of 1515 may be performed according to the methods described herein. In some examples, aspects of the operations of 1515 may be performed by a downlink transmitting manager as described with reference to FIGS. 10 through 13.

Figure 16:
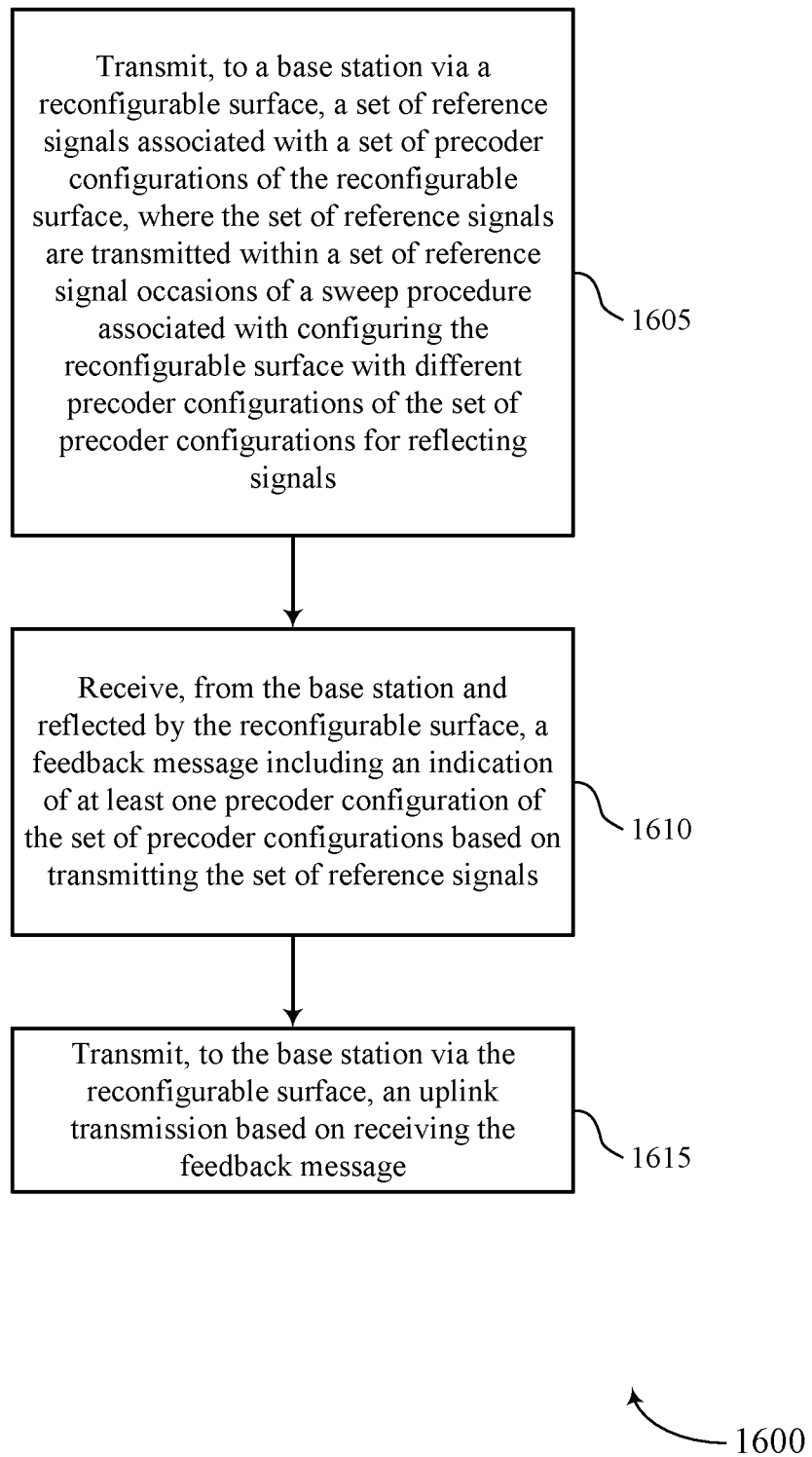

FIG. 16 shows a flowchart illustrating a method 1600 that supports techniques for communicating using a reconfigurable surface in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station via a reconfigurable surface, a set of reference signals associated with a set of precoder configurations of the reconfigurable surface, where the set of reference signals are transmitted within a set of reference signal occasions of a sweep procedure associated with configuring the reconfigurable surface with different precoder configurations of the set of precoder configurations for reflecting signals. The operations of 1605 may be performed according to the methods described herein. In some examples, aspects of the operations of 1605 may be performed by a reference signal transmitting manager as described with reference to FIGS. 6 through 9.

At 1610, the UE may receive, from the base station and reflected by the reconfigurable surface, a feedback message including an indication of at least one precoder configuration of the set of precoder configurations based on transmitting the set of reference signals. The operations of 1610 may be performed according to the methods described herein. In some examples, aspects of the operations of 1610 may be performed by a feedback message receiving manager as described with reference to FIGS. 6 through 9.

At 1615, the UE may transmit, to the base station via the reconfigurable surface, an uplink transmission based on receiving the feedback message. The operations of 1615 may be performed according to the methods described herein. In some examples, aspects of the operations of 1615 may be performed by an uplink transmitting manager as described with reference to FIGS. 6 through 9.

Figure 17:
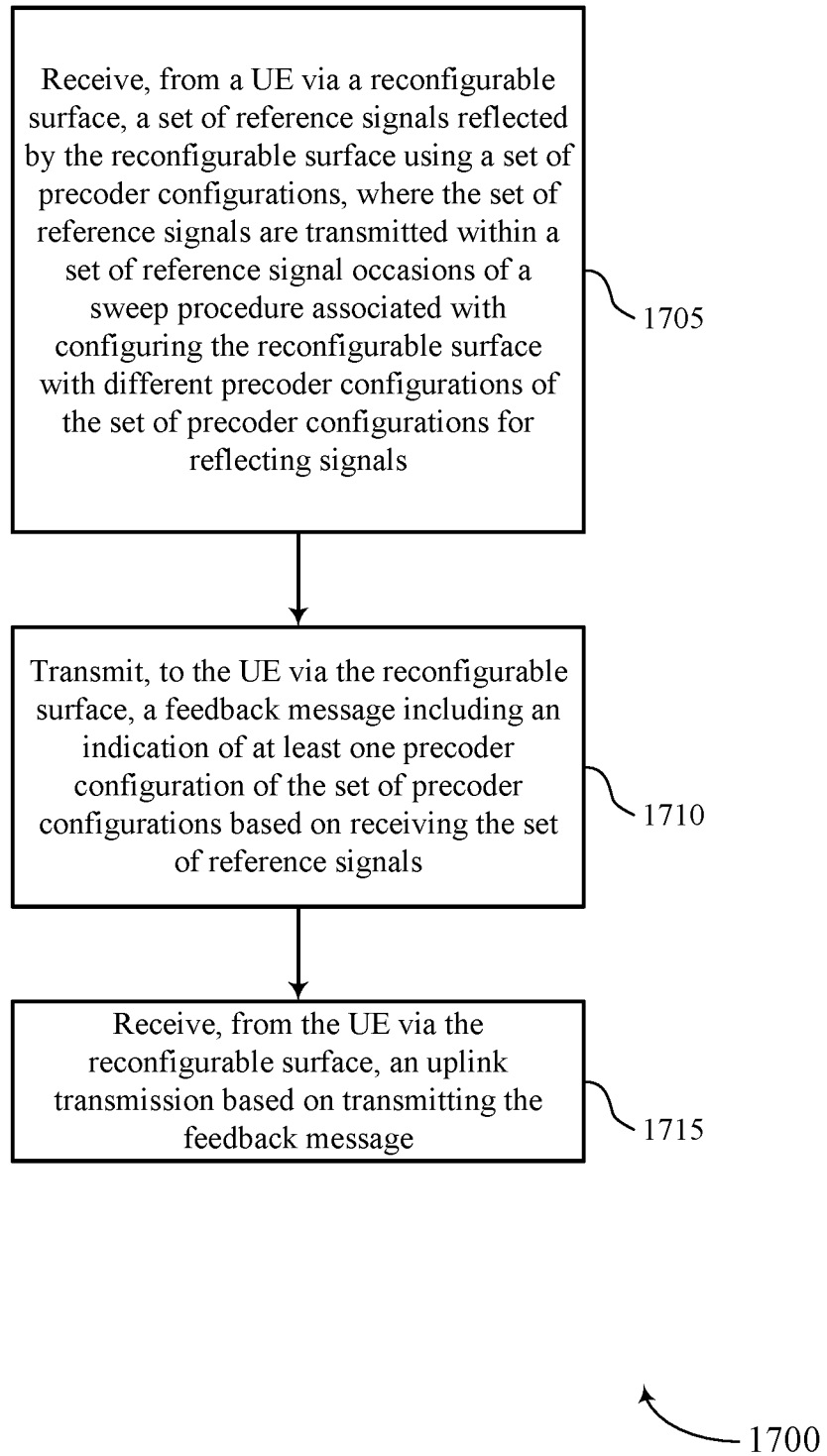

FIG. 17 shows a flowchart illustrating a method 1700 that supports techniques for communicating using a reconfigurable surface in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE via a reconfigurable surface, a set of reference signals reflected by the reconfigurable surface using a set of precoder configurations, where the set of reference signals are transmitted within a set of reference signal occasions of a sweep procedure associated with configuring the reconfigurable surface with different precoder configurations of the set of precoder configurations for reflecting signals. The operations of 1705 may be performed according to the methods described herein. In some examples, aspects of the operations of 1705 may be performed by a reference signal receiving manager as described with reference to FIGS. 10 through 13.

At 1710, the base station may transmit, to the UE via the reconfigurable surface, a feedback message including an indication of at least one precoder configuration of the set of precoder configurations based on receiving the set of reference signals. The operations of 1710 may be performed according to the methods described herein. In some examples, aspects of the operations of 1710 may be performed by a feedback message transmitting manager as described with reference to FIGS. 10 through 13.

At 1715, the base station may receive, from the UE via the reconfigurable surface, an uplink transmission based on transmitting the feedback message. The operations of 1715 may be performed according to the methods described herein. In some examples, aspects of the operations of 1715 may be performed by an uplink receiving manager as described with reference to FIGS. 10 through 13.

The following provides an overview of aspects of the present disclosure:

Aspect 1: A method for wireless communication at a UE, comprising: receiving, from a base station via a reconfigurable surface, a set of reference signals reflected by the reconfigurable surface using a set of precoder configurations, wherein the set of reference signals are transmitted within a set of reference signal occasions of a sweep procedure associated with configuring the reconfigurable surface with different precoder configurations of the set of precoder configurations for reflecting signals; transmitting, to the base station via the reconfigurable surface, a feedback message comprising an indication of at least one precoder configuration of the set of precoder configurations based at least in part on receiving the set of reference signals; and receiving, from the base station via the reconfigurable surface, a downlink transmission based at least in part on transmitting the feedback message.

Aspect 2: The method of aspect 1, further comprising: performing a set of measurements on the set of reference signals received during the sweep procedure; and identifying the at least one precoder configuration of the set of precoder configurations based at least in part on performing the set of measurements, wherein transmitting the feedback message is based at least in part on identifying the at least one precoder configuration.

Aspect 3: The method of any of aspects 1 through 2, wherein receiving the set of reference signals further comprises receiving the set of reference signals within the set of reference signal occasions of a first cycle of the sweep procedure; and transmitting the feedback message further comprises transmitting the feedback message within a feedback message occasion of a second cycle of the sweep procedure, wherein the second cycle of the sweep procedure is subsequent to the first cycle of the sweep procedure.

Aspect 4: The method of aspect 3, further comprising: identifying at least one feedback message occasion of the second cycle of the sweep procedure that is associated with the at least one precoder configuration, wherein the feedback message is transmitted within the at least one feedback message occasion of the second cycle of the sweep procedure.

Aspect 5: The method of any of aspects 1 through 4, further comprising: receiving, from the base station, a control message indicating a position of the reconfigurable surface, an orientation of the reconfigurable surface, or both, wherein receiving the set of reference signals, transmitting the feedback message, or both, is based at least in part on receiving the control message.

Aspect 6: The method of any of aspects 1 through 5, further comprising: receiving, from the base station, a first control message comprising a first indication of a plurality of precoder configurations for performing the sweep procedure; and receiving, from the base station, a second control message comprising a second indication of the set of precoder configurations from the plurality of precoder configurations for performing the sweep procedure, wherein receiving the set of reference signals reflected by the reconfigurable surface using the set of precoder configurations is based at least in part on receiving the second control message.

Aspect 7: The method of aspect 6, wherein the first control message comprises a RRC message, a SSB message, or both, and the second control message comprises a DCI message, a MAC-CE message, or both.

Aspect 8: The method of any of aspects 1 through 7, further comprising: receiving, from the base station, a control message comprising a second indication of a set of resources associated with the sweep procedure, wherein receiving the set of reference signals, transmitting the feedback message, or both, is based at least in part on receiving the control message.

Aspect 9: The method of any of aspects 1 through 8, further comprising: transmitting, to the base station via the feedback message, a second indication of a first precoder configuration and a second precoder configuration of the set of precoder configurations, wherein receiving the downlink transmission is based at least in part on transmitting the second indication of the first precoder configuration and the second precoder configuration.

Aspect 10: The method of aspect 9, further comprising: transmitting, to the base station via the feedback message, a third indication of a priority associated with the first precoder configuration and the second precoder configuration, measurements performed on reference signals associated with the first precoder configuration and the second precoder configuration, or both, wherein receiving the downlink transmission is based at least in part on transmitting the third indication.

Aspect 11: The method of any of aspects 1 through 10, further comprising: receiving, from the base station, an additional reference signal reflected by the reconfigurable surface using the at least one precoder configuration; transmitting, to the base station via the reconfigurable surface, a second feedback message comprising data indicative of CSI between the base station and the reconfigurable surface, between the reconfigurable surface and the UE, or both; and communicating with the base station via the reconfigurable surface based at least in part on transmitting the second feedback message.

Aspect 12: The method of any of aspects 1 through 11, further comprising: receiving, from the base station via the reconfigurable surface, a second set of reference signals reflected by the reconfigurable surface using a second set of precoder configurations based at least in part on transmitting the feedback message, wherein the second set of precoder configurations is different from the set of precoder configurations, wherein the second set of reference signals are transmitted within a second set of reference signal occasions of a second sweep procedure associated with configuring the reconfigurable surface; transmitting, to the base station via the reconfigurable surface, a second feedback message comprising a second indication of one or more precoder configurations of the second set of precoder configurations based at least in part on receiving the second set of reference signals; and receiving, from the base station via the reconfigurable surface, a second downlink transmission based at least in part on transmitting the second feedback message.

Aspect 13: The method of aspect 12, further comprising: receiving, from the base station, a control message comprising a third indication of a plurality of precoder configurations for performing the sweep procedure, wherein the set of precoder configurations are included within the plurality of precoder configurations for performing the sweep procedure, and the second set of precoder configurations are not included within the plurality of precoder configurations for performing the sweep procedure.

Aspect 14: The method of any of aspects 12 through 13, wherein the set of reference signals comprise a first format, and the second set of reference signals comprise a second format different from the first format.

Aspect 15: The method of any of aspects 1 through 14, wherein each reference signal of the set of reference signals are reflected by the reconfigurable surface with a precoder configuration of the set of precoder configurations.

Aspect 16: The method of any of aspects 1 through 15, wherein the reconfigurable surface comprises a plurality of reflective surface elements, and each precoder configuration of the set of precoder configurations comprises a plurality of precoders associated with the plurality of reflective surface elements.

Aspect 17: The method of aspect 16, wherein the reconfigurable surface is configured to modify an angle of reflection of signals incident on the reconfigurable surface based on the plurality of precoders associated with the plurality of reflective surface elements.

Aspect 18: The method of any of aspects 1 through 17, wherein the reconfigurable surface is configured to modify an angle of reflection of signals incident on the reconfigurable surface by modifying a precoder configuration of the set of precoder configurations, transitioning from a first precoder configuration to a second precoder configuration, or both.

Aspect 19: The method of any of aspects 1 through 18, wherein the set of reference signals comprise a set of CSI-RSs, and the feedback message comprises a CSI report.

Aspect 20: A method for wireless communication at a base station, comprising: transmitting, to a UE via a reconfigurable surface, a set of reference signals using a set of precoder configurations, wherein the set of reference signals are transmitted within a set of reference signal occasions of a sweep procedure associated with configuring the reconfigurable surface with different precoder configurations of the set of precoder configurations for reflecting signals; receiving, from the UE and reflected by the reconfigurable surface, a feedback message comprising an indication of at least one precoder configuration of the set of precoder configurations based at least in part on transmitting the set of reference signals; and transmitting, to the UE via the reconfigurable surface, a downlink transmission based at least in part on transmitting the feedback message.

Aspect 21: The method of aspect 20, further comprising: transmitting, to a second UE via the reconfigurable surface, a second set of reference signals reflected by the reconfigurable surface using the set of precoder configurations; receiving, from the second UE via the reconfigurable surface, a second feedback message comprising a second indication of one or more precoder configurations of the set of precoder configurations based at least in part on transmitting the second set of reference signals; selecting a precoder configuration of the set of precoder configurations based at least in part on receiving the indication of the at least one precoder configuration from the UE and receiving the second indication of the one or more precoder configurations from the second UE; and transmitting, to the UE and the second UE via the reconfigurable surface, a second downlink transmission based at least in part on the selected precoder configuration.

Aspect 22: The method of any of aspects 20 through 21, wherein transmitting the set of reference signals further comprises transmitting the set of reference signals within the set of reference signal occasions of a first cycle of the sweep procedure; and receiving the feedback message further comprises receiving the feedback message within a feedback message occasion of a second cycle of the sweep procedure, wherein the second cycle of the sweep procedure is subsequent to the first cycle of the sweep procedure.

Aspect 23: The method of aspect 22, wherein the feedback message is received within at least one feedback message occasion of the second cycle of the sweep procedure that is associated with the at least one precoder configuration.

Aspect 24: The method of any of aspects 20 through 23, further comprising: transmitting, to the UE, a control message indicating a position of the reconfigurable surface, an orientation of the reconfigurable surface, or both, wherein transmitting the set of reference signals, receiving the feedback message, or both, is based at least in part on transmitting the control message.

Aspect 25: The method of any of aspects 20 through 24, further comprising: transmitting, to the UE, a first control message comprising a first indication of a plurality of precoder configurations for performing the sweep procedure; and transmitting, to the UE, a second control message comprising a second indication of the set of precoder configurations from the plurality of precoder configurations for performing the sweep procedure, wherein transmitting the set of reference signals reflected by the reconfigurable surface using the set of precoder configurations is based at least in part on transmitting the second control message.

Aspect 26: The method of aspect 25, wherein the first control message comprises a RRC message, a SSB message, or both, and the second control message comprises a DCI message, a MAC-CE message, or both.

Aspect 27: The method of any of aspects 20 through 26, further comprising: transmitting, to the UE, a control message comprising a second indication of a set of resources associated with the sweep procedure, wherein transmitting the set of reference signals, receiving the feedback message, or both, is based at least in part on transmitting the control message.

Aspect 28: The method of any of aspects 20 through 27, further comprising: receiving, from the UE via the feedback message, a second indication of a first precoder configuration and a second precoder configuration of the set of precoder configurations, wherein transmitting the downlink transmission is based at least in part on receiving the second indication of the first precoder configuration and the second precoder configuration.

Aspect 29: The method of aspect 28, further comprising: receiving, from the UE via the feedback message, a third indication of a priority associated with the first precoder configuration and the second precoder configuration, measurements performed on reference signals associated with the first precoder configuration and the second precoder configuration, or both, wherein transmitting the downlink transmission is based at least in part on receiving the third indication.

Aspect 30: The method of any of aspects 20 through 29, further comprising: transmitting, to the UE, an additional reference signal reflected by the reconfigurable surface using the at least one precoder configuration; receiving, from the UE via the reconfigurable surface, a second feedback message comprising data indicative of CSI between the base station and the reconfigurable surface, between the reconfigurable surface and the UE, or both; and communicating with the UE via the reconfigurable surface based at least in part on receiving the second feedback message.

Aspect 31: The method of any of aspects 20 through 30, further comprising: transmitting, to the UE via the reconfigurable surface, a second set of reference signals reflected by the reconfigurable surface using a second set of precoder configurations based at least in part on receiving the feedback message, wherein the second set of precoder configurations is different from the set of precoder configurations, wherein the second set of reference signals are transmitted within a second set of reference signal occasions of a second sweep procedure associated with configuring the reconfigurable surface; receiving, from the UE via the reconfigurable surface, a second feedback message comprising a second indication of one or more precoder configurations of the second set of precoder configurations based at least in part on transmitting the second set of reference signals; and transmitting, to the UE via the reconfigurable surface, a second downlink transmission based at least in part on receiving the second feedback message.

Aspect 32: The method of aspect 31, further comprising: transmitting, to the UE, a control message comprising a third indication of a plurality of precoder configurations for performing the sweep procedure, wherein the set of precoder configurations are included within the plurality of precoder configurations for performing the sweep procedure, and the second set of precoder configurations are not included within the plurality of precoder configurations for performing the sweep procedure.

Aspect 33: The method of any of aspects 31 through 32, wherein the set of reference signals comprise a first format, and the second set of reference signals comprise a second format different from the first format.

Aspect 34: The method of any of aspects 20 through 33, wherein each reference signal of the set of reference signals are reflected by the reconfigurable surface with a precoder configuration of the set of precoder configurations.

Aspect 35: The method of any of aspects 20 through 34, wherein the reconfigurable surface comprises a plurality of reflective surface elements, and each precoder configuration of the set of precoder configurations comprises a plurality of precoders associated with the plurality of reflective surface elements.

Aspect 36: The method of aspect 35, wherein the reconfigurable surface is configured to modify an angle of reflection of signals incident on the reconfigurable surface based on the plurality of precoders associated with the plurality of reflective surface elements.

Aspect 37: The method of any of aspects 20 through 36, wherein the reconfigurable surface is configured to modify an angle of reflection of signals incident on the reconfigurable surface by modifying a precoder configuration of the set of precoder configurations, transitioning from a first precoder configuration to a second precoder configuration, or both.

Aspect 38: The method of any of aspects 20 through 37, wherein the set of reference signals comprise a set of CSI-RSs, and the feedback message comprises a CSI report.

Aspect 39: A method for wireless communication at a UE, comprising: transmitting, to a base station via a reconfigurable surface, a set of reference signals associated with a set of precoder configurations of the reconfigurable surface, wherein the set of reference signals are transmitted within a set of reference signal occasions of a sweep procedure associated with configuring the reconfigurable surface with different precoder configurations of the set of precoder configurations for reflecting signals; receiving, from the base station and reflected by the reconfigurable surface, a feedback message comprising an indication of at least one precoder configuration of the set of precoder configurations based at least in part on transmitting the set of reference signals; and transmitting, to the base station via the reconfigurable surface, an uplink transmission based at least in part on receiving the feedback message.

Aspect 40: The method of aspect 39, wherein transmitting the set of reference signals further comprises transmitting the set of reference signals within the set of reference signal occasions of a first cycle of the sweep procedure; and receiving the feedback message further comprises receiving the feedback message within a feedback message occasion of a second cycle of the sweep procedure, wherein the second cycle of the sweep procedure is subsequent to the first cycle of the sweep procedure.

Aspect 41: The method of aspect 40, wherein the feedback message is received within at least one feedback message occasion of the second cycle of the sweep procedure that is associated with the at least one precoder configuration.

Aspect 42: The method of any of aspects 39 through 41, further comprising: receiving, from the base station, a control message indicating a position of the reconfigurable surface, an orientation of the reconfigurable surface, or both, wherein transmitting the set of reference signals, receiving the feedback message, or both, is based at least in part on receiving the control message.

Aspect 43: The method of any of aspects 39 through 42, further comprising: receiving, from the base station, a first control message comprising a first indication of a plurality of precoder configurations for performing the sweep procedure; and receiving, from the base station, a second control message comprising a second indication of the set of precoder configurations from the plurality of precoder configurations for performing the sweep procedure, wherein transmitting the set of reference signals reflected by the reconfigurable surface using the set of precoder configurations is based at least in part on receiving the second control message.

Aspect 44: The method of aspect 43, wherein the first control message comprises a RRC message, a SSB message, or both, and the second control message comprises a DCI message, a MAC-CE message, or both.

Aspect 45: The method of any of aspects 39 through 44, further comprising: receiving, from the base station, a control message comprising a second indication of a set of resources associated with the sweep procedure, wherein transmitting the set of reference signals, receiving the feedback message, or both, is based at least in part on receiving the control message.

Aspect 46: The method of any of aspects 39 through 45, further comprising: transmitting, to the base station, an additional reference signal reflected by the reconfigurable surface using the at least one precoder configuration; communicating with the base station via the reconfigurable surface based at least in part on transmitting the additional reference signal.

Aspect 47: The method of any of aspects 39 through 46, further comprising: transmitting, to the base station via the reconfigurable surface, a second set of reference signals reflected by the reconfigurable surface using a second set of precoder configurations based at least in part on receiving the feedback message, wherein the second set of precoder configurations is different from the set of precoder configurations, wherein the second set of reference signals are transmitted within a second set of reference signal occasions of a second sweep procedure associated with configuring the reconfigurable surface; receiving, from the base station via the reconfigurable surface, a second feedback message comprising a second indication of one or more precoder configurations of the second set of precoder configurations based at least in part on transmitting the second set of reference signals; and transmitting, to the base station via the reconfigurable surface, a second uplink transmission based at least in part on receiving the second feedback message.

Aspect 48: The method of aspect 47, further comprising: receiving, from the base station, a control message comprising a third indication of a plurality of precoder configurations for performing the sweep procedure, wherein the set of precoder configurations are included within the plurality of precoder configurations for performing the sweep procedure, and the second set of precoder configurations are not included within the plurality of precoder configurations for performing the sweep procedure.

Aspect 49: The method of any of aspects 47 through 48, wherein the set of reference signals comprise a first format, and the second set of reference signals comprise a second format different from the first format.

Aspect 50: The method of any of aspects 39 through 49, wherein each reference signal of the set of reference signals are reflected by the reconfigurable surface with a precoder configuration of the set of precoder configurations.

Aspect 51: The method of any of aspects 39 through 50, wherein the reconfigurable surface comprises a plurality of reflective surface elements, and each precoder configuration of the set of precoder configurations comprises a plurality of precoders associated with the plurality of reflective surface elements.

Aspect 52: The method of aspect 51, wherein the reconfigurable surface is configured to modify an angle of reflection of signals incident on the reconfigurable surface based on the plurality of precoders associated with the plurality of reflective surface elements.

Aspect 53: The method of any of aspects 39 through 52, wherein the reconfigurable surface is configured to modify an angle of reflection of signals incident on the reconfigurable surface by modifying a precoder configuration of the set of precoder configurations, transitioning from a first precoder configuration to a second precoder configuration, or both.

Aspect 54: The method of any of aspects 39 through 53, wherein the set of reference signals comprise a set of CSI-RSs, and the feedback message comprises a CSI report.

Aspect 55: A method for wireless communication at a base station, comprising: receiving, from a UE via a reconfigurable surface, a set of reference signals reflected by the reconfigurable surface using a set of precoder configurations, wherein the set of reference signals are transmitted within a set of reference signal occasions of a sweep procedure associated with configuring the reconfigurable surface with different precoder configurations of the set of precoder configurations for reflecting signals; transmitting, to the UE via the reconfigurable surface, a feedback message comprising an indication of at least one precoder configuration of the set of precoder configurations based at least in part on receiving the set of reference signals; and receiving, from the UE via the reconfigurable surface, an uplink transmission based at least in part on transmitting the feedback message.

Aspect 56: The method of aspect 55, further comprising: performing a set of measurements on the set of reference signals received during the sweep procedure; and identifying the at least one precoder configuration of the set of precoder configurations based at least in part on performing the set of measurements, wherein transmitting the feedback message is based at least in part on identifying the at least one precoder configuration.

Aspect 57: The method of any of aspects 55 through 56, wherein receiving the set of reference signals further comprises receiving the set of reference signals within the set of reference signal occasions of a first cycle of the sweep procedure; and transmitting the feedback message further comprises transmitting the feedback message within a feedback message occasion of a second cycle of the sweep procedure, wherein the second cycle of the sweep procedure is subsequent to the first cycle of the sweep procedure.

Aspect 58: The method of aspect 57, further comprising: identifying at least one feedback message occasion of the second cycle of the sweep procedure that is associated with the at least one precoder configuration, wherein the feedback message is transmitted within the at least one feedback message occasion of the second cycle of the sweep procedure.

Aspect 59: The method of any of aspects 55 through 58, further comprising: transmitting, to the UE, a control message indicating a position of the reconfigurable surface, an orientation of the reconfigurable surface, or both, wherein receiving the set of reference signals, transmitting the feedback message, or both, is based at least in part on transmitting the control message.

Aspect 60: The method of any of aspects 55 through 59, further comprising: transmitting, to the UE, a first control message comprising a first indication of a plurality of precoder configurations for performing the sweep procedure; and transmitting, to the UE, a second control message comprising a second indication of the set of precoder configurations from the plurality of precoder configurations for performing the sweep procedure, wherein receiving the set of reference signals reflected by the reconfigurable surface using the set of precoder configurations is based at least in part on transmitting the second control message.

Aspect 61: The method of aspect 60, wherein the first control message comprises a RRC message, a SSB message, or both, and the second control message comprises a DCI message, a MAC-CE message, or both.

Aspect 62: The method of any of aspects 55 through 61, further comprising: transmitting, to the UE, a control message comprising a second indication of a set of resources associated with the sweep procedure, wherein receiving the set of reference signals, transmitting the feedback message, or both, is based at least in part on transmitting the control message.

Aspect 63: The method of any of aspects 55 through 62, further comprising: receiving, from the UE, an additional reference signal reflected by the reconfigurable surface using the at least one precoder configuration; determining CSI between the base station and the reconfigurable surface, between the reconfigurable surface and the UE, or both; and communicating with the base station via the reconfigurable surface based at least in part on determining the CSI.

Aspect 64: The method of any of aspects 55 through 63, further comprising: receiving, from the UE via the reconfigurable surface, a second set of reference signals reflected by the reconfigurable surface using a second set of precoder configurations based at least in part on transmitting the feedback message, wherein the second set of precoder configurations is different from the set of precoder configurations, wherein the second set of reference signals are transmitted within a second set of reference signal occasions of a second sweep procedure associated with configuring the reconfigurable surface; transmitting, to the UE via the reconfigurable surface, a second feedback message comprising a second indication of one or more precoder configurations of the second set of precoder configurations based at least in part on receiving the second set of reference signals; and receiving, from the UE via the reconfigurable surface, a second uplink transmission based at least in part on transmitting the second feedback message.

Aspect 65: The method of aspect 64, further comprising: transmitting, to the UE, a control message comprising a third indication of a plurality of precoder configurations for performing the sweep procedure, wherein the set of precoder configurations are included within the plurality of precoder configurations for performing the sweep procedure, and the second set of precoder configurations are not included within the plurality of precoder configurations for performing the sweep procedure.

Aspect 66: The method of any of aspects 64 through 65, wherein the set of reference signals comprise a first format, and the second set of reference signals comprise a second format different from the first format.

Aspect 67: The method of any of aspects 55 through 66, wherein each reference signal of the set of reference signals are reflected by the reconfigurable surface with a precoder configuration of the set of precoder configurations.

Aspect 68: The method of any of aspects 55 through 67, wherein the reconfigurable surface comprises a plurality of reflective surface elements, and each precoder configuration of the set of precoder configurations comprises a plurality of precoders associated with the plurality of reflective surface elements.

Aspect 69: The method of aspect 68, wherein the reconfigurable surface is configured to modify an angle of reflection of signals incident on the reconfigurable surface based on the plurality of precoders associated with the plurality of reflective surface elements.

Aspect 70: The method of any of aspects 55 through 69, wherein the reconfigurable surface is configured to modify an angle of reflection of signals incident on the reconfigurable surface by modifying a precoder configuration of the set of precoder configurations, transitioning from a first precoder configuration to a second precoder configuration, or both.

Aspect 71: The method of any of aspects 55 through 70, wherein the set of reference signals comprise a set of CSI-RSs, and the feedback message comprises a CSI report.

Aspect 72: An apparatus for wireless communication at a UE, comprising a processor; memory coupled with the processor; and instructions stored in the memory and executable by the processor to cause the apparatus to perform a method of any of aspects 1 through 19.

Aspect 73: An apparatus for wireless communication at a UE, comprising at least one means for performing a method of any of aspects 1 through 19.

Aspect 74: A non-transitory computer-readable medium storing code for wireless communication at a UE, the code comprising instructions executable by a processor to perform a method of any of aspects 1 through 19.

Aspect 75: An apparatus for wireless communication at a base station, comprising a processor; memory coupled with the processor; and instructions stored in the memory and executable by the processor to cause the apparatus to perform a method of any of aspects 20 through 38.

Aspect 76: An apparatus for wireless communication at a base station, comprising at least one means for performing a method of any of aspects 20 through 38.

Aspect 77: A non-transitory computer-readable medium storing code for wireless communication at a base station, the code comprising instructions executable by a processor to perform a method of any of aspects 20 through 38.

Aspect 78: An apparatus for wireless communication at a UE, comprising a processor; memory coupled with the processor; and instructions stored in the memory and executable by the processor to cause the apparatus to perform a method of any of aspects 39 through 54.

Aspect 79: An apparatus for wireless communication at a UE, comprising at least one means for performing a method of any of aspects 39 through 54.

Aspect 80: A non-transitory computer-readable medium storing code for wireless communication at a UE, the code comprising instructions executable by a processor to perform a method of any of aspects 39 through 54.

Aspect 81: An apparatus for wireless communication at a base station, comprising a processor; memory coupled with the processor; and instructions stored in the memory and executable by the processor to cause the apparatus to perform a method of any of aspects 55 through 71.

Aspect 82: An apparatus for wireless communication at a base station, comprising at least one means for performing a method of any of aspects 55 through 71.

Aspect 83: A non-transitory computer-readable medium storing code for wireless communication at a base station, the code comprising instructions executable by a processor to perform a method of any of aspects 55 through 71.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication comprising:
   at least one memory; and
   at least one processor coupled to the at least one memory, wherein the at least one processor is configured to:
      receive, from a network device via a reconfigurable surface, a set of reference signals reflected by the reconfigurable surface via a set of precoder configurations, wherein the set of reference signals are transmitted within a set of reference signal occasions of a sweep procedure associated with a configuration of the reconfigurable surface with different precoder configurations of the set of precoder configurations for reflection of signals;
      transmit, to the network device via the reconfigurable surface, a feedback message comprising an indication of at least one precoder configuration of the set of precoder configurations based at least in part on reception of the set of reference signals, wherein the at least one precoder configuration comprises a plurality of precoders for the reconfigurable surface; and
      receive, from the network device via the reconfigurable surface, a downlink transmission based at least in part on transmission of the feedback message.

2. The apparatus of claim 1, wherein the at least one processor is configured to:
   perform a set of measurements on the set of reference signals received as part of the sweep procedure; and
   identify the at least one precoder configuration of the set of precoder configurations based at least in part on the set of measurements, wherein transmission of the feedback message is based at least in part on identification of the at least one precoder configuration.

3. The apparatus of claim 1, wherein the at least one processor is configured to:
   receive the set of reference signals within the set of reference signal occasions of a first cycle of the sweep procedure; and
   transmit the feedback message within a feedback message occasion of a second cycle of the sweep procedure, wherein the second cycle of the sweep procedure is subsequent to the first cycle of the sweep procedure.

4. The apparatus of claim 3, wherein the at least one processor is configured to:
   identify at least one feedback message occasion of the second cycle of the sweep procedure that is associated with the at least one precoder configuration, wherein the feedback message is transmitted within the at least one feedback message occasion of the second cycle of the sweep procedure.

5. The apparatus of claim 1, wherein the at least one processor is configured to:
   receive, from the network device, a control message that indicates a position of the reconfigurable surface, an orientation of the reconfigurable surface, or both, wherein reception of the set of reference signals, transmission of the feedback message, or both, is based at least in part on reception of the control message.

6. The apparatus of claim 1, wherein the at least one processor is configured to:
   receive, from the network device, a first control message comprising a first indication of a plurality of precoder configurations for performance of the sweep procedure; and
   receive, from the network device, a second control message comprising a second indication of the set of precoder configurations from the plurality of precoder configurations for performance of the sweep procedure, wherein reception of the set of reference signals reflected by the reconfigurable surface via using the set of precoder configurations is based at least in part on reception of the second control message.

7. The apparatus of claim 6, wherein the first control message comprises a radio resource control message, a synchronization signal block message, or both, and wherein the second control message comprises a downlink control information message, a media access control (MAC) control element (MAC-CE) MAC CE message, or both.

8. The apparatus of claim 1, wherein the at least one processor is configured to:
   receive, from the network device, a control message comprising a second indication of a set of resources associated with the sweep procedure, wherein reception of the set of reference signals, transmission of the feedback message, or both, is based at least in part on reception of the control message.

9. The apparatus of claim 1, wherein the at least one processor is configured to:
   transmit, to the network device via the feedback message, a second indication of a first precoder configuration and a second precoder configuration of the set of precoder configurations, wherein reception of the downlink transmission is based at least in part on transmission of the second indication of the first precoder configuration and the second precoder configuration.

10. The apparatus of claim 9, wherein the at least one processor is configured to:
    transmit, to the network device via the feedback message, a third indication of a priority associated with the first precoder configuration and the second precoder configuration, measurements performed on reference signals associated with the first precoder configuration and the second precoder configuration, or both, wherein reception of the downlink transmission is based at least in part on transmission of the third indication.

11. The apparatus of claim 1, wherein the at least one processor is configured to:

receive, from the network device, an additional reference signal reflected by the reconfigurable surface via the at least one precoder configuration;

transmit, to the network device via the reconfigurable surface, a second feedback message comprising data indicative of channel state information between the network device and the reconfigurable surface, between the reconfigurable surface and the apparatus, or both; and communicate with the network device via the reconfigurable surface based at least in part on transmission of the second feedback message.

12. The apparatus of claim 1, wherein the at least one processor is configured to:

receive, from the network device via the reconfigurable surface, a second set of reference signals reflected by the reconfigurable surface via a second set of precoder configurations based at least in part on transmission of the feedback message, wherein the second set of precoder configurations is different from the set of precoder configurations, wherein the second set of reference signals are transmitted within a second set of reference signal occasions of a second sweep procedure associated with configuration of the reconfigurable surface;

transmit, to the network device via the reconfigurable surface, a second feedback message comprising a second indication of one or more precoder configurations of the second set of precoder configurations based at least in part on reception of the second set of reference signals; and receive, from the network device via the reconfigurable surface, a second downlink transmission based at least in part on transmission of the second feedback message.

13. The apparatus of claim 12, wherein the at least one processor is configured to:

receive, from the network device, a control message comprising a third indication of a plurality of precoder configurations for performance of the sweep procedure, wherein the set of precoder configurations are included within the plurality of precoder configurations for performance of the sweep procedure, and the second set of precoder configurations are not included within the plurality of precoder configurations for performance of the sweep procedure.

14. The apparatus of claim 12, wherein the set of reference signals comprise a first format, and wherein the second set of reference signals comprise a second format different from the first format.

15. The apparatus of claim 12, wherein each reference signal of the set of reference signals are reflected by the reconfigurable surface with a precoder configuration of the set of precoder configurations.

16. The apparatus of claim 1, wherein the reconfigurable surface comprises a plurality of reflective surface elements, and wherein each precoder configuration of the set of precoder configurations comprises a respective plurality of precoders associated with the plurality of reflective surface elements.

17. The apparatus of claim 16, wherein the reconfigurable surface is configured to modify an angle of reflection of signals incident on the reconfigurable surface based on the plurality of precoders associated with the plurality of reflective surface elements.

18. The apparatus of claim 1, wherein the reconfigurable surface is configured to modify an angle of reflection of signals incident on the reconfigurable surface by modification of a precoder configuration of the set of precoder configurations, transition from a first precoder configuration to a second precoder configuration, or both.

19. The apparatus of claim 1, wherein the set of reference signals comprise a set of channel state information reference signals, and wherein the feedback message comprises a channel state information report.

20. An apparatus for wireless communication at a network device, comprising:

at least one memory; and at least one processor coupled to the at least one memory, wherein the at least one processor is configured to:

transmit, to a user equipment (UE) via a reconfigurable surface, a set of reference signals via a set of precoder configurations, wherein the set of reference signals are transmitted within a set of reference signal occasions of a sweep procedure associated with a configuration of the reconfigurable surface with different precoder configurations of the set of precoder configurations for reflection of signals;

receive, from the UE and reflected by the reconfigurable surface, a feedback message comprising an indication of at least one precoder configuration of the set of precoder configurations based at least in part on transmission of the set of reference signals, wherein the at least one precoder configuration comprises a plurality of precoders for the reconfigurable surface; and transmit, to the UE via the reconfigurable surface, a downlink transmission based at least in part on transmission of the feedback message.

21. An apparatus for wireless communication comprising:

at least one memory; and at least one processor coupled to the at least one memory, wherein the at least one processor is configured to:

transmit, to a network device via a reconfigurable surface, a set of reference signals associated with a set of precoder configurations of the reconfigurable surface, wherein the set of reference signals are transmitted within a set of reference signal occasions of a sweep procedure associated with a configuration of the reconfigurable surface with different precoder configurations of the set of precoder configurations for reflection of signals;

receive, from the network device and reflected by the reconfigurable surface, a feedback message comprising an indication of at least one precoder configuration of the set of precoder configurations based at least in part on transmission of the set of reference signals, wherein the at least one precoder configuration comprises a plurality of precoders for the reconfigurable surface; and transmit, to the network device via the reconfigurable surface, an uplink transmission based at least in part on reception of the feedback message.

22. The apparatus of claim 21, wherein the at least one processor is configured to:

transmit the set of reference signals within the set of reference signal occasions of a first cycle of the sweep procedure; and receive the feedback message within a feedback message occasion of a second cycle of the sweep procedure, wherein the second cycle of the sweep procedure is subsequent to the first cycle of the sweep procedure.

23. The apparatus of claim 22, wherein the feedback message is received within at least one feedback message occasion of the second cycle of the sweep procedure that is associated with the at least one precoder configuration.

24. The apparatus of claim 21, wherein the at least one processor is configured to:
receive, from the network device, a control message that indicates a position of the reconfigurable surface, an orientation of the reconfigurable surface, or both, wherein transmission of the set of reference signals, the reception of the feedback message, or both, is based at least in part on reception of the control message.

25. The apparatus of claim 21, wherein the at least one processor is configured to:
receive, from the network device, a first control message comprising a first indication of a plurality of precoder configurations for performance of the sweep procedure; and
receive, from the network device, a second control message comprising a second indication of the set of precoder configurations from the plurality of precoder configurations for performance of the sweep procedure, wherein transmission of the set of reference signals reflected by the reconfigurable surface via the set of precoder configurations is based at least in part on reception of the second control message.

26. The apparatus of claim 25, wherein the first control message comprises a radio resource control message, a synchronization signal block message, or both, and wherein the second control message comprises a downlink control information message, a media access control (MAC) control element (MAC-CE) message, or both.

27. The apparatus of claim 21, wherein the at least one processor is configured to:
receive, from the network device, a control message comprising a second indication of a set of resources associated with the sweep procedure, wherein transmission of the set of reference signals, reception of the feedback message, or both, is based at least in part on reception of the control message.

28. The apparatus of claim 21, wherein the at least one processor is configured to:
transmit, to the network device, an additional reference signal reflected by the reconfigurable surface via the at least one precoder configuration; and
communicate with the network device via the reconfigurable surface based at least in part on transmission of the additional reference signal.

29. The apparatus of claim 21, wherein the at least one processor is configured to:
transmit, to the network device via the reconfigurable surface, a second set of reference signals reflected by the reconfigurable surface via a second set of precoder configurations based at least in part on reception of the feedback message, wherein the second set of precoder configurations is different from the set of precoder configurations, wherein the second set of reference signals are transmitted within a second set of reference signal occasions of a second sweep procedure associated with configuration of the reconfigurable surface;
receive, from the network device via the reconfigurable surface, a second feedback message comprising a second indication of one or more precoder configurations of the second set of precoder configurations based at least in part on transmission of the second set of reference signals; and
transmit, to the network device via the reconfigurable surface, a second uplink transmission based at least in part on reception of the second feedback message.

30. An apparatus for wireless communication comprising:
at least one memory; and
at least one processor coupled to the at least one memory, wherein the at least one processor is configured to:
receive, from a user equipment (UE) via a reconfigurable surface, a set of reference signals reflected by the reconfigurable surface via a set of precoder configurations, wherein the set of reference signals are transmitted within a set of reference signal occasions of a sweep procedure associated with configuration of the reconfigurable surface with different precoder configurations of the set of precoder configurations for reflection of signals;
transmit, to the UE via the reconfigurable surface, a feedback message comprising an indication of at least one precoder configuration of the set of precoder configurations based at least in part on reception of the set of reference signals, wherein the at least one precoder configuration comprises a plurality of precoders for the reconfigurable surface; and
receive, from the UE via the reconfigurable surface, an uplink transmission based at least in part on transmission of the feedback message.

* * * * *